(12) United States Patent
Kiyota et al.

(10) Patent No.: US 11,365,527 B2
(45) Date of Patent: Jun. 21, 2022

(54) SURROUNDINGS MONITORING APPARATUS, INFORMATION PROCESSING TERMINAL, INFORMATION PROCESSING APPARATUS, AND RECORDING MEDIUM

(71) Applicant: SUMITOMO HEAVY INDUSTRIES, LTD., Tokyo (JP)

(72) Inventors: Yoshihisa Kiyota, Kanagawa (JP);
Shunsuke Otsuki, Kanagawa (JP);
Susumu Aizawa, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 192 days.

(21) Appl. No.: 16/891,334

(22) Filed: Jun. 3, 2020

(65) Prior Publication Data

US 2020/0291614 A1 Sep. 17, 2020

Related U.S. Application Data

(63) Continuation of application No. PCT/JP2018/044427, filed on Dec. 3, 2018.

(30) Foreign Application Priority Data

Dec. 4, 2017 (JP) .............................. JP2017-232908
Jan. 25, 2018 (JP) .............................. JP2018-010872

(51) Int. Cl.
*E02F 9/26* (2006.01)
*E02F 9/20* (2006.01)
(Continued)

(52) U.S. Cl.
CPC ............ *E02F 9/261* (2013.01); *E02F 9/2025* (2013.01); *E02F 9/24* (2013.01); *E02F 9/265* (2013.01); *G06V 20/58* (2022.01); *G06V 40/20* (2022.01)

(58) Field of Classification Search
CPC ....... B60T 2210/32; B60R 1/00; B60R 11/02; E02F 9/2025; E02F 9/2033; E02F 9/205;
(Continued)

(56) References Cited

U.S. PATENT DOCUMENTS 8,917,292 B2 * 12/2014 Gotou .................... E02F 9/267
348/148
9,113,047 B2 8/2015 Onuma et al.
(Continued)

FOREIGN PATENT DOCUMENTS

JP 2014-181508 9/2014
JP 2014-181510 9/2014
(Continued)

OTHER PUBLICATIONS

International Search Report for PCT/JP2018/044427 dated Feb. 26, 2019.

*Primary Examiner* — Tyler J Lee
(74) *Attorney, Agent, or Firm* — IPUSA, PLLC

(57) ABSTRACT

A surroundings monitoring apparatus includes a sensor configured to acquire detection information about a position of a predetermined monitoring target located in an area surrounding a work machine, and a processor configured to output an alarm or restrict an operation of the work machine in response to detecting that: the monitoring target is in a sensor range in which the sensor can acquire the detection information; the monitoring target is in a predetermined range equal to or less than a predetermined distance from the work machine; and the monitoring target is in a first range in a height direction of the work machine.

6 Claims, 24 Drawing Sheets

(51) Int. Cl.
*E02F 9/24* (2006.01)
*G06V 20/58* (2022.01)
*G06V 40/20* (2022.01)

(58) Field of Classification Search
CPC ... E02F 9/24; E02F 9/261; E02F 9/262; E02F 9/265; G06V 20/58; G06V 40/20; G08B 21/02; H04N 7/18
See application file for complete search history.

(56) References Cited

U.S. PATENT DOCUMENTS

| | | | | |
|---|---|---|---|---|
| 9,206,588 | B2* | 12/2015 | Wu | B60L 50/15 |
| 9,463,741 | B2* | 10/2016 | Fukuda | G06T 11/60 |
| 9,715,015 | B2* | 7/2017 | Izumikawa | G06V 20/56 |
| 10,228,232 | B2* | 3/2019 | Friend | G01C 21/20 |
| 10,508,417 | B2 | 12/2019 | Hasegawa et al. | |
| 2013/0088593 | A1* | 4/2013 | Ishimoto | E02F 9/226 348/143 |
| 2015/0009329 | A1* | 1/2015 | Ishimoto | E02F 9/261 348/148 |
| 2015/0175071 | A1* | 6/2015 | Ishimoto | H04N 7/18 348/148 |
| 2018/0209122 | A1 | 7/2018 | Kiyota et al. | |
| 2018/0258616 | A1 | 9/2018 | Kiyota et al. | |

FOREIGN PATENT DOCUMENTS

| | | |
|---|---|---|
| JP | 2014-183498 | 9/2014 |
| JP | 2017-101419 | 6/2017 |
| JP | 2020-183623 | 11/2020 |
| JP | 2020-183624 | 11/2020 |
| WO | 2012/053105 | 4/2012 |
| WO | 2016/111148 | 7/2016 |

* cited by examiner

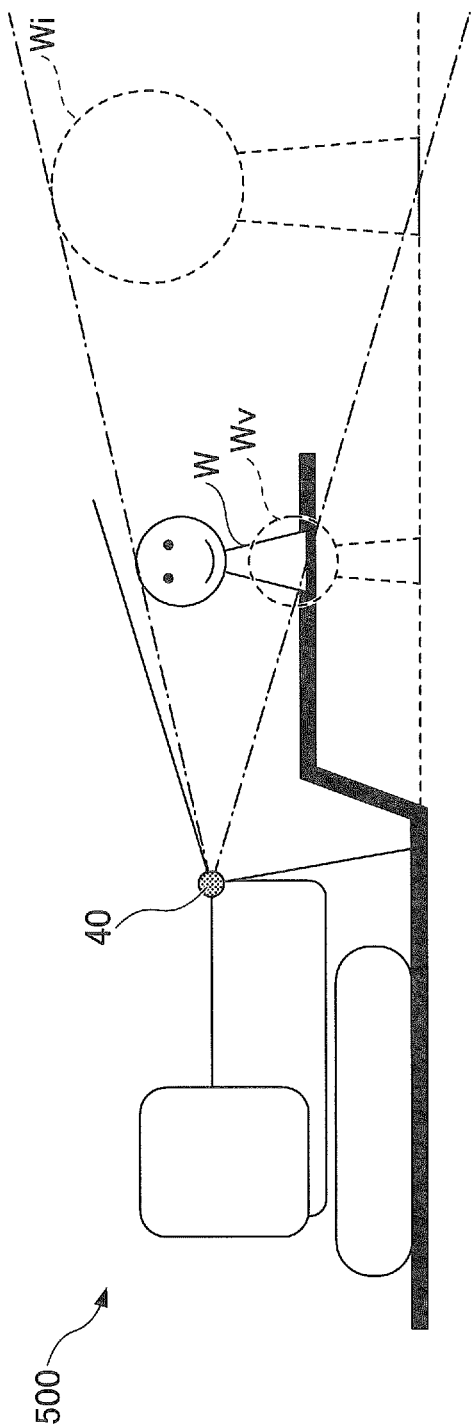

SURROUNDINGS MONITORING APPARATUS, INFORMATION PROCESSING TERMINAL, INFORMATION PROCESSING APPARATUS, AND RECORDING MEDIUM

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/044427, filed on Dec. 3, 2018 and designating the U.S., which claims priority to Japanese patent application No. 2017-232908, filed on Dec. 4, 2017 and Japanese patent application No. 2018-010872, filed on Jan. 25, 2018. The entire contents of the foregoing applications are incorporated herein by reference.

BACKGROUND

Technical Field

The present invention relates to a surroundings monitoring apparatus and the like provided on a work machine such as a shovel.

Description of Related Art

A surroundings monitoring apparatus which ensures the safety in an area surrounding a work machine such as shovel is known.

SUMMARY

According to an aspect of the present invention, A surroundings monitoring apparatus includes a sensor configured to acquire detection information about a position of a predetermined monitoring target located in an area surrounding a work machine, and a processor configured to output an alarm or restrict an operation of the work machine in response to detecting that: the monitoring target is in a sensor range in which the sensor can acquire the detection information; the monitoring target is in a predetermined range equal to or less than a predetermined distance from the work machine; and the monitoring target is in a first range in a height direction of the work machine.

BRIEF DESCRIPTION OF THE DRAWINGS

FIG. 12B is a drawing illustrating an example of a monitoring target excluded from the target for which an alarm is output or for which operation is restricted by the surroundings monitoring apparatus;

DETAILED DESCRIPTION

A surroundings monitoring apparatus ensures the safety in an area surrounding a work machine such as a shovel by outputting an alarm, restricting the operation of the work machine, and the like, when a monitoring target (for example, a person) in the area surrounding the work machine is detected.

In the above surroundings monitoring apparatus, all of the monitoring targets detected in the monitoring target region located in the area surrounding the work machine may potentially be targets for which an alarm is output or for which operation of the work machine is restricted. For this reason, in practice, even in a case where the chance of contact and the like between the work machine and the detected monitoring target is extremely low (for example, a large step exists between a work surface of the shovel and a surface where the monitoring target is present), an alarm may be output or an operation of the work machine may be restricted. In other words, the alarm may be output unnecessarily or the operation of the work machine is unnecessarily restricted, which may reduce the work efficiency of the work machine.

Therefore, in view of the above problems, it is desired to provide a surroundings monitoring apparatus and the like capable of alleviating a reduction in the work efficiency in a case where an output of an alarm, a restriction of operation, and the like are performed on the basis of a detection of a monitoring target that is present in an area surrounding a work machine.

Hereinafter, embodiments for carrying out the invention will be described with reference to the drawings.

Example of Surroundings Monitoring System

First, an example of a surroundings monitoring system 1000 according to the present embodiment will be explained with reference to FIG. 1 to FIG. 9.

[Overview of Surroundings Monitoring System]

First, an overview of a surroundings monitoring system 1000 according to the present embodiment will be explained.

Figure 1:
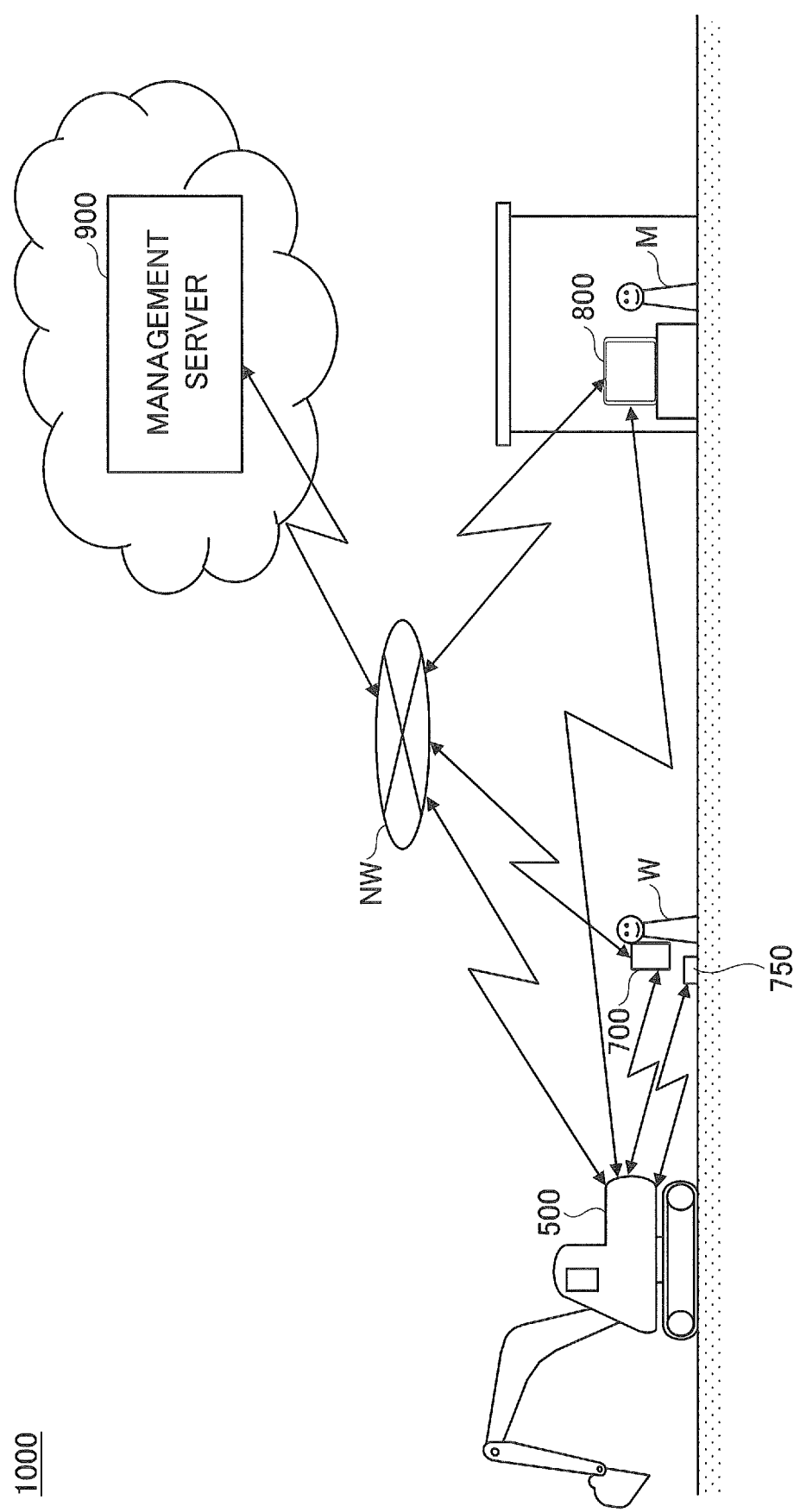
FIG. 1 is a schematic drawing illustrating an example of configuration of a surroundings monitoring system.

FIG. 1 is a schematic drawing illustrating an example of configuration of a surroundings monitoring system 1000.

The surroundings monitoring system 1000 includes a shovel 500, a management terminal 700, a cancellation device 750, a management terminal 800, and a management server 900.

The shovel 500 is an example of a work machine.

As described later, when the shovel 500 detects a predetermined monitoring target within a predetermined range (a monitoring area described later) in the area surrounding the shovel 500, the shovel 500 outputs an alarm or restricts operation.

In a case where the shovel 500 outputs an alarm or restricts operation, the shovel 500 cancels the alarm or the restriction of the operation (hereinafter collectively referred to as "alarm and the like") in response to a predetermined condition, for example, a predetermined manipulation by an operator (manipulation of a cancellation switch 60 to be described later) or a reception of a cancellation permission notification to be described later from the management terminal 700 and the like.

The shovel 500 is communicably connected to the management terminal 700 and the like by a predetermined communication method, for example, a communication (hereinafter referred to as "BT communication") based on a communication standard of Bluetooth (registered trademark) and a communication (hereinafter referred to as "RF communication") by electromagnetic waves of RF (Radio Frequency) bands from about 300 Hz to 3 THz (hereinafter referred to as "RF waves"). Accordingly, the shovel 500 can receive various kinds of information (for example, a cancellation permission notification, and the like) from the management terminal 700 and the like. The shovel 500 can transmit various kinds of information (for example, an alarm output notification, an operation restriction notification, a cancellation request notification, and the like, to be described later) to the management terminal 700 and the like.

For example, the shovel 500 is communicably connected to the management server 900 via a predetermined communication network NW such as: a mobile communication network having a base station as a termination; and the Internet. Accordingly, the shovel 500 can receive various kinds of information (for example, the cancellation permission notification and the like) from the management server 900. The shovel 500 can transmit various kinds of information (for example, the alarm output notification, the operation restriction notification, the cancellation request notification, and the like) to the management server 900.

The management terminal 700 (an example of an information processing terminal) is a portable terminal carried by a worker W in the area surrounding the shovel 500. For example, as appropriate, the management terminal 700 uploads, to the management server 900, various kinds of information about a work site which are input by the worker W and images of the work site taken by the built-in camera function.

For example, the management terminal 700 may be a general-purpose mobile terminal such as a mobile phone, a smartphone, and a tablet terminal carried by the worker W. Also, the management terminal 700 may be a special-purpose terminal (for example, a remote control switch for transmitting a cancellation permission notification to the shovel 500) specialized in a function for permitting cancellation of an alarm and the like in the shovel 500, or may be a special-purpose terminal (i.e., a remote control terminal) for controlling the work machine such as the shovel 500 provided with this function.

The management terminal 700 is communicably connected to the shovel 500 by a predetermined communication method, such as, for example, the BT communication, the RF communication, and the like. As a result, the management terminal 700 can transmit, to the shovel 500, a cancellation permission notification for permitting cancellation of an alarm and the like in the shovel 500 in a case where the alarm is output or the operation of the shovel 500 is restricted.

Also, the management terminal 700 can acquire (receive), from the shovel 500, various kinds of information (for example, surroundings situation information, to be described later, about the situation in the area surrounding the shovel 500) for determining whether to permit cancellation of an alarm or a restriction of the operation. In addition, the management terminal 700 can receive a predetermined manipulation performed with a manipulation unit implemented with hardware such as a push button and a keyboard and a manipulation unit implemented with software such as a button icon and the like displayed on a touch display and the like. Therefore, the management terminal 700 can determine whether to permit cancellation of an alarm and the like, on the basis of the acquired various kinds of information, the predetermined manipulation performed by the worker W who checks the surroundings situation in the area surrounding the shovel 500, and the like, and can transmit a cancellation permission notification to the shovel 500 in accordance with the determination result.

Alternatively, the management terminal 700 may acquire surroundings situation information about the situation in the area surrounding the shovel 500 from other than the shovel 500. For example, the management terminal 700 may acquire, from a drone, surroundings situation information including an image of the area surrounding the shovel 500 captured by a camera provided on the monitoring drone flying above the work site of the shovel 500. Hereinafter, the same applies to the cancellation device 750, the management terminal 800, and the management server 900.

In addition, the management terminal 700 may be connected to the management server 900 through a communication network NW in a bidirectionally communicable manner. In this case, the management terminal 700 may acquire various kinds of information (for example, surroundings situation information and the like) uploaded from the shovel 500 to the management server 900 via the communication network NW. Also, the management terminal 700 may transmit various kinds of information (for example, a cancellation permission notification and the like) to the shovel 500 via the management server 900.

The worker W may include a worker who actually works in the area surrounding the shovel 500 and a supervisor and the like who supervises a part or all of the work site including the work performed with the shovel 500.

The cancellation device 750 (an example of an information processing apparatus) is appropriately arranged at, for example, a sufficiently distant location in the area surrounding the shovel 500 (outside the monitoring area of the shovel 500 to be described later).

In a manner similar to the management terminal 700, the cancellation device 750 is communicably connected to the shovel 500 by a predetermined communication method such as the BT communication, the RF communication, and the like. Thus, in a manner similar to the management terminal 700, the cancellation device 750 can transmit a cancellation permission notification to the shovel 500 in a case where an alarm is output or operation of the shovel 500 is restricted.

In a manner similar to the management terminal 700, the cancellation device 750 can acquire various kinds of information for determining whether to permit cancellation of an alarm or a restriction of the operation (for example, surroundings situation information and the like) from the shovel 500. In a manner similar to the management terminal 700, the cancellation device 750 can receive a predetermined manipulation performed with the manipulation unit implemented with hardware or software. Accordingly, in a manner similar to the management terminal 700, the cancellation device 750 can determine whether to permit cancellation of an alarm and the like, on the basis of the acquired various kinds of information, the predetermined manipulation performed by the worker W who checks the surroundings situation in the area surrounding the shovel 500, and the like, and can transmit a cancellation permission notification to the shovel 500 in accordance with the determination result. In particular, the cancellation device 750 is installed outside the monitoring area of the shovel 500, as described above. For this reason, in a case where the worker W enters the monitoring area, the cancellation device 750 may determine that the safety situation in the monitoring area is confirmed, i.e., cancellation of an alarm and the like may be permitted, on the basis of a predetermined manipulation performed by the worker W who is evacuated out of the monitoring area.

It should be noted that the cancellation device 750 may perform only a determination as to whether to permit cancellation of an alarm and the like on the basis of the manipulation performed by the worker W. In other words, the cancellation device 750 may be configured not to perform a determination as to whether to permit cancellation of an alarm and the like on the basis of information acquired from the surroundings situation information and the like. The cancellation device 750 may be equipped with a sensor for detecting a monitoring target or a shovel 500, such as, for example, a millimeter wave radar, a LIDAR (Light Detection And Ranging) device, a stereo camera, and the like. In this case, the cancellation device 750 can transmit a cancellation permission notification to be described later to the shovel 500 upon confirming the safety situation in the area surrounding the shovel 500 on the basis of a relative positional relationship between the shovel 500 and the monitoring target recognizable on the basis of the detection result of the sensor. Specifically, in a case where the cancellation device 750 determines that there is no monitoring target (i.e., a person) in the monitoring area on the basis of the detection result of the sensor, the cancellation device 750 may output a cancellation permission notification toward the shovel 500.

The management terminal 800 (an example of information processing terminal) is provided in, for example, a site office and the like temporarily constructed at a work site, and is used by the manager M who manages the entire work site from the site office and the worker W and the like who stands by in the site office. The management terminal 800 uploads to the management server 900, for example, various kinds of information about the work site which are input by the manager M or the worker W and images of the work site taken by the built-in camera function.

The management terminal 800 (an example of an information processing apparatus) may be, for example, a desktop or laptop-type general purpose computer. Alternatively, the management terminal 800 may be a desktop or laptop-type special-purpose computer specialized in the function of management at work sites including the function of permitting cancellation of an alarm and the like. Alternatively, in a manner similar to the management terminal 700, the management terminal 800 may be a portable terminal that can be carried by the manager M or the worker W. In other words, the management terminal 800 may also be used as the management terminal 700, and may be taken out from the site office.

In a manner similar to the management terminal 700 and the like, the management terminal 800 is communicably connected to the shovel 500 by a predetermined communication method, such as, for example, the BT communication, the RF communication, and the like. As a result, in a manner similar to the management terminal 700, the management terminal 800 can transmit a cancellation permission notification to the shovel 500 in a case where an alarm is output or operation of the shovel 500 is restricted.

In a manner similar to the management terminal 700 and the like, the management terminal 800 can acquire, from the shovel 500, various kinds of information for determining whether to permit cancellation of an alarm or a restriction of the operation (for example, surroundings situation information and the like). In addition, in a manner similar to the management terminal 700, the management terminal 800 can receive a predetermined manipulation performed with a manipulation unit implemented with hardware or software. Therefore, in a manner similar to the management terminal 700, the management terminal 800 can determine whether to permit cancellation of an alarm and the like, on the basis of the acquired various kinds of information, manipulation performed by the manager M or the worker W who checks the surroundings situation in the area surrounding the shovel 500, and the like, and can transmit a cancellation permission notification to the shovel 500 in accordance with the determination result.

In a manner similar to the management terminal 700, the management terminal 800 may be connected to the management server 900 through the communication network NW in a bidirectionally communicable manner. In this case, the management terminal 800 may acquire various kinds of information (for example, an alarm output notification, an operation restriction notification, a cancellation request notification, and the like) uploaded from the shovel 500 to the management server 900 via the communication network NW. Also, the management terminal 800 may transmit various kinds of information (for example, a cancellation permission notification and the like) to the shovel 500 via the management server 900.

The management server 900 is provided outside the work site of the shovel 500. For example, the management server 900 collects various kinds of information (for example, daily reports, captured images of the work site, and the like) about the work site from the management terminals 700, 800, and the like, and manages the work site and the shovel 500. The management server 900 may be a server (i.e., a local server) owned by a company performing overall operation management of the surroundings monitoring system 1000, or may be a server (i.e., a cloud server) owned by and operated and managed by a third party other than the above company.

The management server 900 is communicably connected via the communication network NW to the shovel 500. As a result, the management server 900 can transmit a cancellation permission notification to the shovel 500 in a case where an alarm is output or operation of the shovel 500 is restricted.

The management server 900 can acquire, from the shovel 500, various kinds of information for determining whether to permit cancellation of an alarm or a restriction of the operation (for example, surroundings situation information and the like). In a manner similar to the management terminal 700 and the like, the management terminal 800 can receive a predetermined manipulation performed with the manipulation unit implemented with hardware or software. Therefore, in a manner similar to the management terminal 700, the management terminal 800 can determine whether to permit cancellation of an alarm and the like, on the basis of the acquired various kinds of information, manipulation performed by the worker W who checks the surroundings situation in the area surrounding the shovel 500, and the like, and can transmit a cancellation permission notification to the shovel 500 in accordance with the determination result.

Hereinafter, the management terminal 700, the cancellation device 750, the management terminal 800, and the management server 900 are collectively referred to as "external devices 600". The surroundings monitoring system 1000 including the shovel 500 and the external devices 600 are hereinafter explained.

In the present embodiment, the plurality of external devices 600 are provided, but it is sufficient that at least one external device 600 be provided. Further, the external device 600 may include other aspects other than those described above. For example, the external device 600 may be a drone for monitoring (an example of an information processing apparatus) that includes an information processing unit such as a computer and the like and an RF transceiver, a communication device such as a mobile communication module and the like, and the like and flies above the work site of the shovel 500 and uses the onboard camera to captures images of the work site of the shovel 500. Therefore, the drone serving as the external device 600 can confirm the safety situation in the area surrounding the shovel 500 on the basis of a relative positional relationship between the shovel 500 and the monitoring target recognizable on the basis of the detection result of the sensor, and can transmit a cancellation permission notification to the shovel 500. Specifically, in a case where the drone serving as the external device 600 determines that there is no monitoring target (i.e., a person) in the monitoring area on the basis of the captured image, the drone serving as the external device 600 can output a cancellation permission notification toward the shovel 500.

[Overview of Work Machine]

Next, an overview of the work machine included in the surroundings monitoring system 1000 (see FIG. 3) according to the present embodiment will be described with reference to FIG. 2.

Figure 2:
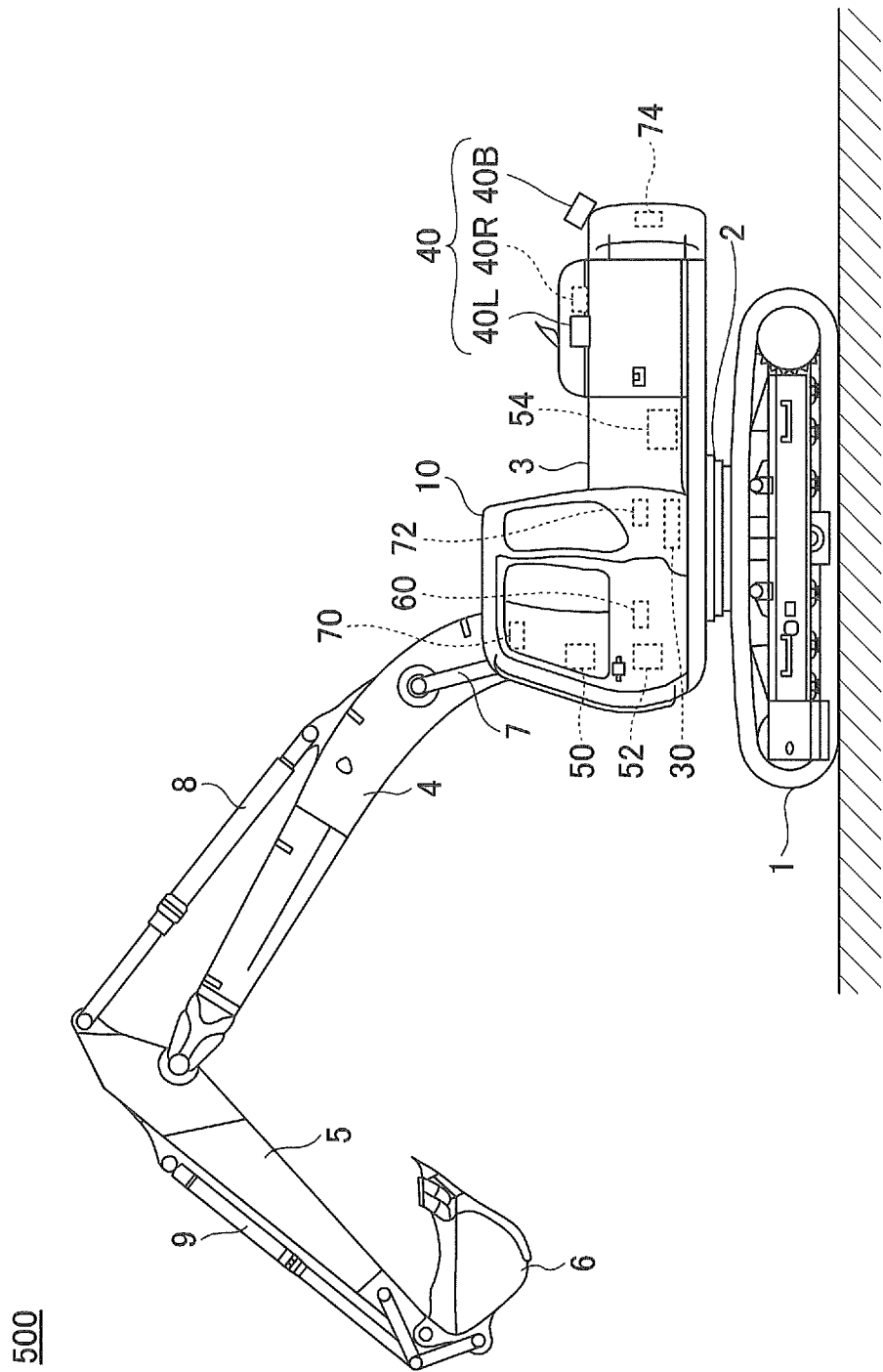
FIG. 2 is a drawing illustrating an example of a work machine.

FIG. 2 is a drawing illustrating an example of a work machine included in the surroundings monitoring system 1000 according to the present embodiment, and specifically, a side view illustrating the shovel 500.

The surroundings monitoring system 1000 according to the present embodiment may include any work machine other than the shovel 500, for example, a bulldozer, a wheel loader, an asphalt finisher, a forestry machine, and the like.

The shovel 500 includes a lower traveling body 1, an upper turning body 3 turnably provided on the lower traveling body 1 via a turning mechanism 2, a boom 4, an arm 5, a bucket 6, and a cab 10 in which an operator rides. The boom 4, the arm 5, and the bucket 6 serve as an attachment (i.e., a work attachment).

The lower traveling body 1 includes, for example, a pair of left and right crawlers, which are hydraulically driven by traveling hydraulic motors (not illustrated) to cause the shovel 500 to travel.

The upper turning body 3 is driven by a turning hydraulic motor or an electric motor (both of which are not illustrated) and the like to turn relatively to the lower traveling body 1.

The boom 4 is pivotally attached to the front center of the upper turning body 3 to be able to vertically pivot, the arm 5 is pivotally attached to the end of the boom 4 to be able to pivot vertically, and the bucket 6 is pivotally attached to the end of the arm 5. The boom 4, the arm 5, and the bucket 6 are hydraulically driven by a boom cylinder 7, an arm cylinder 8, and a bucket cylinder 9, respectively.

The cab 10, which is an operator room in which an operator rides, is provided on the front left of the upper turning body 3.

[Details of Surroundings Monitoring System]

Next, specifics of the configuration of the surroundings monitoring system 1000 according to the present embodiment will be described with reference to FIG. 3 in addition to FIG. 1 and FIG. 2.

Figure 3:
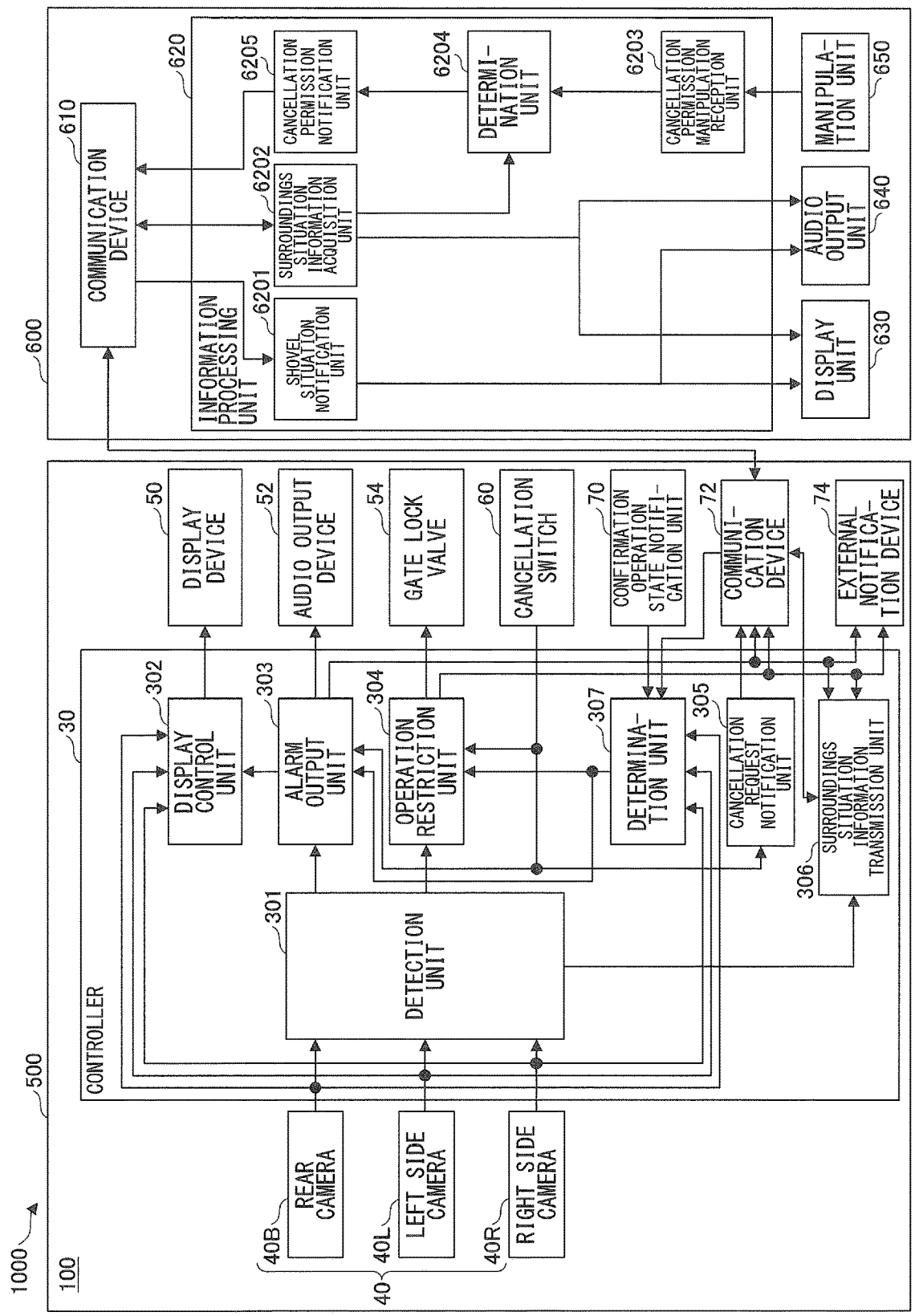
FIG. 3 is a block diagram illustrating an example of detailed configuration of the surroundings monitoring system.

FIG. 3 is a block diagram illustrating an example of detailed configuration of the surroundings monitoring system 1000 according to the present embodiment.

As described above, the surroundings monitoring system 1000 includes a shovel 500 and an external device 600.

The surroundings monitoring apparatus 100 is provided in the shovel 500.

The surroundings monitoring apparatus 100 monitors an entry of a predetermined object (hereinafter simply referred to as "monitoring target") which is a monitoring target in the predetermined range in the area surrounding the shovel 500, and in a case where the surroundings monitoring apparatus 100 detects the monitoring target, the surroundings monitoring apparatus 100 performs operations such as an output of an alarm, restriction of operation of the shovel, and the like. The monitoring target may include not only persons such as workers working in the area surrounding the shovel 500, a site foreman at the work site, and the like but also obstacles placed in a fixed manner such as materials and the like temporarily placed on the work site, moving obstacles and the like such as vehicles including trucks and the like, and any object other than a person. Hereinafter, explanation will be continued based on the assumption that the monitoring target is a person.

The surroundings monitoring apparatus 100 includes a controller 30, an image-capturing device 40, a display device 50, an audio output device 52, a gate lock valve 54, the cancellation switch 60, a confirmation operation state detection unit 70, a communication device 72, and an external notification device 74. As a configuration related to the surroundings monitoring apparatus 100, the external device 600 provided outside the shovel 500 is included, and the surroundings monitoring system 1000 according to the present embodiment is configured to include: the surroundings monitoring apparatus 100 implemented on the shovel 500; and the external device 600. The controller 30 is a main control device that controls the shovel 500. For example, the controller 30 is provided in the cab 10 and performs various control processes related to the surroundings monitoring apparatus 100.

The functions of the controller 30 may be implemented by any hardware, or a combination of hardware and software. The controller 30 is constituted mainly by a microcomputer including, for example, a CPU (Central Processing Unit), a RAM (Random Access Memory), a ROM (Read Only Memory), an auxiliary storage device, an RTC (Real Time Clock), an interface for various kinds of communications, and the like. The controller 30 serves as a functional unit implemented by, for example, causing a CPU to execute various kinds of programs stored in a ROM and an auxiliary storage device, and includes a detection unit 301, a display control unit 302, an alarm output unit 303, an operation restriction unit 304, a cancellation request notification unit 305, a surroundings situation information transmission unit 306, and a determination unit 307.

The image-capturing device 40 is attached to an upper portion of the upper turning body 3 to capture images of the area surrounding the shovel 500. The image-capturing device 40 includes cameras 40B, 40L, and 40R.

The camera 40B, the camera 40L, and the camera 40R are attached to the upper rear end, upper left end, and upper right end, respectively, of the upper turning body 3 to capture images at the rear, left, and right sides of the upper turning body 3. Specifically, the camera 40B, the camera 40L, and the camera 40R are respectively provided on the upper part of the upper turning body 3 so that the optical axis is directed obliquely downward, and capture images in a vertical image-capturing range (angle of view) from the ground near the shovel 500 to a position far from the shovel 500. The camera 40B, the camera 40L, and the camera 40R output the captured images with a predetermined interval (for example, 1/30 seconds) while the shovel 500 is operating, and the output captured images are retrieved by the controller 30.

The display device 50 is provided around the cockpit in the cab 10, specifically, at a position easily visible from the operator seated on the operator's seat, and displays various kinds of image information to be notified to the operator under the control performed by the controller 30. For example, the display device 50 is a liquid crystal display or an organic EL (Electroluminescence) display, and may be a touch panel that also serves as the manipulation unit. Specifically, the display device 50 displays images captured by the image-capturing device 40 (through images), surroundings images generated by the controller 30 based on the images captured by the image-capturing device 40 (for example, viewpoint-transformed images to be described later), and the like.

The audio output device 52 is provided around the operator's seat in the cab 10, and outputs various kinds of audio information notified to the operator under the control performed by the controller 30. The audio output device 52 is, for example, a speaker, a buzzer, and the like. Specifically, the audio output device 52 outputs an alarm sound based on the control instruction from the controller 30.

The gate lock valve 54 is provided at the most upstream in a pilot line providing a pilot pressure from a pilot pump (not illustrated) to manipulation devices (not illustrated) for manipulating the operation elements (i.e., the lower traveling body 1, the upper turning body 3, the boom 4, the arm 5, the bucket 6, and the like), and is configured to switch the pilot line into either a communication or non-communication state.

For example, the gate lock valve 54 switches the pilot line into either the communication or non-communication state in accordance with an output signal (ON and OFF) of a gate lock switch operating in synchronization with the manipulation state of a gate lock lever (not illustrated) generally provided at a portion corresponding to the entrance to the operator's seat in the cab 10. Specifically, in a case where the output signal of the gate lock switch is an ON signal corresponding to a state in which the gate lock lever is pulled up (i.e., a state in which the operator is seated on the operator's seat), the gate lock valve 54 causes the pilot line to be in the communication state. Conversely, in a case where the output signal of the gate lock switch is an OFF signal corresponding to a state in which the gate lock lever is lowered (i.e., a state in which the operator is away from the operator's seat), the gate lock valve 54 causes the pilot line to be in the non-communication state.

Also, for example, the gate lock valve 54 is configured to be able to receive an instruction signal received from the controller 30. Specifically, the gate lock valve 54 may have its signal input unit be connected to a logical conjunction circuit receiving both of the output signal of the gate lock switch and the instruction signal from the controller 30, i.e., a logic circuit that outputs an OFF signal when the logic circuit receives an OFF signal from at least one of the inputs. Accordingly, the gate lock valve 54 can switch the pilot line into either the communication or non-communication state in accordance with the instruction signal from the controller (an ON signal or an OFF signal) even in a state in which the gate lock lever is pulled up. In other words, under the control performed by the controller 30, the gate lock valve 54 causes the pilot line to be in the non-communication state even in a state in which the gate lock lever is pulled up.

The cancellation switch 60 (an example of a cancellation intention input unit and an input unit) is a manipulation unit for receiving a cancellation intention of the operator for cancelling an alarm or a restriction of the operation of the shovel 500, to be described later. The cancellation switch 60 may be, for example, a manipulation unit implemented with hardware such as a push button, a lever, rotary knob, and the like of a manipulation unit 50B, to be described later, or may be a manipulation unit implemented with software such as a virtual button (icon) and the like on manipulation screen displayed on the display device 50. Information about manipulation state of the cancellation switch 60 is retrieved by the controller 30. The above is also applicable to a monitoring function switch 62, a display content selection switch 64, and the like to be described later.

Instead of the cancellation switch 60, it may be possible to employ a camera (an example of a cancellation intention input unit and an input unit) for recognizing a particular pose or gesture corresponding to a cancellation intention given by the operator, a gaze tracking sensor (an example of a cancellation intention input unit and an input unit) for recognizing a particular gaze movement corresponding to a cancellation intention given by the operator, and the like.

For example, the confirmation operation state detection unit 70 is provided in the cab 10 to detect an operation (hereinafter referred to as "surroundings situation confirmation operation") performed by the operator in the cab 10 to check the situation in the area surrounding the shovel 500. For example, the confirmation operation state detection unit 70 is a camera capturing an image in the cab 10 including the face of the operator, a gaze tracking sensor for detecting the gaze of the operator, and the like. This enables to detect the surroundings situation confirmation operation performed by the operator on the basis of the movement of the gaze of the operator that can be recognized from images captured by the camera or a detection signal from the gaze tracking sensor. Alternatively, for example, the confirmation operation state detection unit 70 is an electroencephalography sensor provided on a safety hat or a helmet worn by the operator to detect the operator's electroencephalography. This enables detecting the surroundings situation confirmation operation performed by the operator on the basis of the change and tendency in the operator's electroencephalography.

The communication device 72 is a device for transmitting and receiving a control signal, an information signal, and the like to and from the external device 600. Under the control performed by the controller 30, the communication device 72 transmits various kinds of signals (for example, an alarm output notification, an operation restriction notification, a cancellation request notification, and the like, to be described later) to the external device 600. A signal from the external device 600 received by the communication device 72 is retrieved by the controller 30.

For example, the communication device 72 may include an RF transceiver performing an RF communication with the external device 600. For example, the communication device 72 may include a Bluetooth communication module (BT communication module) performing BT communication with the external device 600. For example, the communication device 72 is a mobile communication module for transmitting and receiving, via a mobile communication network and the like, various kinds of signals to and from the external device 600 directly or via a predetermined server (management server 900) and the like.

The external notification device 74 is a device for notifying the situation of the shovel 500 toward the surroundings of the shovel 500 under the control performed by the controller 30.

For example, the external notification device 74 may be an audio output device such as a speaker, a buzzer, and the like capable of notifying the situation of the shovel 500 toward the surroundings of the shovel 500 by auditory means, i.e., by sound.

Also, for example, the external notification device 74 may be a display device such as a display, an electric bulletin board, and the like capable of notifying the situation of the shovel 500 toward the surroundings of the shovel 500 by visual means, i.e., displaying of information.

For example, the detection unit 301 detects a predetermined monitoring target within a predetermined region (monitoring area) in the area surrounding the shovel 500, i.e., a predetermined monitoring target of which distance D from the shovel 500 is within a predetermined distance D1 (for example, 5 meters) on the basis of the images captured by the image-capturing device 40.

Figure 4:
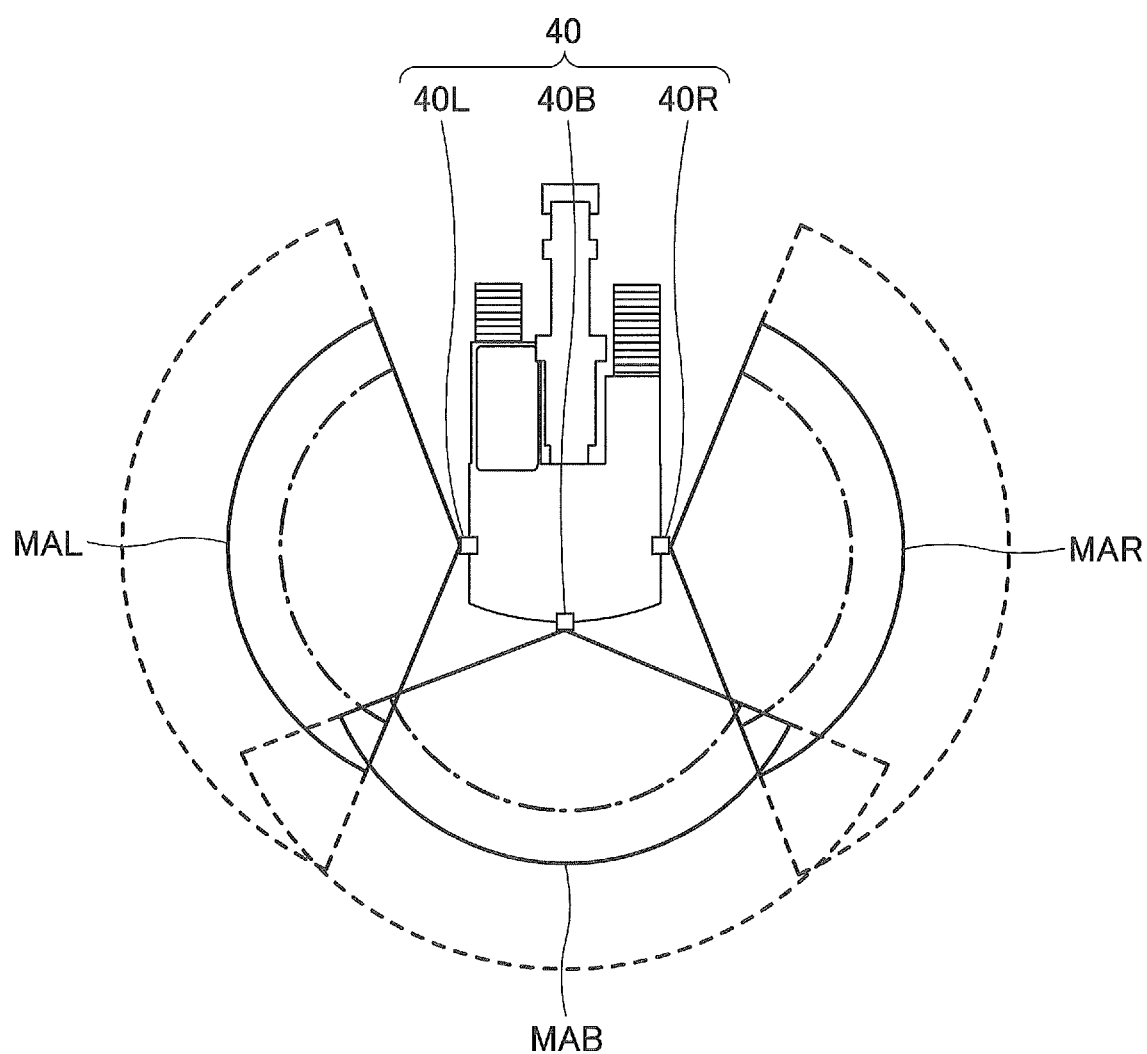
FIG. 4 is a drawing illustrating an example of a monitoring area.

For example, FIG. 4 is a drawing schematically illustrating an example of a monitoring area of the detection unit 301.

As illustrated in FIG. 4, the monitoring area includes a monitoring area MAB, a monitoring area MAL, and a monitoring area MAR corresponding to the camera 40B, the camera 40L, and the camera 40R, respectively.

The controller 30 can enlarge the monitoring areas MAB, MAL, MAR as indicated by dashed lines and reduce the monitoring areas MAB, MAL, MAR as indicated by alternate long and short dash lines, as long as a balance with the resources is maintained. For example, in a case where the controller 30 enlarges the monitoring area MAB as indicated by the alternate long and short dash line, the controller 30 reduces at least one of the monitoring areas MAL, MAR, so that the controller 30 (the detection unit 301) can finish the process for detecting the monitoring target within a predetermined process time.

Back to FIG. 3, for example, the detection unit 301 recognizes the monitoring target in the captured image by applying a classifier and the like based on various kinds of known image process methods, machine learning including artificial intelligence (AI), and the like. Then, the detection unit 301 can identify the position where the recognized monitoring target is actually present (i.e., the distance D and the like from the shovel 500 to the recognized monitoring target). The detection unit 301 can also specify the type of the monitoring target (for example, whether the monitoring target is a person or an obstacle other than a person).

As described above, examples of the monitoring targets include persons such as workers, supervisors, and the like working in the area surrounding the shovel 500, temporarily placed building materials, and obstacles hindering the work of the shovel 500, such as construction vehicles and the like.

The detection unit 301 may detect the monitoring target located in the area surrounding the shovel 500 on the basis of a detection result (a distance image and the like) acquired by another sensor provided on the shovel 500, instead of or in addition to the images captured by the image-capturing device 40. For example, the detection unit 301 can detect the monitoring target on the basis of a detection result of a millimeter wave radar, a LIDAR device, a stereo camera, and the like provided on the shovel 500.

The display control unit 302 displays various kinds of information images on the display device 50.

For example, in accordance with a predetermined manipulation performed by the operator, the display control unit 302 generates a surroundings image on the basis of the image captured by the image-capturing device 40, and causes the display device 50 to display the surroundings image. Specifically, the display control unit 302 generates, as a surroundings image, a viewpoint-transformed image as seen from a virtual viewpoint by performing a known viewpoint-transformed process on the basis of the images captured by the camera 40B, the camera 40L, and the camera 40R, and causes the display device 50 to display the surroundings image. When the display control unit 302 causes the display device 50 to display the surroundings image, the display control unit 302 causes the display device 50 to also display a shovel image schematically representing the shovel 500 in order to clarify the relative positional relationship between the image-capturing range of the image-capturing device 40 and the shovel 500. In other words, the display control unit 302 generates a monitoring image including a shovel image and a surroundings image arranged in the area surrounding the shovel image in accordance with a relative positional relationship between the shovel 500 and the image-capturing range of the image-capturing device 40, and causes the display device 50 to display the monitoring image.

It should be noted that the function of the display control unit 302 may be provided in the display device 50. In this case, the images captured by the image-capturing device 40 (the camera 40B, the camera 40L, and the camera 40R) and the information about the detection result and the like detected by the detection unit 301 are retrieved by the display device 50 from the image-capturing device 40 and the controller 30, respectively.

Figure 5:
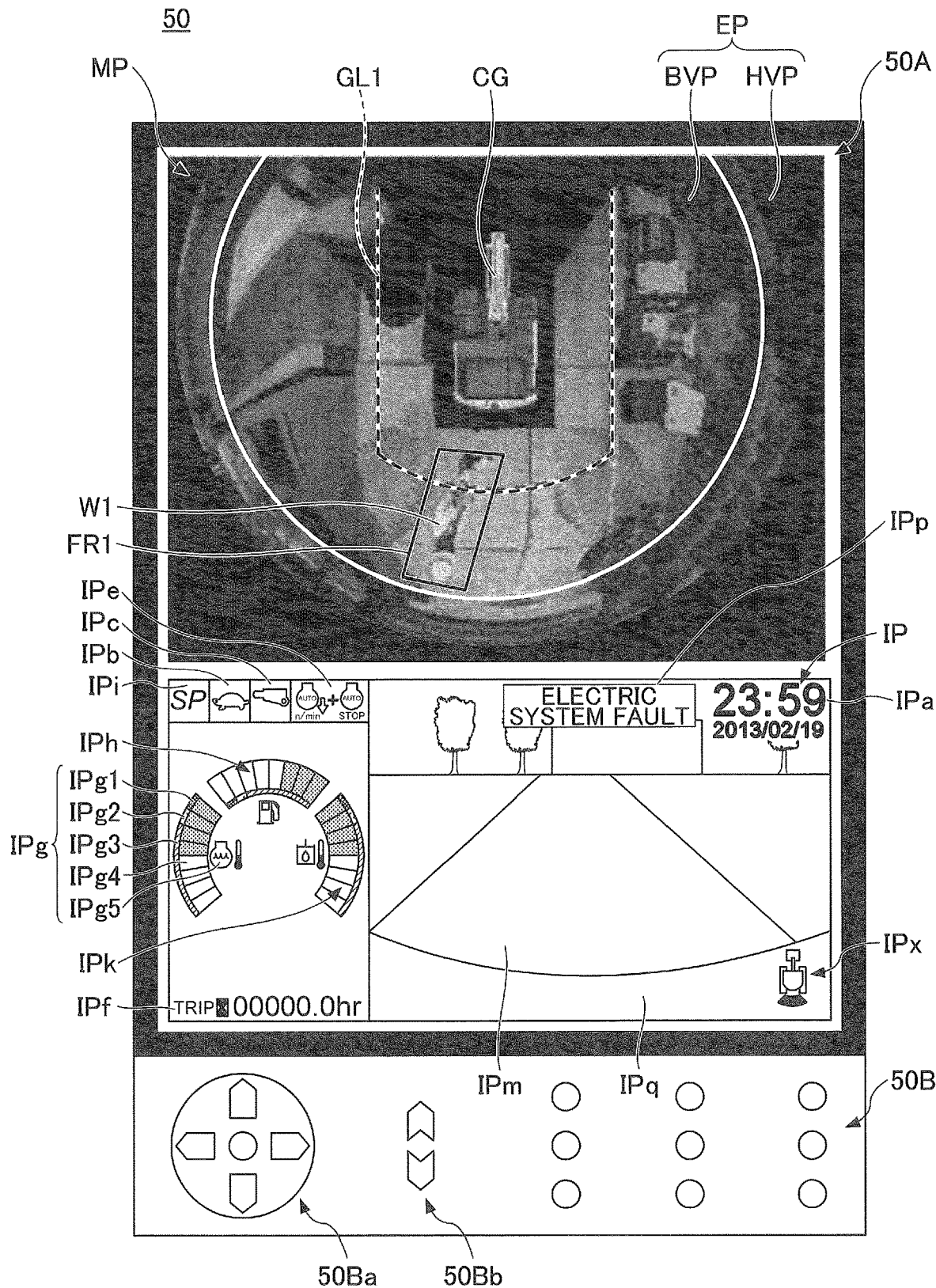
FIG. 5 is a drawing illustrating an example of a monitoring image displayed on a display device.

For example, FIG. 5 is a drawing illustrating an example of a monitoring image MP displayed on the display device 50.

As illustrated in FIG. 5, the display device 50 includes a display unit 50A displaying various kinds of information images and a manipulation unit 50B implemented with hardware for manipulating manipulation targets (for example, manipulation button icons, a cursor, and the like) displayed in the various kinds of information images.

According to this example, the display unit 50A presents not only the monitoring image MP but also an operating information image IP presenting various kinds of information related to the operation of the shovel 500. Specifically, in the upper half of the display unit 50A, the monitoring image MP is displayed, and in the lower half, the operating information image IP is displayed.

The operating information image IP includes a date and time display area IPa, a traveling mode display area IPb, an end attachment display area IPc, an engine control status display area IPe, an engine operating time display area IPf, a coolant water temperature display area IPg, a remaining fuel amount display area IPh, a rotational speed mode display area IPi, a hydraulic oil temperature display area IPk, a camera image display area IPm, an alarm display area IPp, and an orientation indicator icon IPx.

The date and time display area IPa is an area for displaying a current date and time. According to this example, digital display is employed to show that the date is Feb. 19, 2013 and the time is 23:59.

The traveling mode display area IPb is an area for displaying an image for a current traveling mode. The traveling mode represents the setting of traveling hydraulic motors using a variable displacement pump. Specifically, the traveling mode includes a low-speed mode and a high-speed mode. A "turtle"-shaped mark is displayed for the low-speed mode, and a "rabbit"-shaped mark is displayed for the high-speed mode. According to this example, the "turtle"-shaped mark is displayed to make it possible for the operator to recognize that the low-speed mode is set.

The end attachment display area IPc is an area for displaying an image representing a currently attached end attachment. End attachments attachable to the shovel include various end attachments such as a rock drill, a grapple, and a lifting magnet in addition to the bucket 6. The end attachment display area IPc displays, for example, marks shaped like these end attachments. According to this example, a rock drill-shaped mark is displayed to make it possible for the operator to recognize that a rock drill is attached as an end attachment.

The engine control status display area IPe is an area for displaying an image for the status of control of an engine. According to this example, the operator can recognize that "automatic deceleration and automatic stop mode" is selected as the status of control of the engine. The "automatic deceleration and automatic stop mode" means the status of control to automatically reduce the engine rotational speed and further to automatically stop the engine in accordance with the duration of the low-load state of the engine. Other statuses of control of the engine include "automatic deceleration mode," "automatic stop mode," and "manual deceleration mode."

The engine operating time display area IPf is an area for displaying an image for the cumulative operating time of the engine. According to this example, a value using a unit "hr (hour)" is displayed.

The coolant water temperature display area IPg is an area for displaying an image for the current temperature condition of engine coolant water. According to this example, a bar graph that represents the temperature condition of the engine coolant water is displayed. The temperature of the engine coolant water is displayed based on the output data of a water temperature sensor attached to the engine.

Specifically, the coolant water temperature display area IPg includes an abnormal range indicator IPg1, a caution range indicator IPg2, a normal range indicator IPg3, a segment indicator IPg4, and an icon indicator IPg5.

The abnormal range indicator IPg1, the caution range indicator IPg2, and the normal range indicator IPg3 are indicators for notifying the operator that the temperature of the engine coolant water is abnormally high, requires attention, and is normal, respectively. The segment indicator IPg4 is an indicator for notifying the operator of the level of the temperature of the engine coolant water. The icon indicator IPg5 is an icon, such as a graphic symbol, indicating that the abnormal range indicator IPg1, the caution range indicator IPg2, the normal range indicator IPg3, and the segment indicator IPg4 are indicators pertaining to the temperature of the engine coolant water.

The icon indicator IPg5 may alternatively be character information indicating that the indicators are related to the temperature of the engine coolant water.

According to this example, the segment indicator IPg4 is composed of eight segments that are individually controlled to light up or darken, and the number of lighted segments increases as the coolant water temperature increases. According to this example, four segments are lighted. The segment indicator IPg4 is so displayed as to form part (an arc) of a predetermined circle, such that the length of the arc increases or decreases as the temperature of the engine coolant water increases or decreases. While the temperatures represented by the individual segments are equal in width according to this example, the width of temperatures may differ from segment to segment.

Furthermore, according to this example, the abnormal range indicator IPg1, the caution range indicator IPg2, and the normal range indicator IPg3 are arc-shaped graphics successively arranged along a direction in which the segment indicator IPg4 extends or shrinks (a circumferential direction of the predetermined circle), and are displayed in red, yellow, and green, respectively. According to the segment indicator IPg4, the first (lowest) through sixth segments belong to the normal range, the seventh segment belongs to the caution range, and the eighth (highest) segment belongs to the abnormal range.

Instead of displaying the abnormal range indicator IPg1, the caution range indicator IPg2, and the normal range indicator IPg3 in arc-shaped graphics, the coolant water temperature display area IPg may display characters, symbols, etc., indicating an abnormal level, a caution level, and a normal level at their respective boundaries.

The above-described configuration including an abnormal range indicator, a caution range indicator, a normal range indicator, a segment indicator, and an icon indicator may likewise be adopted also for the remaining fuel amount display area IPh and the hydraulic oil temperature display area IPk. Instead of displaying arc-shaped graphics representing an abnormal range, a caution range, and a normal range, the remaining fuel amount display area IPh may display a letter "F" or a black circle (a circle filled with black), indicating "Full (filled-up state)", a letter "E" or a white circle (an unfilled circle), indicating "Empty (empty state)", etc., at their respective boundaries.

The remaining fuel amount display area IPh is an area for displaying an image for the state of the remaining amount of fuel stored in a fuel tank. According to this example, a bar graph representing the current state of the remaining amount of fuel is displayed. The remaining amount of fuel in the remaining fuel amount display area IPh is displayed based on the output data of a remaining fuel amount sensor in the fuel tank.

The rotational speed mode display area IPi is an area for displaying a current rotational speed mode. The rotational speed mode includes, for example, the above-described four modes of SP mode, H mode, A mode, and idling mode. According to this example, a symbol "SP" representing SP mode is displayed.

The hydraulic oil temperature display area IPk is an area for displaying an image for the temperature condition of hydraulic oil in a hydraulic oil tank. According to this example, a bar graph indicating the temperature condition of hydraulic oil is displayed. The temperature of hydraulic oil in the hydraulic oil temperature display area IPk is displayed based on the output data of an oil temperature sensor in the hydraulic oil tank.

The coolant water temperature display area IPg, the remaining fuel amount display area IPh, and the hydraulic oil temperature display area IPk may adopt needle display in lieu of bar graph display.

The camera image display area IPm is an area for directly displaying a captured image (a through-the-lens image) of at least one of the camera 40B, the camera 40L, and the camera 40R. This makes it possible for the operator to view a captured image (a through-the-lens image) captured by the image-capturing device 40 directly within the operating information image IP, in addition to the monitoring image MP.

For example, while the shovel is in operation, a captured image captured by the camera 40B may be constantly displayed in the camera image display area IPm. In this case, the captured image (the through-the-lens image) of the camera 40B in the camera image display area IPm is desirably displayed as a mirror image.

Furthermore, according to this example, the camera image display area IPm occupies an area of approximately two thirds on the right side of the operating information image IP. This is for increasing overall visibility by displaying the remaining fuel amount display area IPh, etc., closer to the operator seat (operator) and displaying the camera image display area IPm farther from the operator seat (operator) in an environment where the display device 50 is installed on the front right of the operator seat. The size and layout of display areas in the operating information image IP, however, may be changed as needed.

Furthermore, with respect to a captured image displayed in the camera image display area IPm, the image-capturing device 40 that captures an image to be displayed may be switched, or the captured image may be enlarged or reduced in size, in accordance with a touch operation on the touchscreen display unit 50A or an operation on the manipulation unit 50B. For example, the operator may be able to switch the image-capturing device 40 (the camera 40B, the camera 40L, or the camera 40R) that captures a captured image (a through-the-lens image) to be displayed in the camera image display area IPm by performing the operation of specifying a left or right direction with a directional pad 50Ba of the manipulation unit 50B. Furthermore, the operator may be able to zoom in on and zoom out of a captured image by pressing a button specifying an upward direction and a button specifying a downward direction, respectively, of scaling buttons 50Bb. In this case, the operator may touch any position in the camera image display area IPm on the touchscreen display unit 50A to specify the position, and zoom in or out around the Specified position as the center. Furthermore, the operator may be able to move a cursor with the directional pad 50Ba and zoom in or out around the cursor position at the center.

The alarm display area IPp is an area for displaying an alarm. According to this example, a warning message indicating the occurrence of failure in an electrical system is displayed over a through-the-lens image. Furthermore, according to this example, when a lever operation is performed with no captured image captured by the camera 40B being displayed in the camera image display area IPm, an alarm giving a warning to that effect is displayed in the alarm display area IPp. When there is no alarm to be displayed, a through-the-lens image is displayed as is in the alarm display area IPp.

The orientation indicator icon IPx is an icon that represents the relative relationship between the orientation of the image-capturing device 40 that has captured a captured image (a through-the-lens image) that is displayed in the operating information image IP and the orientation of the shovel (the attachment of the upper turning body 3). According to this example, the orientation indicator icon IPx indicating that the image-capturing device 40 that captures a camera image displayed in the camera image display area IPm is the 40B is displayed in the lower right corner of the camera image display area IPm.

The orientation indicator icon IPx may alternatively be displayed at a position other than the lower right corner, such as the lower center, the lower left corner, the upper right corner, or the upper left corner, of the camera image display area IPm, or be displayed outside the camera image display area IPm.

The operating information image IP may exclude one or more of the above-described display areas IPa through IPk or may include a display area other than those described above. For example, the operating information image IP may include an exhaust gas filter condition display area for displaying the degree of clogging of an exhaust gas filter (for example, a diesel particulate filter [DPF]). Specifically, the exhaust gas filter condition display area may display a bar graph that represents the ratio of the current usage time of the exhaust gas filter to its maximum allowable usage time. Furthermore, the operating information image IP may exclude the display of the temperature condition of hydraulic oil or may exclude the display of the temperature condition of hydraulic oil and the temperature condition of coolant water.

Furthermore, the camera image display area IPm includes, at its bottom, a cover image IPq serving as a vehicle body image that is an image of the upper edge of the back end of a cover 3a of the upper turning body 3. Because of this, the operator has a better sense of distance between an object displayed in the camera image display area IPm and the shovel. Furthermore, according to this embodiment, the orientation indicator icon IPx is displayed over the cover image IPq in order to keep the same background color of the orientation indicator icon IPx to increase its visibility and also to prevent the indicator icon IPx from hiding part of a camera image that is desired to be seen. The orientation indicator icon IPx may be displayed outside the camera image display area IPm.

Furthermore, as illustrated in FIG. 5, the monitoring image MP including a shovel image CG and a surroundings image EP placed along the periphery of the shovel image CG is displayed in the upper-half laterally elongated rectangular screen (for example, a screen of an aspect ratio of 4:3) of the display unit 50A of the display device 50 as described above. This makes it possible for the operator to appropriately understand the positional relationship between a monitoring target (i.e., a person) shown in the surroundings image EP and the shovel 500.

The surroundings image EP according to this example is a viewpoint-transformed image that is a combination of a bird's eye view image BVP showing the surroundings area adjacent to the shovel 500 as seen from above and a horizontal image HVP, placed along the periphery of the bird's eye view image BVP, showing the surroundings area as seen horizontally from the shovel 500. A surroundings image, i.e., a viewpoint-transformed image, is acquired by projecting respective captured images of the camera 40B, the camera 40L, and the camera 40R onto a space model and re-projecting the projected images projected on the space model onto a different two-dimensional plane. The space model is an object onto which a captured image is projected in a virtual space, and is composed of one or more plane surfaces or curved surfaces that include a plane surface or a curved surface different from a surface in which the captured image is positioned.

In addition, a guideline LN1 is superimposed and displayed on the monitoring image MP. The guideline LN1 indicates positions where the distance D from the shovel 500 is a predetermined distance D2 (≤D1). Accordingly, in a case where a monitoring target (i.e., a person) appears in the surroundings image, the operator and the like can find how far the monitoring target is from the shovel 500.

In this example, the surroundings image EP of the monitoring image MP includes a person who is a monitoring target (a worker W1). The worker W1 in the monitoring area, included in the surroundings image EP, is emphasized by being enclosed with a thick frame FR1. Accordingly, an alarm (notification) indicating that the monitoring target is in the monitoring area can be given to the operator.

Back to FIG. 3, in a case where the detection unit 301 detects a monitoring target (i.e., a person) in the monitoring area, i.e., where the distance D from the shovel 500 is within the predetermined distance D1, the alarm output unit 303 (an example of a control unit) outputs an alarm to the inside of the cab 10, i.e., to the operator. Accordingly, the surroundings monitoring apparatus 100 can allow the operator to notice that a monitoring target (i.e., a person) has entered the monitoring area surrounding the shovel 500, and prompt the operator to confirm the safety situation in the area surrounding the shovel 500.

For example, the alarm output unit 303 outputs an alarm by an auditory method, i.e., by sound. Specifically, the alarm output unit 303 outputs a control instruction to the audio output device 52 to cause the audio output device 52 to output a warning sound.

In accordance with various kinds of conditions, the alarm output unit 303 may vary the pitch, sound pressure, tone, and the like of the warning sound, and the sound output interval and the like in a case where the warning sound (for example, a buzzer sound) is output periodically. For example, the alarm output unit 303 may change the pitch, sound pressure, tone, sound output interval, and the like of the warning sound, in accordance with the relative position of the monitoring target detected by the detection unit 301 with reference to the shovel 500. Specifically, the alarm output unit 303 may differentiate at least one of the pitch, sound pressure, tone, sound output interval, and the like of the warning sound, between the case where a monitoring target relatively close to the shovel 500 is detected and the case where a monitoring target relatively far from the shovel 500 is detected. In this case, the surroundings monitoring apparatus 100 allows the operator and the like to find the positional relationship with (i.e., the degree of closeness to) the shovel 500 by the difference in the warning sound. This is also applicable to the following case where the external notification device 74 is used.

For example, the alarm output unit 303 outputs an alarm by a visual method. Specifically, the alarm output unit 303 transmits an alarm request to the display control unit 302. As a result, in response to an alarm request, the display control unit 302 applies emphasis process such as encircling, with a thick frame, a person who is a monitoring target included in the surroundings image EP of the monitoring image MP displayed on the display device 50 (see FIG. 4), and the display device 50 can output an alarm for the operator.

It should be noted that the alarm output unit 303 may output an alarm by a tactile method. Specifically, for example, the alarm output unit 303 may output a control instruction to a vibration generation device (vibrator) provided in the operator's seat and output a tactile alarm for the operator by vibrating the operator's seat.

In a case where the alarm output unit 303 outputs an alarm, the alarm output unit 303 notifies, to the outside of the shovel 500, that an alarm is output from the shovel 500.

For example, in a case where the alarm output unit 303 is to output an alarm, the alarm output unit 303 controls the external notification device 74 (an example of an external notification unit and a notification unit) to notify, toward the surroundings of the shovel 500, that an alarm is output from the shovel 500 by an auditory or visual method. Therefore, the surroundings monitoring apparatus 100 allows a worker, a supervisor, and the like working in the area surrounding the shovel 500 and a manager and the like in a site office located relatively close to the shovel 500 to recognize that an alarm is output from the shovel 500.

It should be noted that the alarm output unit 303 may notify that an alarm is output from the shovel 500 by a tactile method. Specifically, the alarm output unit 303 transmits, via the communication device 72 (an example of an external notification unit), a radio signal (a signal for the RF communication and the BT communication) according to a predetermined communication standard for activating a vibrator function toward a predetermined device with a vibrator function (for example, a management terminal 700 and the like to be described later) carried by a worker, a supervisor, and the like working in the area surrounding the shovel 500, and a manager and the like of a site office and the management server 900. In this case, the predetermined device carried by the worker and the like, and therefore, the shovel 500 can notify, to the workers and the like in the surrounding, that an alarm is output from the shovel 500.

For example, in a case where the alarm output unit 303 outputs an alarm, the alarm output unit 303 controls the communication device 72 (an example of an external notification unit) to transmit, to the external device 600, a notification (hereinafter referred to as "alarm output notification") indicating that an alarm is output from the shovel 500. Therefore, the surroundings monitoring apparatus 100 allows the external device 600 for determining whether to permit an alarm cancellation and the user of the external device 600 (for example, workers and a supervisor in the area surrounding the shovel 500, a site foreman in the site office, the manager of the management server 900, and the like) to recognize that an alarm is output from the shovel 500. In a case where the alarm output unit 303 outputs an alarm, the alarm output unit 303 may control the communication device 72 to transmit an alarm output notification to an e-mail address of the user of the external device 600 registered in advance or an account of a predetermined social networking service (SNS). In this case, the surroundings monitoring apparatus 100 allows the user of the external device 600 to recognize that an alarm is output from the shovel 500.

In the cab 10, a dedicated input unit may be provided (i.e., an example of an external notification intention input unit. The dedicated input unit is, for example, a manipulation unit such as a button switch and the like for inputting an intention by manipulation; and a camera, a gaze tracking sensor, and the like for inputting an intention by a predetermined gesture, pose, gaze movement, and the like) to notify, to the outside of the shovel 500, that an alarm is output from the shovel 500 on the basis of an intention of the operator and the like. In this case, in a case where an intention is input to the dedicated input unit, a notification to the effect that an alarm is output from the shovel 500 is transmitted to the outside of the shovel 500 via the external notification device 74 or the communication device 72.

In a case where, as described later, the determination unit 307 determines that the operator performs a surroundings situation confirmation operation and that the cancellation switch 60 is manipulated by the operator, the alarm output unit 303 cancels the output of the alarm, i.e., stops the alarm that is being output. Therefore, the surroundings monitoring apparatus 100 can cancel the output of the alarm after the operator appropriately confirms the safety situation in the area surrounding the shovel 500. Therefore, even when the operator manipulates the cancellation switch 60 only as a formality without confirming the surroundings situation of the shovel 500, the alarm is less likely to be cancelled, and the safety of the work site of the shovel 500 can be improved.

In a case where, as described later, the determination unit 307 determines that cancellation of the alarm is permitted by the outside of the shovel 500 and that the cancellation switch 60 is manipulated by the operator, the alarm output unit 303 cancels the output of the alarm, i.e., stops the alarm that is being output. Therefore, the surroundings monitoring apparatus 100 can cancel the output of the alarm while, at the outside of the shovel 500, the alarm cancellation is appropriately permitted on the basis of the confirmation of the safety situation in the area surrounding the shovel 500. Therefore, even when the operator manipulates the cancellation switch 60 only as a formality without confirming the surroundings situation of the shovel 500, the alarm is less likely to be cancelled, and the safety of the work site of the shovel 500 can be improved.

In a case where the detection unit 301 detects a person in the monitoring area, the operation restriction unit 304 (an example of a control unit) restricts an operation of the operation element (the lower traveling body 1, the upper turning body 3, the boom 4, the arm 5, the bucket 6, and the like) of the shovel 500. For example, the operation restriction unit 304 transmits an ON signal to the gate lock valve 54 as an instruction signal, so that the gate lock valve 54 causes the pilot line to be in non-communication state. As a result, a pilot pump (not illustrated) no longer provides a hydraulic oil (pilot pressure) to manipulation device (not illustrated) manipulating the operation element of the shovel 500, so that even when the operator manipulates the manipulation device, the operation element of the shovel 500 can be restricted from operating. Therefore, even if a person enters the monitoring area in proximity to the shovel 500, the operation of the shovel 500 is restricted, and the shovel 500 and the person are less likely to collide with each other, and as a result, the safety in the area surrounding the shovel 500 can be maintained.

For example, a pressure reducing valve for reducing the secondary-side pilot pressure that is output from the manipulation device may be provided, and the operation restriction unit 304 may control the pressure reducing valve instead of the gate lock valve 54. In this case, the pressure reducing valve can disable the manipulation of the manipulation device by the operator by reducing the secondary-side pilot pressure that is output from the manipulation device to a pressure value equal to or less than a value where the manipulation amount is zero. Therefore, the operation restriction unit 304 can restrict the operation of the operation element of the shovel 500 by controlling the pressure reducing valve. By controlling the pressure reducing valve, the operation restriction unit 304 may restrict the operation of the shovel 500 so as to reduce the operations of various kinds of operation elements in response to manipulation performed by the operator at a moderate level as compared with normally performed manipulation, without stopping the operation elements of the shovel 500.

In a case where the operation restriction unit 304 restricts the operation of the shovel 500, the operation restriction unit 304 notifies, to the outside of the shovel 500, that operation of the shovel 500 is restricted.

For example, in a case where the operation restriction unit 304 restricts the operation of the shovel 500, the operation restriction unit 304 controls the external notification device 74 (an example of an external notification unit and a notification unit) to notify, to the surroundings of the shovel 500, that operation of the shovel 500 is restricted. Therefore, the surroundings monitoring apparatus 100 allows a worker, a supervisor, and the like working in the area surrounding the shovel 500, and a manager and the like in a site office located relatively close to the shovel 500 to recognize that operation of the shovel 500 is restricted.

In a manner similar to the alarm output unit 303, the operation restriction unit 304 may notify that operation of the shovel 500 is restricted by a tactile method.

For example, in a case where the operation restriction unit 304 restricts the operation of the shovel 500, the operation restriction unit 304 controls the communication device 72 (an example of an external notification unit and a notification unit) to transmit, to the external device 600, a notification indicating that operation of the shovel 500 is restricted (hereinafter referred to as "operation restriction notification"). Therefore, the surroundings monitoring apparatus 100 allows the external device 600 for determining whether to permit the restriction of the operation cancellation and the user of the external device 600 to recognize that operation of the shovel 500 is restricted. In a case where the operation restriction unit 304 restricts the operation of the shovel 500, the operation restriction unit 304 may control the communication device 72 to transmit an alarm output notification to an e-mail address of the user of the external device 600 registered in advance or an account of a predetermined SNS. In this case, the surroundings monitoring apparatus 100 allows the user of the external device 600 to recognize that operation of the shovel 500 is restricted.

In a manner similar to the alarm, in the cab 10, a dedicated input unit may be provided (i.e., an example of an external notification intention input unit) to notify, to the outside of the shovel 500, that operation of the shovel 500 is restricted on the basis of an intention of the operator and the like. Also, the same dedicated input unit may serve as not only the dedicated input unit for the alarm but also the dedicated input unit for the restriction of the operation. In this case, in a case where an intention is input to the dedicated input unit, a notification to the effect that operation of the shovel 500 is restricted is transmitted to the outside of the shovel 500 via the external notification device 74 and the communication device 72.

In a case where, as described later, the determination unit 307 determines that the operator performs a surroundings situation confirmation operation and that the cancellation switch 60 is manipulated by the operator, the operation restriction unit 304 cancels restriction of operation of the shovel 500. Therefore, the surroundings monitoring apparatus 100 can cancel the restriction of operation of the shovel 500 after the operator appropriately confirms the safety situation in the area surrounding the shovel 500. Therefore, even when the operator manipulates the cancellation switch 60 only as a formality without confirming the surroundings situation of the shovel 500, the restriction of operation of the shovel 500 is less likely to be cancelled, and the safety of the work site of the shovel 500 can be improved.

In a case where, as described later, the determination unit 307 determines that cancellation of the restriction of operation of the shovel 500 is permitted by the outside of the shovel 500 and that the cancellation switch 60 is manipulated by the operator, the operation restriction unit 304 cancels the restriction of operation of the shovel 500. Therefore, the surroundings monitoring apparatus 100 can cancel the restriction of operation of the shovel 500 while, at the outside of the shovel 500, the restriction of the operation cancellation is appropriately permitted on the basis of the confirmation of the safety situation in the area surrounding the shovel 500. Therefore, even when the operator manipulates the cancellation switch 60 only as a formality without confirming the surroundings situation of the shovel 500, the restriction of operation of the shovel 500 is less likely to be cancelled, and the safety of the work site of the shovel 500 can be improved.

In a case where the operator manipulates the cancellation switch 60, the cancellation request notification unit 305 may control the communication device 72 to transmit a cancellation request notification to an e-mail address of the user of the external device 600 registered in advance or an account of a predetermined SNS. In this case, the surroundings monitoring apparatus 100 can request the external device 600 and the user of the external device 600 to actively permit cancellation of the alarm or the restriction of operation of the shovel 500.

In a case where the output of the alarm or the restriction of operation of the shovel 500 is started, the cancellation request notification may be transmitted to the external device 600 and the e-mail address and the like of the user of the external device 600, irrespective of whether the operator manipulates the cancellation switch 60. Since, as described above, the alarm output notification or the operation restriction notification is transmitted to the external device 600 and the like before the cancellation request notification is transmitted, the transmission of the cancellation request notification may be omitted. Specifically, the cancellation request notification unit 305 may be omitted. In the cab 10, separately from the cancellation switch 60, a dedicated input unit may be provided (i.e., an example of a cancellation request intention input unit and an input unit. The dedicated input unit is, for example, a manipulation unit such as a button switch and the like for inputting an intention by manipulation; and a camera, a gaze tracking sensor, and the like for inputting an intention by a predetermined gesture, pose, gaze movement, and the like) to transmit, to the external device 600 and the e-mail address and the like of the user of the external device 600, the cancellation request notification on the basis of an intention of the operator and the like. In this case, in a case where an intention is input to the dedicated input unit, the cancellation request notification may be transmitted to the external device 600 and the e-mail address and the like of the user of the external device 600.

In a case where the alarm is output or operation of the shovel 500 is restricted, the surroundings situation information transmission unit 306 transmits, to the external device 600, information about the situation in the area surrounding the shovel 500 (hereinafter referred to as "surroundings situation information") with regular intervals. In a case where the alarm is output or operation of the shovel 500 is restricted, the surroundings situation information transmission unit 306 may automatically transmit the surroundings situation information to the external device 600, or may transmit the surroundings situation information to the external device 600 in response to a request signal received from the external device 600 by the communication device 72.

The surroundings situation information may include, for example, captured images of the area surrounding the shovel 500 captured by the image-capturing device 40. The surroundings situation information may include, for example, information about the detection result of the monitoring target detected by the detection unit 301, the position of the detected monitoring target, and the like.

The determination unit 307 determines whether the operator has confirmed the safety situation in the area surrounding the shovel 500, i.e., whether the surroundings situation confirmation operation has been performed.

For example, the determination unit 307 determines whether the operator has performed the surroundings situation confirmation operation, on the basis of the detection result of the confirmation operation state detection unit 70. Specifically, as described above, the determination unit 307 may determine whether the operator has performed the surroundings situation confirmation operation on the basis of a motion of gaze of the operator detected by a camera or a gaze tracking sensor serving as the confirmation operation state detection unit 70. Specifically, in a case where the operator is determined to have gazed at a mirror (for example, a rear view mirror) for indirectly seeing the surroundings of the shovel 500, or at a through image or a monitoring image displayed on the display device 50, the determination unit 307 may determine that the operator has performed the surroundings situation confirmation operation.

As described above, the determination unit 307 may determine whether the operator has performed the surroundings situation confirmation operation on the basis of the operator's electroencephalography detected by an electroencephalography sensor serving as the confirmation operation state detection unit 70. Specifically, for example, in a case where the operator manipulates the cancellation switch 60, the determination unit 307 may determine whether the manipulation has been performed unintentionally (reflexively) in response to the output of the alarm or the restriction of operation of the shovel 500, on the basis of the operator's electroencephalography. In a case where the manipulation is determined not to have been performed unintentionally, i.e., the manipulation is determined to have been performed intentionally, the determination unit 307 may determine that the operator has performed the surroundings situation confirmation operation.

For example, the determination unit 307 determines whether the operator has performed the surroundings situation confirmation operation, on the basis of an elapsed time since the alarm or the restriction of operation of the shovel 500 was started. Specifically, in a case where a predetermined period of time or more has elapsed since the alarm or the restriction of operation of the shovel 500 was started, the determination unit 307 determines that the operator has performed the surroundings situation confirmation operation. This is because, if a certain period of time has elapsed since the alarm or the restriction of operation of the shovel 500 was started, the operator may have had a sufficient time to confirm the situation in the surroundings and it can be deemed that the operator has performed the surroundings situation confirmation operation.

The determination unit 307 determines whether the safety situation in the area surrounding the shovel 500 is confirmed at the outside of the shovel 500 and whether cancellation of the alarm or the restriction of the operation is permitted.

For example, in a case where the communication device (an example of an acquisition unit) acquires a cancellation permission notification from the external device 600, the determination unit 307 determines that cancellation of the alarm or the restriction of the operation is permitted at the outside of the shovel 500.

For example, the determination unit 307 determines that cancellation of the alarm or the restriction of the operation is permitted at the outside of the shovel 500 in a case where the safety situation is confirmed and a worker, a supervisor, and the like at the outside of the shovel 500 gives a sign (for example, to be in a predetermined pose or give a predetermined gesture) for permitting cancellation of the alarm or the restriction of the operation. Specifically, the determination unit 307 performs a process to recognize, from the image captured by the image-capturing device 40, a predetermined third party such as the worker, the supervisor, and the like who has entered the monitoring area and triggered the alarm or the restriction of operation of the shovel 500. At this occasion, the determination unit 307 may recognize the predetermined third party on the basis of feature information (for example, identification information about color and the like of workwear, helmet, and the like) unique to the predetermined third party. Then, in a case where the recognized predetermined third party such as the worker, the supervisor, and the like is in a predetermined pose or giving a predetermined gesture, the determination unit 307 may determine that cancellation of the alarm or the restriction of the operation is permitted at the outside of the shovel 500. In other words, in a case where the determination unit 307 (an example of an acquisition unit) acquires, from the images captured by the image-capturing device 40, a captured image including a predetermined third party such as the worker, the supervisor, and the like who is in the predetermined pose or giving the predetermined gesture, the determination unit 307 may determine that cancellation of the alarm or the restriction of the operation is permitted at the outside of the shovel 500.

In a case where the shovel 500 outputs an alarm or restricts operation, the external device 600 permits cancellation of the alarm or the restriction of the operation in accordance with a predetermined condition.

The external device 600 includes a communication device 610, an information processing unit 620, a display unit 630, an audio output unit 640, and a manipulation unit 650.

The communication device 610 is any given device performing bidirectional communication with the shovel 500. The communication device 610 is in a corresponding relationship with the communication device 72 of the shovel 500 in terms of the communication method and the like, and may include, for example, the RF transceiver, the BT communication module, the mobile communication module, and the like.

The information processing unit 620 performs various kinds of control processes in the external device 600. The functions of the information processing unit 620 may be implemented by any hardware or a combination of hardware and software. For example, the information processing unit 620 is constituted mainly by a computer including a CPU, RAM, ROM, an auxiliary storage device, an RTC, various kinds of communication interfaces, and the like. The information processing unit 620 includes, for example, as function units implemented by causing the CPU to execute one or more programs stored in the ROM or the auxiliary storage device, a shovel situation notification unit 6201, a surroundings situation information acquisition unit 6202, a cancellation permission manipulation reception unit 6203, a determination unit 6204, and a cancellation permission notification unit 6205.

Under the control of the information processing unit 620, the display unit 630 displays various kinds of information images. The display unit 630 is, for example, a liquid crystal display, an organic EL display, and the like.

Under the control of the information processing unit 620, the audio output unit 640 outputs sound to the outside. The audio output unit 640 is, for example, a speaker, a buzzer, and the like.

The manipulation unit 650 receives various kinds of manipulations from the user of the external device 600. The manipulation unit 650 may be, for example, a manipulation unit implemented with hardware such as a push button and the like or may be a manipulation unit implemented with software such as a button icon and the like on a manipulation screen displayed on the touch-panel display unit 630.

The shovel situation notification unit 6201 notifies, to the user, the situation of the shovel 500 on the basis of various kinds of information received from the shovel 500 via the communication device 610.

Specifically, in a case where the shovel situation notification unit 6201 receives an alarm output notification or an operation restriction notification via the communication device 610, the shovel situation notification unit 6201 may notify, to the user of the external device 600, that an alarm is output from the shovel 500 or that operation is restricted. In this case, the external device 600 allows the user to recognize that an alarm is output from the shovel 500 or operation is restricted. This is particularly effective for a manager of a site office located relatively away from the shovel 500 and the manager and the like of the management server 900 outside of the work site who have difficulty in directly finding the situation of the shovel 500.

For example, the shovel situation notification unit 6201 may cause the display unit 630 to display that an alarm is output from the shovel 500 or that operation is restricted.

For example, the shovel situation notification unit 6201 may cause the audio output unit 640 to output sound indicating that an alarm is output from the shovel 500 or that operation is restricted.

In a case where the cancellation request notification is received via the communication device 610, the shovel situation notification unit 6201 notifies the user that a cancellation request for canceling the alarm or the restriction of the operation is received from the shovel 500. Therefore, the external device 600 can prompt the user to perform a predetermined manipulation (i.e., cancellation permission manipulation to be described later) for permitting cancellation of the alarm or the restriction of the operation on the basis of the confirmation of the safety situation in the area surrounding the shovel 500.

For example, the shovel situation notification unit 6201 may cause the display unit 630 (i.e., an example of a first notification unit) to display that a cancellation request for canceling the alarm or the restriction of the operation has been received from the shovel 500.

Alternatively, for example, the shovel situation notification unit 6201 may cause the audio output unit 640 (an example of a first notification unit) to output a sound indicating that a cancellation request for canceling the alarm or the restriction of the operation has been received from the shovel 500.

The surroundings situation information acquisition unit 6202 acquires, via the communication device 610, surroundings situation information transmitted with regular intervals from the shovel 500 in a case where the shovel 500 outputs an alarm or restricts operation.

In a case where the surroundings situation information acquisition unit 6202 receives an alarm output notification or an operation restriction notification via the communication device 610, the surroundings situation information acquisition unit 6202 may transmit, via the communication device 610, a request signal requesting the surroundings situation information to the shovel 500.

The surroundings situation information acquisition unit 6202 notifies the content of the acquired surroundings situation information to the user. Therefore, the external device 600 can prompt the user to recognize the situation in the area surrounding the shovel 500.

For example, the surroundings situation information acquisition unit 6202 may cause the display unit 630 (an example of a second notification unit) to display the content of the surroundings situation information.

Also, for example, the surroundings situation information acquisition unit 6202 may cause the audio output unit 640 (an example of a second notification unit) to output a sound related to the content of the surroundings situation information.

The cancellation permission manipulation reception unit 6203 receives a predetermined manipulation (hereinafter referred to as "cancellation permission manipulation"), performed by the user of the external device 600 with the manipulation unit 650 (an example of cancellation permission manipulation unit), for permitting cancellation of the alarm or the restriction of the operation of the shovel 500.

For example, the cancellation permission manipulation reception unit 6203 may receive a cancellation permission manipulation from the manager of the management server 900 serving as the external device 600, workers, and the like. In a case where the shovel 500 can be remote-controlled by using the external device 600 (for example, the management server 900), the cancellation permission manipulation reception unit 6203 may receive, via the external device 600, a cancellation permission manipulation from the operator and the like who remote controls the shovel 500. At this occasion, for example, the operator can confirm the circumstances in the area surrounding the shovel 500 on the basis of images of the area surrounding the shovel 500 (specifically, images captured by the image-capturing device 40 of the shovel 500 and uploaded to the management server 900) displayed on the display unit 630 of the external device 600.

In a case where the shovel 500 outputs an alarm or restricts operation, the determination unit 6204 determines whether to permit cancellation of the alarm or the restriction of the operation.

For example, the determination unit 6204 confirms the safety situation in the area surrounding the shovel 500 on the basis of the surroundings situation information acquired by the surroundings situation information acquisition unit 6202, and permits cancellation of the alarm or the restriction of the operation. Specifically, in a case where the determination unit 6204 confirms that there is no monitoring target (i.e., a person) in the monitoring area of the shovel 500 on the basis of the surroundings situation information, the determination unit 6204 may permit cancellation of the alarm or the restriction of the operation.

For example, in a case where the cancellation permission manipulation reception unit 6203 receives the cancellation permission manipulation, the determination unit 6204 permits cancellation of the alarm or the restriction of the operation.

In a case where the determination unit 6204 permits cancellation of the alarm or the restriction of the operation, the cancellation permission notification unit 6205 transmits, to the shovel 500 via the communication device 610, a notification (cancellation permission notification) of permitting cancellation of the alarm or the restriction of the operation.

[Overview of Operation of Surroundings Monitoring System]

Subsequently, overview of the surroundings monitoring system 1000 according to the present embodiment will be explained with reference to FIG. 6 (FIG. 6A to FIG. 6D).

Figure 6A:
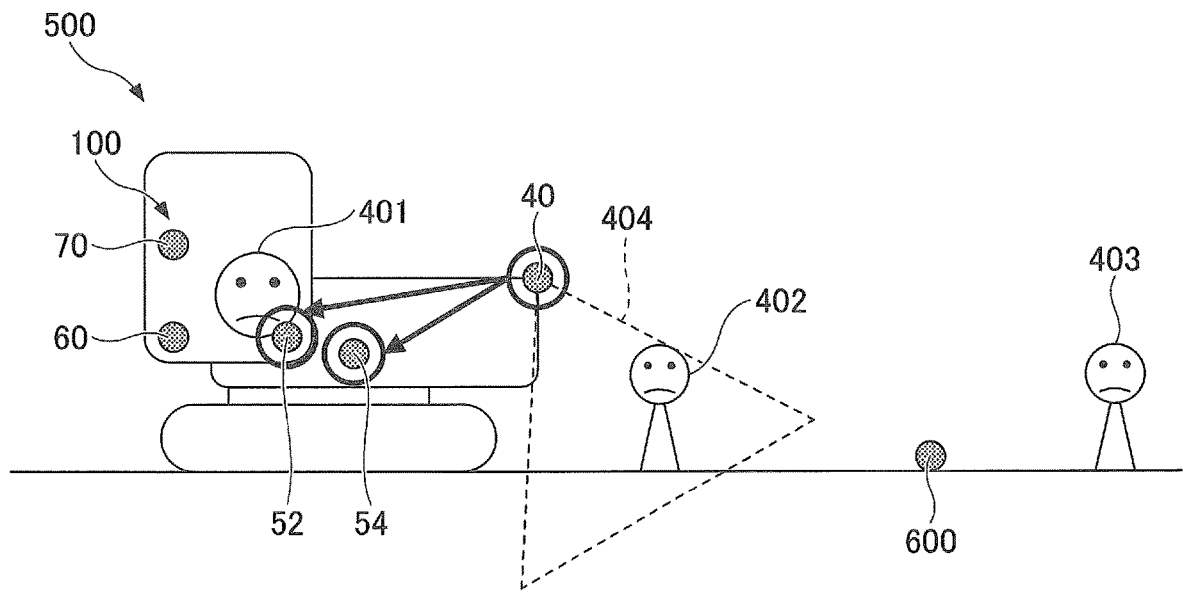
FIG. 6A is a drawing schematically explaining an example of operation of a surroundings monitoring apparatus.
Figure 6B:
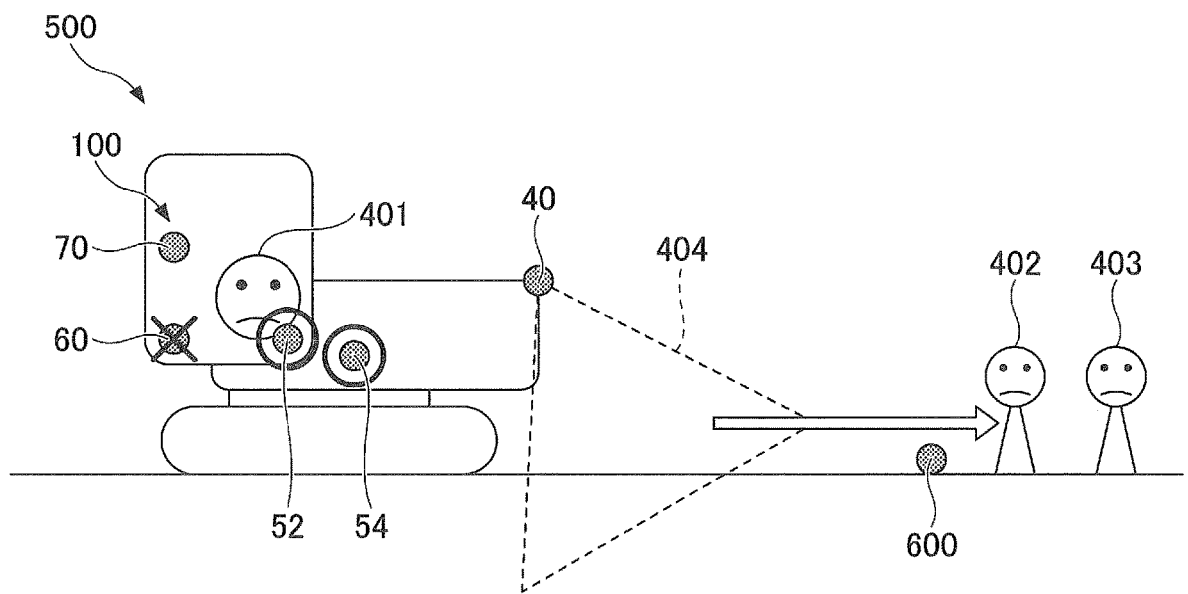
FIG. 6B is a drawing schematically explaining an example of operation of the surroundings monitoring apparatus.
Figure 6C:
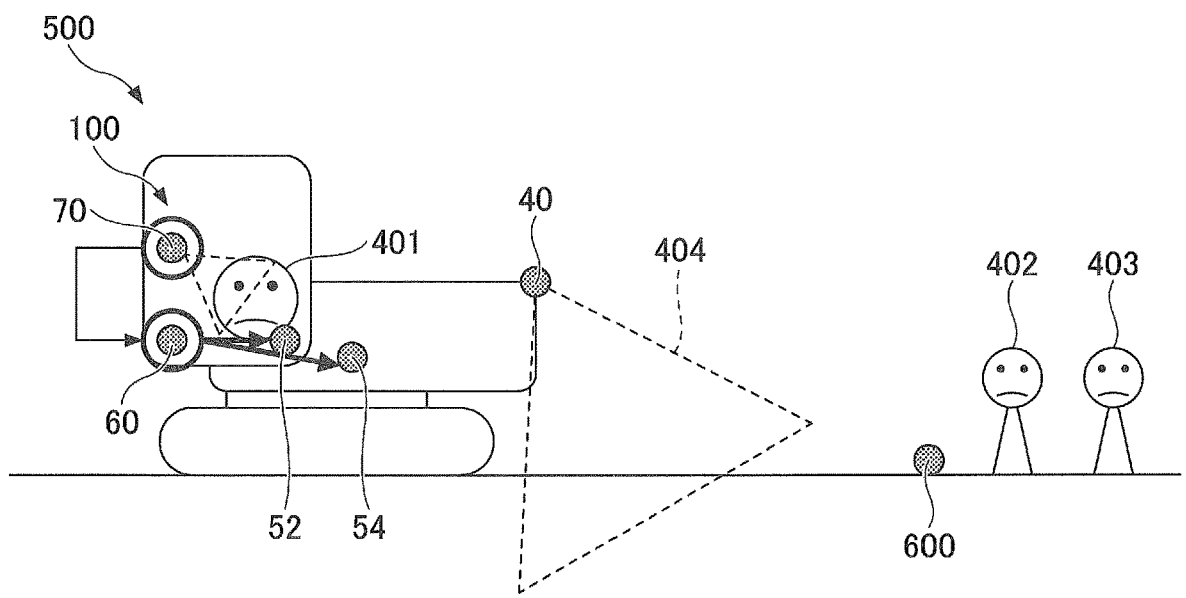
FIG. 6C is a drawing schematically explaining an example of operation of the surroundings monitoring apparatus.
Figure 6D:
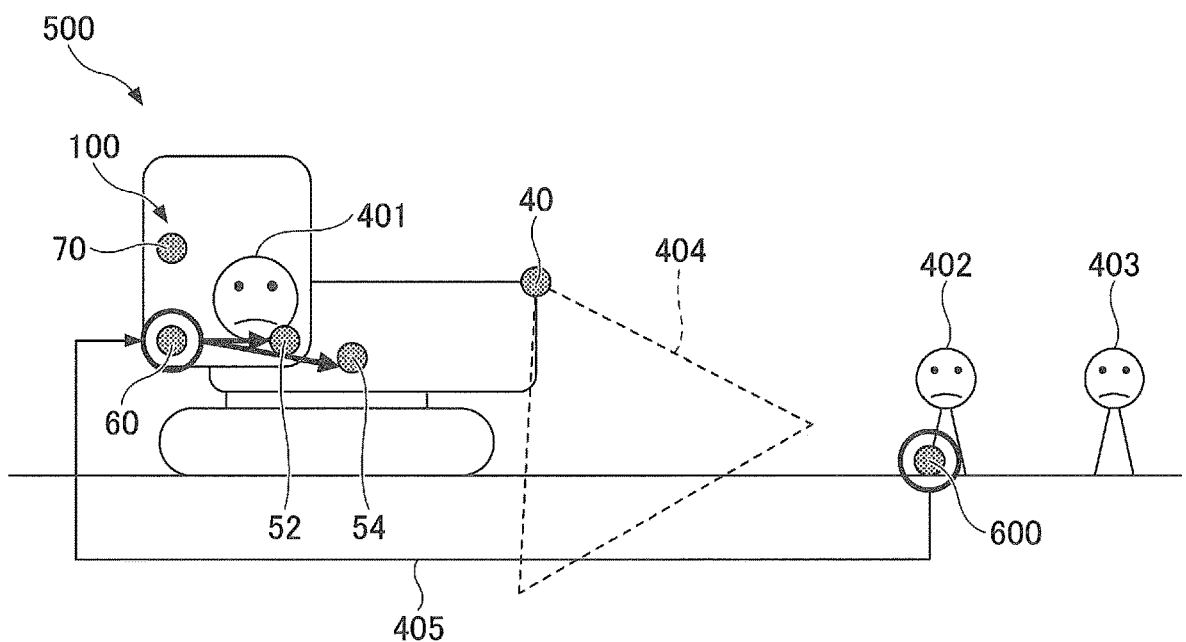
FIG. 6D is a drawing schematically explaining an example of operation of the surroundings monitoring apparatus.

FIG. 6A to FIG. 6D are drawings schematically illustrating examples of operations of the surroundings monitoring system 1000. Specifically, FIG. 6A is a drawing schematically illustrating an example of operation of the surroundings monitoring apparatus 100 in a case where a person who is a monitoring target (worker 402) enters the monitoring area 404 of the shovel 500. FIG. 6B is a drawing schematically illustrating an example of the operation of the surroundings monitoring apparatus 100 in a case where the worker 402 is evacuated out of the monitoring area 404 with respect to the situation of FIG. 6A. FIG. 6C is a drawing schematically illustrating an example of the operation of the surroundings monitoring apparatus 100 in a case where the operator 401 of the shovel 500 performs the surroundings situation confirmation operation with respect to the situation of FIG. 6B. FIG. 6D is a drawing schematically illustrating an example of the operation of the surroundings monitoring apparatus 100 in a case where the worker 402 or the supervisor 403 performs a predetermined manipulation on the external device 600 (for example, the management terminal 700 and the cancellation device 750) with respect to the situation of FIG. 6B.

In the drawings, a circular mark around the image-capturing device 40 indicates that the image-capturing device 40 is capturing an image of the monitoring target in the monitoring area 404, i.e., the detection unit 301 is detecting the monitoring target in the monitoring area 404. In the drawings, a circle mark of the audio output device 52 indicates that an alarm sound is output, i.e., the alarm output unit 303 outputs an alarm. In the drawings, a circle mark of the gate lock valve 54 indicates that the gate lock valve 54 is activated and the pilot line is in a non-communication state, i.e., the operation restriction unit 304 restricts operation of the shovel 500. In the drawings, a circle mark and a cross mark of the cancellation switch 60 indicate an enabled state and a disabled state, respectively, of the manipulation of the cancellation switch 60. In the drawings, a circle mark of the confirmation operation state detection unit 70 indicates that the surroundings situation confirmation operation performed by the operator 401 has been detected, i.e., the determination unit 307 has determined that the operator 401 has performed the surroundings situation confirmation operation. In the drawings, a circle mark of the external device 600 indicates that a predetermined manipulation has been performed with the external device 600.

As illustrated in FIG. 6A, when the surroundings monitoring apparatus 100 detects the worker 402 having entered the monitoring area 404 on the basis of the image captured by the image-capturing device 40, the surroundings monitoring apparatus 100 activates the audio output device 52 and the gate lock valve 54 to start the output of the alarm and the restriction of operation of the shovel 500. Therefore, the surroundings monitoring apparatus 100 allows the operator 401 to recognize that the monitoring target (worker 402) has entered the monitoring area 404. At this occasion, the surroundings monitoring apparatus 100 notifies, to the outside of the shovel 500, that the alarm is output and that operation of the shovel 500 is restricted. Therefore, the surroundings monitoring apparatus 100 allows the worker 402 in the monitoring area to recognize that the worker 402 is too close to the shovel 500. With the restriction of operation of the shovel 500, the surroundings monitoring apparatus 100 can prevent the shovel 500 from moving and causing interference and the like with the worker 402. Therefore, the safety of the surroundings of the shovel 500 can be improved.

As illustrated in FIG. 6B, the worker 402 having entered the monitoring area of the shovel 500 recognizes that the worker 402 is the cause for the warning and the restriction of the operation, and the worker 402 has evacuated out of the monitoring area 404 to the outside of the monitoring area 404. However, even when the worker 402 finishes evacuation to the outside of the monitoring area 404, and the worker 402 is no longer detected in the monitoring area 404, the surroundings monitoring apparatus 100 continues the output of the alarm and the restriction of operation of the shovel 500. Therefore, even if, in a situation in which the worker 402 stays in the monitoring area 404, the worker 402 in the image captured by the image-capturing device 40 appears to be similar to the background, and the worker 402 cannot be recognized (detected), the alarm and the restriction of operation of the shovel 500 can be continued. Therefore, the safety of the surroundings of the shovel 500 can be further improved.

As illustrated in FIG. 6C, when the confirmation operation state detection unit 70 such as a gaze tracking sensor and the like detects that the operator 401 moves the gaze to look at the rear view mirror or the monitoring image (surroundings image) on the display device 50, the surroundings monitoring apparatus 100 enables the cancellation manipulation performed with the cancellation switch 60. Thereafter, when the operator 401 manipulates the cancellation switch 60 while the manipulation of the cancellation switch 60 is enabled, the surroundings monitoring apparatus 100 stops the audio output device 52 and activates the gate lock valve 54 to cancel the alarm and cancel the restriction of operation of the shovel 500. Therefore, after the alarm and the restriction of operation of the shovel 500 are started, the surroundings monitoring apparatus 100 can cancel the alarm and the restriction of operation of the shovel 500 upon allowing the operator to confirm the safety situation in the area surrounding the shovel 500.

As illustrated in FIG. 6D, when the external device 600 receives a cancellation permission manipulation from the worker 402 evacuated to the outside of the monitoring area 404 or the supervisor 403 who supervises the work site at the outside of the monitoring area 404, the external device 600 transmits the cancellation permission notification 405 to the shovel 500. When the communication device 72 receives the cancellation permission notification 405 from the external device 600, the surroundings monitoring apparatus 100 determines that cancellation of the alarm or the restriction of the operation is permitted at the outside of the shovel 500. Then, the surroundings monitoring apparatus 100 stops the audio output device 52 and activates the gate lock valve to cancel the alarm and cancel the restriction of operation of the shovel 500. Therefore, the surroundings monitoring apparatus 100 can cancel the alarm and the restriction of operation of the shovel 500 upon allowing a predetermined person such as the worker 402, the supervisor 403, and the like at the outside of the shovel 500 to confirm the safety situation in the area surrounding the shovel 500.

In the situation as illustrated in FIG. 6D, as described above, the external device 600 may automatically confirm the safety situation of the shovel 500 on the basis of the surroundings situation information, and transmit the cancellation permission notification 405 to the shovel 500. In this case, the surroundings monitoring apparatus 100 can cancel the alarm and the restriction of operation of the shovel 500 upon allowing the external device 600 to confirm the safety situation in the area surrounding the shovel 500.

[Details of Operation of Surroundings Monitoring Apparatus]

Subsequently, the details of the operation of the surroundings monitoring system 1000 according to the present embodiment, i.e., a process flow, will be explained with reference to FIG. 7 to FIG. 9.

Figure 7:
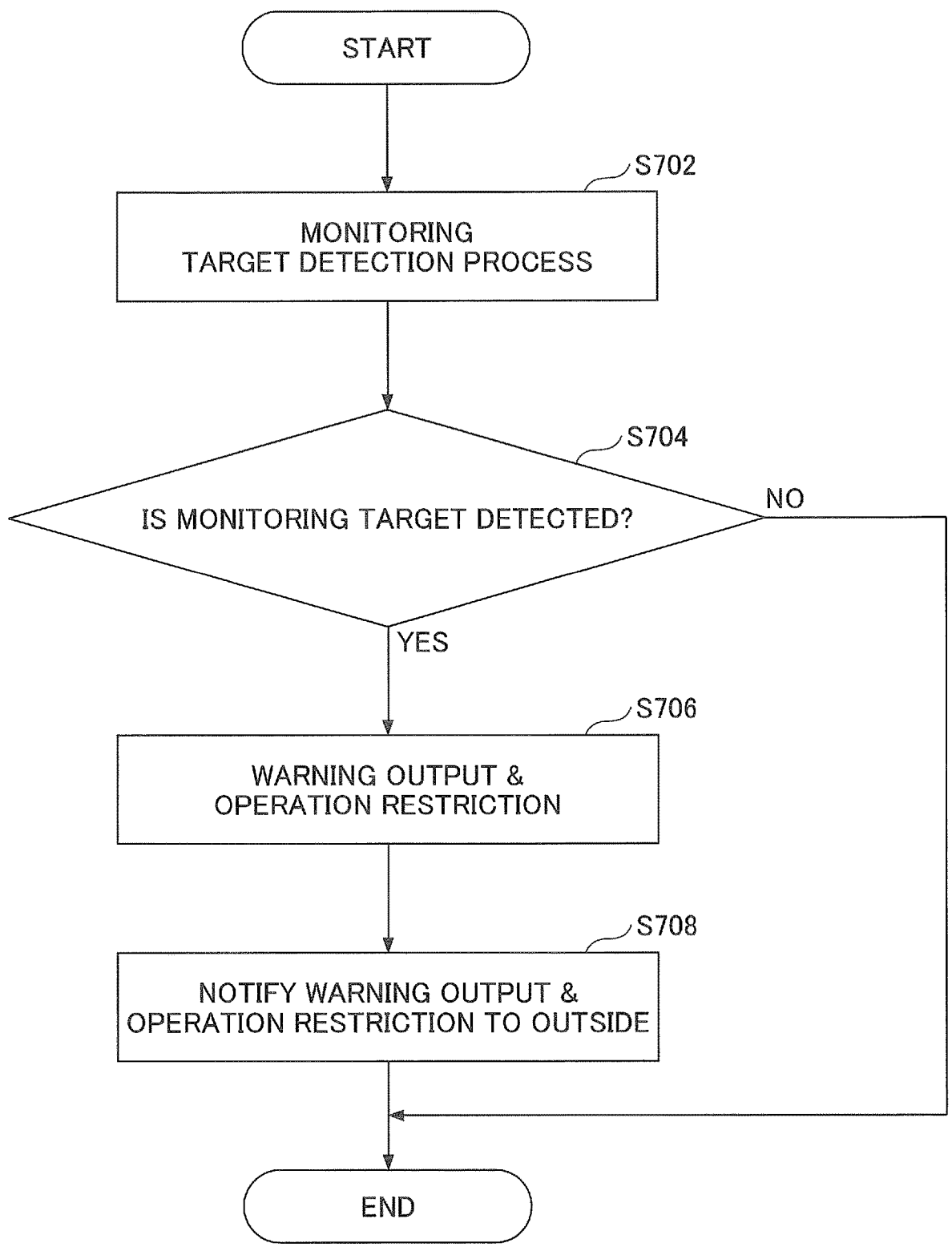
FIG. 7 is a flowchart schematically illustrating an example of monitoring process performed by the surroundings monitoring apparatus.

First, FIG. 7 is a flowchart schematically illustrating an example of process (monitor process) performed by the surroundings monitoring apparatus 100 to monitor an entry of the monitoring target into the monitoring area. The process according to this flowchart is executed repeatedly with predetermined process intervals in a case where, for example, the output of the alarm by the alarm output unit 303 and the restriction of operation of the shovel 500 by the operation restriction unit 304 are not performed during the operation of the shovel 500.

In step S702, the detection unit 301 performs a process to detect the monitoring target in the monitoring area on the basis of the captured image captured by the image-capturing device 40.

In step S704, the detection unit 301 determines whether the monitoring target is detected. In a case where the monitoring target is determined to have been detected, the detection unit 301 proceeds to step S706. In a case where the monitoring target is determined not to have been detected, the current process is terminated.

In step S706, the alarm output unit 303 outputs an alarm via the audio output device 52, and the operation restriction unit 304 activates the gate lock valve 54 to cause the pilot line to be in the non-communication, thereby performing the restriction of operation of the shovel 500.

In step S708, the alarm output unit 303 and the operation restriction unit 304 control the communication device 72 and the external notification device 74 to notify, to the outside of the shovel 500, that the alarm is output by the shovel 500 and operation is restricted, and the current process is terminated.

Figure 8:
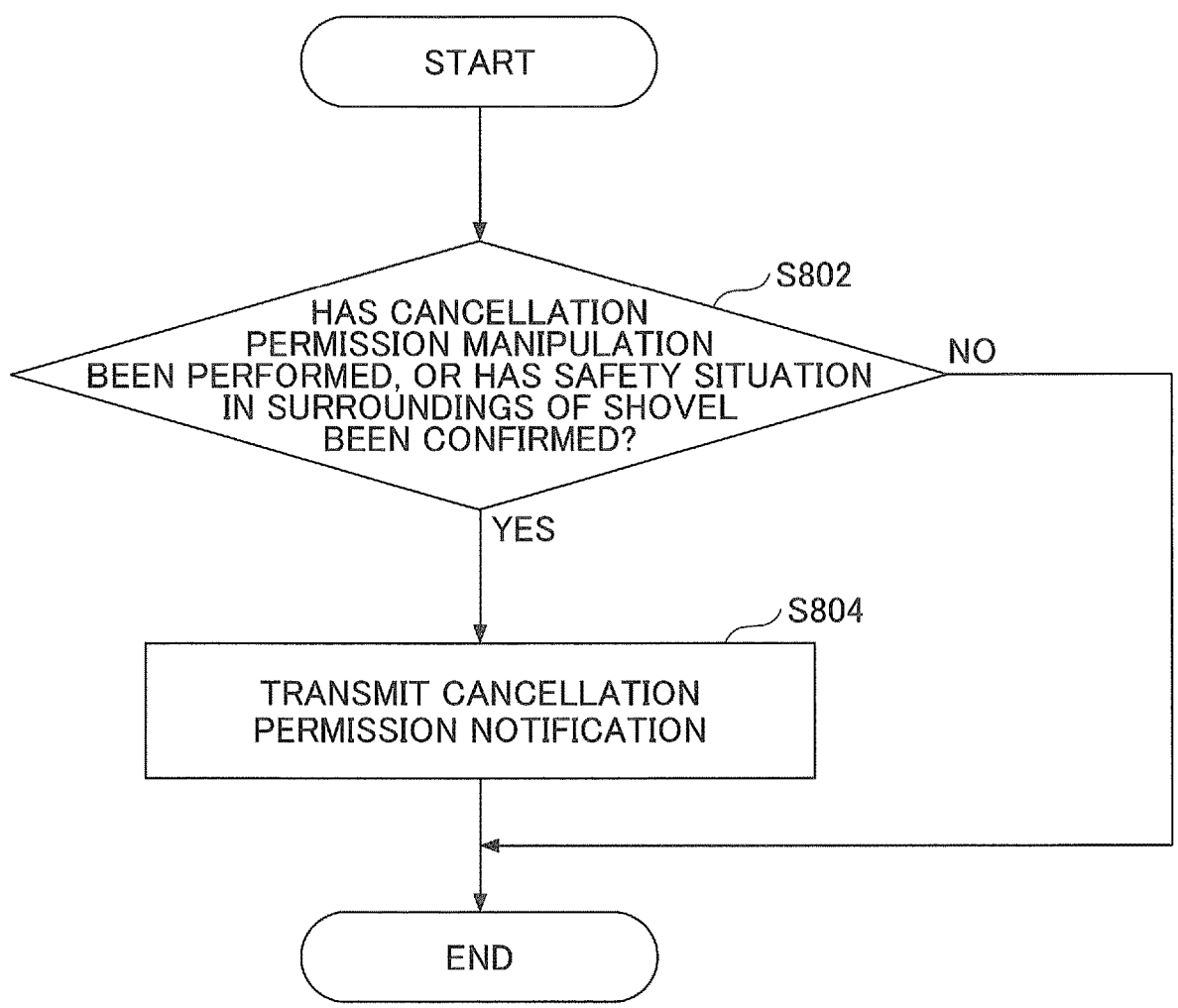
FIG. 8 is a flowchart schematically illustrating an example of cancellation permission process performed by an external device.

Subsequently, FIG. 8 is a flowchart schematically illustrating an example of process (cancellation permission process) for permitting cancellation of the warning by the external device 600 and the restriction of operation of the shovel 500. In a case where, for example, the external device 600 receives an alarm output notification and an operation restriction notification from the shovel 500, the process according to this flowchart may be executed repeatedly with predetermined control intervals until a cancellation permission notification is transmitted to the shovel 500. For example, in a case where the external device 600 receives a cancellation request notification from the shovel 500, the process according to this flowchart may be executed repeatedly with predetermined process intervals until a cancellation permission notification is transmitted to the shovel 500.

In step S802, the determination unit 6204 determines whether the cancellation permission manipulation reception unit 6203 has received a cancellation permission manipulation or whether the safety situation in the area surrounding the shovel 500 has been confirmed on the basis of the surroundings situation information. In a case where the cancellation permission manipulation reception unit 6203 receives the cancellation permission manipulation, or in a case where the safety situation in the area surrounding the shovel 500 is confirmed on the basis of the surroundings situation information, the determination unit 6204 proceeds to step S804. In cases other than the above, the current process is terminated.

In step S804, the determination unit 6204 transmits a cancellation permission notification to the shovel 500 via the communication device 610, and the current process is terminated.

It should be noted that the cancellation permission notification according to the present embodiment (this example) is an example of information about (permission of) cancellation of the alarm or the restriction of the operation of the shovel 500, and another form may be assumed.

For example, the external device 600 may transmit, to the shovel 500, information about the surroundings confirmation of the shovel 500, i.e., information for prompting confirmation of the surroundings of the shovel 500, when the alarm or the restriction of the operation is cancelled. Specifically, the external device 600 may transmit, to the shovel 500, information of which the content inquires whether the operator has confirmed the surroundings of the shovel 500. Therefore, in a case where the surroundings monitoring apparatus 100 receives the information, the surroundings monitoring apparatus 100 confirms whether the operator has performed the surroundings situation confirmation operation, and in a case where the operator has performed the surroundings situation confirmation operation, the surroundings monitoring apparatus 100 can cancel the alarm and the restriction of operation of the shovel 500. In a case where the surroundings monitoring apparatus 100 receives the information, the surroundings monitoring apparatus 100 can check with the operator whether the operator has confirmed the surroundings of the shovel 500 and give a notification to prompt the operator to confirm the surroundings of the shovel 500 by using the display device and the audio output device 52 (both of which are examples of an operator notification unit and an output device). Then, the surroundings monitoring apparatus 100 can cancel the alarm and the restriction of operation of the shovel 500, when the operator indicates that the operator has confirmed the surroundings of the shovel 500 (for example, the operator has performed a predetermined manipulation, or a camera or a gaze tracking sensor detects a predetermined gesture, pose, or gaze movement) or when the operator has performed the surroundings situation confirmation operation.

Figure 9:
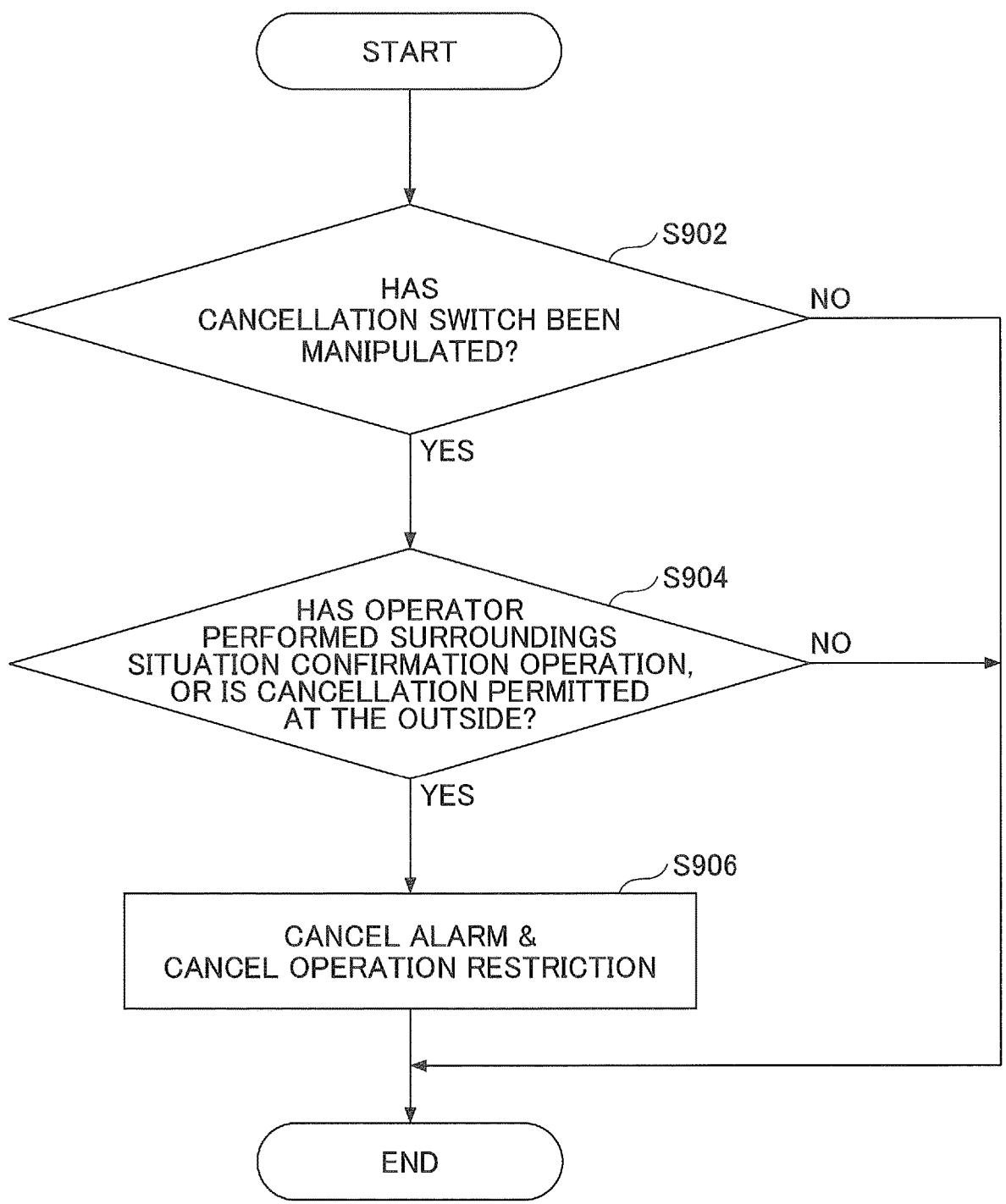
FIG. 9 is a flowchart schematically illustrating an example of cancellation process performed by the surroundings monitoring apparatus.

Subsequently, FIG. 9 is a flowchart schematically illustrating an example of a process (cancellation process) for cancelling warning and restricted operation of the shovel 500 by the surroundings monitoring apparatus 100. The process according to this flowchart is executed repeatedly with predetermined process intervals in a case where, for example, the output of the alarm by the alarm output unit 303 and the restriction of operation of the shovel 500 by the operation restriction unit 304 are not performed during the operation of the shovel 500.

In step S902, the alarm output unit 303 and the operation restriction unit 304 determine whether the cancellation switch 60 has been manipulated. In a case where the cancellation switch 60 has been manipulated, the alarm output unit 303 and the operation restriction unit 304 proceeds to step S904, and in a case where the cancellation switch 60 has not been manipulated, the current process is terminated.

It should be noted that the determination of step S902 may be performed by any one of the alarm output unit 303 and the operation restriction unit 304.

In step S904, the determination unit 307 determines whether the operator has performed the surroundings situation confirmation operation or whether cancellation of the warning and the restriction of the operation is permitted at the outside of the shovel 500. In a case where the operator is determined to have performed the surroundings situation confirmation operation or cancellation of the warning and the restriction of the operation is determined to have been permitted at the outside of the shovel 500, the determination unit 307 proceeds to step S906. In cases other than the above, the current process is terminated.

In step S906, the alarm output unit 303 cancels the alarm, and the operation restriction unit 304 cancels the restriction of operation of the shovel 500. Then, the current process is terminated.

In Patent Document 1 explained above, a manipulation unit is provided to allow cancellation of an alarm and a restriction of the operation of a work machine, and when an operator and the like manipulates the manipulation unit, the alarm and the restriction of the operation of the work machine can be cancelled. Therefore, in a case where the situation confirmation in the area surrounding the work machine is insufficient, there is a possibility that the alarm and the restriction of the operation of the work machine are cancelled.

In contrast, in this example, the external device 600 or users and the like of the external device 600, other than the shovel 500 or the operator and the like who operates the shovel 500, i.e., a device or a person corresponding to a third party that is different from the shovel 500 and the operator of the shovel 500, makes determination as to whether to cancel the alarm and the restriction of the operation of the shovel 500. Therefore, the safety of the shovel 500 is determined from eyes outside the shovel 500, which allows cancellation of the alarm and the restriction of the operation of the shovel 500 upon appropriately confirming the situation in the area surrounding the work machine. Therefore, the safety of the shovel 500 and the surroundings of the shovel 500 can be further improved.

In this example, the surroundings monitoring apparatus 100 includes both of the alarm output unit 303 and the operation restriction unit 304, but may include any one of the alarm output unit 303 and the operation restriction unit 304. In other words, the surroundings monitoring apparatus 100 may be configured to perform any one of the output of the alarm and the restriction of operation of the shovel 500 in a case of detecting the monitoring target in the monitoring area.

In this example, the determination unit 307 makes both of: the determination as to whether the operator has performed the surroundings situation confirmation operation; and the determination as to whether cancellations of the alarm and the restriction of the operation are permitted at the outside of the shovel 500. Alternatively, the determination unit 307 may make only one of the above determinations. In this case, the alarm output unit 303 and the operation restriction unit 304 cancel the warning and the restriction of operation of the shovel 500, respectively, in a case where any one of the determination results determined by the determination unit 307 is a positive determination and where the operator manipulates the cancellation switch 60. In other words, the surroundings monitoring apparatus 100 enables the manipulation of the cancellation switch 60, in a case where any one of the determination results determined by the determination unit 307 is a positive determination. In a case where the shovel 500 is assumed to receive, from the external device 600, information about (permission of) cancellation of the alarm or the restriction of the operation in a manner different from the cancellation permission notification as described above, the surroundings monitoring apparatus 100 may enable manipulation of the cancellation switch 60, in a case where the surroundings monitoring apparatus 100 receives the above information and thereafter the operator performs the surroundings situation confirmation operation. Likewise, in a case where the surroundings monitoring apparatus 100 receives the above information, and thereafter, the operator indicates the operator's intention that the operator has confirmed the surroundings of the shovel 500, the surroundings monitoring apparatus 100 may enable manipulation of the cancellation switch 60.

In this example, on condition that the cancellation switch 60 is manipulated, the alarm output unit 303 and the operation restriction unit 304 cancel the alarm and the restriction of the operation, respectively, but the manipulation of the cancellation switch 60 may not be the condition. In other words, the alarm output unit 303 and the operation restriction unit 304 may cancel the alarm and the restriction of the operation, respectively, in response to only the condition that the determination unit 307 determines that the operator has performed the surroundings situation confirmation operation, or in response to only the condition that cancellations of the alarm and the restriction of the operation are permitted at the outside of the shovel 500.

In this example, the warning and the restriction of operation of the shovel 500 are cancelled in a case where the operator performs the surroundings situation confirmation operation or cancellations of the alarm and the restriction of the operation are permitted at the outside of the shovel 500 and in a case where the cancellation switch 60 has been manipulated, but the present embodiment is not limited thereto. For example, the alarm output unit 303 and the operation restriction unit 304 may cancel the warning and the restriction of the operation, respectively, of the shovel 500, in response to only the cancellations of the alarm and the restriction of the operation being permitted at the outside of the shovel 500. In other words, the warning and the restriction of the operation of the shovel may be cancelable from the external device 600 of the shovel 500. This is because the determination as to whether to permit cancellation performed at the outside of the shovel 500 is considered to have a relatively higher reliability than the determination performed by the operator of the shovel 500, the controller 30, and the like. Alternatively, for example, the alarm output unit 303 and the operation restriction unit 304 may cancel the warning and the restriction of the operation, respectively, of the shovel 500 in a case where not only the surroundings situation confirmation is performed by the operator but also the cancellation of the alarm and the restriction of the operation is permitted at the outside and in a case where the cancellation switch 60 has been manipulated. Therefore, the safety around the work site of the shovel 500 can be further improved.

In this example, a determination as to whether to permit, with the external device 600, cancellation of the warning and the restriction of operation of the shovel 500 may be implemented by applying AI (Artificial Intelligence)-related techniques based on machine learning. Specifically, the process for cancelling the alarm and the restriction of the operation of the shovel 500 from the external device 600 and the process for transmitting information about cancellation of the alarm and the restriction of the operation may be executed by a classifier based on machine learning such as deep learning and the like. In this case, the classifier is generated based on training data including images indicating states in which cancellation of the alarm and the restriction of the operation cannot be permitted (i.e., images of the surroundings of the shovel 500 where safety is not secured) and images indicating a state in which the cancellation can be permitted (i.e., surroundings images of the shovel 500 where safety is ensured), which are collected by the shovel 500 and the management server 900. In this example, the surroundings monitoring system 1000 is constituted as including the single shovel 500 and the external device 600. However, the surroundings monitoring system 1000 may be constituted as including multiple shovels 500 and the external device 600.

The surroundings monitoring apparatus 100 and the external device 600 (e.g., the management terminal 700, the cancellation device 750, the management terminal 800, and the management server 900) according to this example will be hereinafter disclosed.

(1)

A surroundings monitoring apparatus for monitoring surroundings of a work machine, comprising:

a monitoring target detection unit for detecting a predetermined monitoring target in a predetermined range of the surroundings of the work machine;

a control unit for outputting an alarm or restricting operation of the work machine in a case where the monitoring target detection unit detects the monitoring target;

an acquisition unit for acquiring information about cancellation of the alarm or the restriction of the operation at an outside of the work machine; and a cancellation intention input unit with which an operator inputs an intention for cancelling the alarm or the restriction of the operation, wherein in a case where the alarm is output or the operation is restricted, and where the acquisition unit acquires the information and the cancellation intention input unit receives the intention, then, the control unit cancels the alarm or the restriction of the operation.

(2)

The surroundings monitoring apparatus according to (1), wherein the acquisition unit acquires a notification for permitting cancellation of the alarm or the restriction of the operation from a predetermined external device, and the control unit cancels the alarm or the restriction of the operation in a case where the acquisition unit acquires the notification and the intention is input to the cancellation intention input unit.

(3)

The surroundings monitoring apparatus according to (1), further comprising an operator notification unit for notifying an operator, wherein the acquisition unit acquires information about surroundings confirmation of the work machine from a predetermined external device, and in a case where the acquisition unit acquires the information about the surroundings confirmation of the work machine, the operator notification unit notifies, to the operator, a content of the information.

(4)

The surroundings monitoring apparatus according to (2) or (3), further comprising an external notification unit for notifying, to an outside of the work machine, that the alarm is output or the operation is restricted.

(5)

The surroundings monitoring apparatus according to (4), further comprising an external notification intention input unit for causing the external notification unit to perform notification in accordance with an intention of the operator.

(6)

The surroundings monitoring apparatus according to (4) or (5), wherein the external notification unit transmits, to an external device or an e-mail address or an account of a predetermined social networking service of a user of the external device, a notification indicating that the alarm is output or the operation is restricted.

(7)

The surroundings monitoring apparatus according to any one of (4) to (6), wherein, by a visual method, a tactile method, or an auditory method, the external notification unit notifies, to a person located in the area surrounding the work machine, that the alarm is output or the operation is restricted.

(8)

The surroundings monitoring apparatus according to any one of (2) to (7), further comprising a cancellation request notification unit for transmitting, to the external device, a notification of a cancellation request of the alarm or the restriction of the operation in a case where the alarm is output or the operation is restricted.

(9)

The surroundings monitoring apparatus according to (8), further comprising a cancellation request intention input unit for causing the cancellation request notification unit to perform the cancellation request in accordance with an intention of the operator.

(10)

The surroundings monitoring apparatus according to (1), further comprising an image-capturing device for capturing an image of the surroundings of the work machine, wherein the acquisition unit acquires, from the image-capturing device, the captured image including a predetermined person who is present in the area surrounding the work machine and who is in a predetermined pose or gives a predetermined gesture, and the control unit cancels the alarm or the restriction of the operation, in a case where the acquisition unit acquires the captured image including the person who is in the pose or gives the gesture by the acquisition unit and the intention is input to the cancellation intention input unit.

(11)

The surroundings monitoring apparatus according to any one of (1) to (10), wherein an input of the intention to the cancellation intention input unit is enabled in a case where the acquisition unit acquires information indicating that the cancellation of the alarm or the restriction of the operation is permitted at the outside of the work machine, and the control unit cancels the alarm or the restriction of the operation in a case where an effective input of the intention is given to the cancellation intention input unit.

(12)

An information processing terminal provided outside of a work machine and capable of communicating with the work machine or an information processing apparatus capable of communicating with the work machine, the information processing terminal comprising:

a determination unit for determining whether to permit cancellation of an alarm or a restriction of the operation in a case where a predetermined monitoring target is detected in a predetermined range of surroundings of the work machine, and the work machine outputs an alarm or restricts operation of the work machine; and a cancellation permission notification unit transmits information about permission of the cancellation of the alarm or the restriction of the operation to the work machine, in a case where the determination unit permits the cancellation of the alarm or the restriction of the operation.

(13)

The information processing terminal according to (12), further comprising a surroundings situation information acquisition unit for acquiring information about a situation in the area surrounding the work machine, wherein the determination unit permits the cancellation of the alarm or the restriction of the operation, on the basis of the information acquired by the surroundings situation information acquisition unit.

(14)

The information processing terminal according to (12) or (13), further comprising an acquisition unit for acquiring information indicating that an operator of the work machine has confirmed the surroundings of the work machine, wherein the determination unit permits the cancellation of the alarm or the restriction of the operation, in a case where the acquisition unit acquires the information indicating that the operator of the work machine has confirmed the surroundings of the work machine.

(15)

The information processing terminal according to (13), wherein the determination unit permits the cancellation of the alarm or the restriction of the operation, in a case where it is confirmed that the monitoring target is not present in the predetermined range of the work machine, on the basis of the information acquired by the surroundings situation information acquisition unit.

(16)

The information processing terminal according to any one of (12) to (15), further comprising a cancellation permission manipulation unit which a user of the information processing terminal manipulates to permit the cancellation of the alarm or the restriction of the operation, wherein the determination unit permits the cancellation of the alarm or the restriction of the operation in a case where the cancellation permission manipulation unit is manipulated.

(17)

The information processing terminal according to (16), further comprising a first notification unit for, in a case where the information processing terminal receives from the work machine notification that the alarm is output or the operation is restricted or a notification of the cancellation request of the alarm or the restriction of the operation, notifying the user of the information processing terminal to that effect.

(18)

The information processing terminal according to (16) or (17), further comprising:

a surroundings situation information acquisition unit for acquiring information about a situation in the area surrounding the work machine; and a second notification unit for notifying, to the user of the information processing apparatus, a content of the information acquired by the surroundings situation information acquisition unit.

(19)

The information processing terminal according to any one of (12) to (18), wherein the determination unit determines whether to permit the cancellation of the alarm or the restriction of the operation, in a case where the information processing terminal receives, from the work machine, a notification indicating that the alarm is output or the operation is restricted or a notification of the cancellation request of the alarm or the restriction of the operation.

(20)

The information processing terminal according to any one of (12) to (19) is a terminal carried by a predetermined worker of a work site where the work machine performs a work or a terminal provided in a predetermined office of the work site.

(21)

An information processing apparatus provided outside of a work machine and capable of communicating with the work machine, the information processing apparatus comprising:

a determination unit for determining whether to permit cancellation of an alarm or a restriction of the operation in a case where a predetermined monitoring target is detected in a predetermined range of surroundings of the work machine, and the work machine outputs an alarm or restricts operation of the work machine; and a cancellation permission notification unit for transmitting information about permission of the cancellation of the alarm or the restriction of the operation to the work machine, in a case where the determination unit permits the cancellation of the alarm or the restriction of the operation.

(22)

An information processing program causing an information processing terminal, provided outside of a work machine and capable of communicating with the work machine or an information processing apparatus capable of communicating with the work machine, or an information processing apparatus, provided outside the work machine and capable of communicating with the work machine, to execute:

a determination step for determining whether to permit cancellation of an alarm or a restriction of the operation in a case where a predetermined monitoring target is detected in a predetermined range of surroundings of the work machine, and the work machine outputs an alarm or restricts operation of the work machine; and a cancellation permission notification step for transmitting information about permission of the cancellation of the alarm or the restriction of the operation to the work machine, in a case where the cancellation of the alarm or the restriction of the operation is permitted in the determination step.

Another Example of Surroundings Monitoring System

Subsequently, another example of the surroundings monitoring system 1000 will be explained with reference to FIG. 10 to FIG. 18. This example is mainly different in the configurations of the surroundings monitoring apparatus 100 and the shovel 500 in which the surroundings monitoring apparatus 100 is provided.

Hereinafter, in this example, features different from the above example will be mainly explained, and description overlapping the above example may be omitted. For example, in this example, for the sake of convenience, there may be cases where the description and illustration of the configuration other than the surroundings monitoring apparatus 100 and the shovel 500 in the surroundings monitoring system 1000, i.e., the external device 600, is omitted. Further, in this example, for the sake of convenience, in the configuration of the surroundings monitoring apparatus 100 and the shovel 500, description and illustration of interactions between the surroundings monitoring apparatus 100 (the shovel 500) and the external device 600 may be omitted.

[Configuration of Surroundings Monitoring Apparatus]

Next, specifics of the configuration of the surroundings monitoring apparatus 100 according to the present embodiment will be described with reference to FIG. 10 and FIG. 11.

Figure 10:
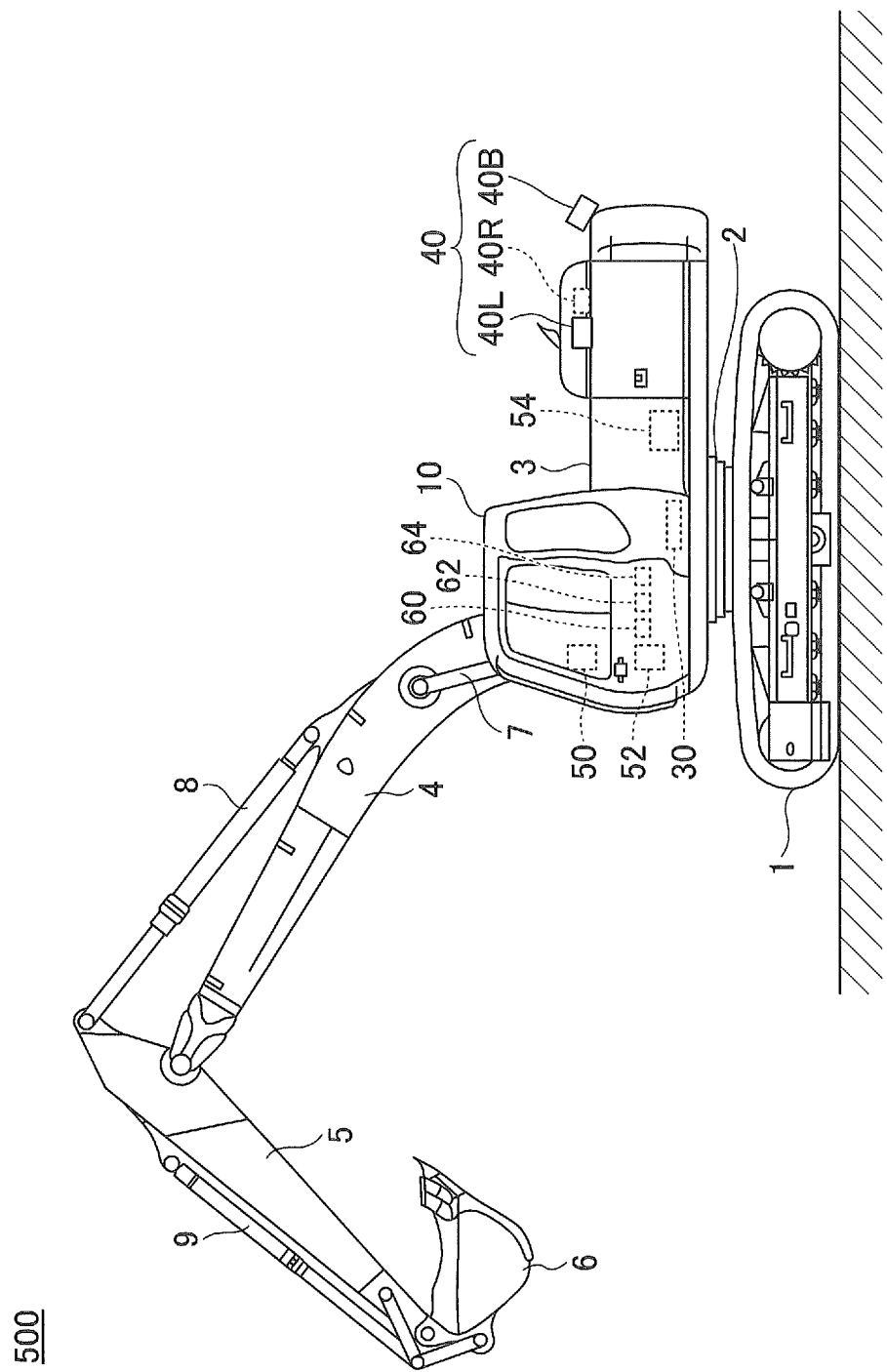
FIG. 10 is a drawing illustrating another example of a work machine.

FIG. 10 is a drawing illustrating another example of the shovel 500 in which the surroundings monitoring apparatus 100 according to the present embodiment is provided, and is more specifically a side view of the shovel 500. FIG. 11 is a block diagram illustrating another example of the configuration of the surroundings monitoring apparatus 100 according to the present embodiment. In FIG. 10 and FIG. 11, for the sake of convenience, in the configurations of the surroundings monitoring apparatus 100 and the shovel 500, the configurations related to interactions between the surroundings monitoring apparatus 100 (the shovel 500) and the external device 600 (for example, the cancellation request notification unit 305, the surroundings situation information transmission unit 306, the determination unit 307, the confirmation operation state detection unit 70, and the like) are omitted.

As described above, the surroundings monitoring apparatus 100 according to the present embodiment may be provided in any work machine other than the shovel 500. For example, the surroundings monitoring apparatus 100 may be provided in a lifting magnet excavator with a lifting magnet attached as an end attachment, a bulldozer, a wheel loader, an asphalt finisher, a forestry machine, and the like.

In a manner similar to the example explained above, the surroundings monitoring apparatus 100 monitors an entry of a predetermined object which is a monitoring target, i.e., a monitoring target, into a predetermined range in the area surrounding the shovel 500. In a case where the monitoring target is detected, the surroundings monitoring apparatus 100 outputs an alarm, restricts an operation of the shovel, and the like.

The surroundings monitoring apparatus 100 includes a controller 30, an image-capturing device 40, a display device 50, an audio output device 52, a gate lock valve 54, a cancellation switch 60, a monitoring function ON-OFF switch (hereinafter referred to as "monitoring function switch" for the sake of convenience) 62, and a display content selection switch 64.

The controller 30 is a control device mainly performing driving control of the shovel 500. For example, the controller 30 is provided in the cab 10 to perform various kinds of control processes for the surroundings monitoring apparatus 100.

The functions of the controller 30 may be implemented by any hardware, software or a combination of hardware and software. As described above, the controller 30 is constituted mainly by a microcomputer including, for example, a CPU, RAM, ROM, an auxiliary storage device, an RTC, an interface for various kinds of communications, and the like. The controller 30 serves as a functional unit implemented by, for example, causing a CPU to execute various kinds of programs stored in a ROM and an auxiliary storage device, and includes a detection unit 301, a display control unit 302, an alarm output unit 303, and an operation restriction unit 304.

The image-capturing device 40 (an example of a sensor) is attached to an upper portion of the upper turning body 3 to capture images of the area surrounding the shovel 500. The image-capturing device 40 includes cameras 40B, 40L, and 40R.

The camera 40B, the camera 40L, and the camera 40R are attached to the upper rear end, upper left end, and upper right end, respectively, of the upper turning body 3 to capture images at the rear, left, and right sides of the upper turning body 3. For example, the camera 40B, the camera 40L, and the camera 40R (each of which is an example of a monocular camera) are each a monocular wide-angle camera having a very wide angle of view. Specifically, the camera 40B, the camera 40L, and the camera 40R are respectively provided on the upper part of the upper turning body 3 so that the optical axis is directed obliquely downward, and capture images in a vertical image-capturing range from the ground near the shovel to a position far from the shovel. The camera 40B, the camera 40L, and the camera 40R output the captured images with a predetermined interval (for example, $\frac{1}{30}$ seconds) while the shovel 500 is operating, and the output captured images are retrieved by the controller 30.

The monitoring function switch 62 is a manipulation unit that is provided in, for example, the cab 10, and allows the operator and the like to turn ON and OFF the monitoring function of the surroundings monitoring apparatus 100. Specifically, the monitoring function switch 62 is a manipulation unit for causing the functions of the output of the alarm and the restriction of operation of the shovel 500, executed on the basis of a detection of a monitoring target, to be in an enabled state or a disabled state.

For example, in a case where the monitoring function is enabled in response to manipulation of the monitoring function switch 62 by the operator and the like, the functions of the detection unit 301, the display control unit 302, the alarm output unit 303, and the operation restriction unit 304 to be described later are enabled.

Conversely, for example, in a case where the monitoring function is disabled in response to manipulation of the monitoring function switch 62 by the operator and the like, all the functions of the detection unit 301, the display control unit 302 (a part related to at least the monitoring function), the alarm output unit 303, and the operation restriction unit 304 are disabled. In this case, among the detection unit 301, the display control unit 302, the alarm output unit 303, and the operation restriction unit 304, only the functions of the alarm output unit 303 and the operation restriction unit 304 may be disabled, and the functions of the part related to the monitoring function of the detection unit 301 and the display control unit 302 may remain enabled. In this case, in a case where, while the monitoring function remains disabled, the monitoring function is enabled in response to manipulation of the monitoring function switch 62, it is not necessary to reactivate the functions of the detection unit 301 and the display control unit 302, and it takes less time to resume the monitoring function.

In addition, for example, in a case where the monitoring function is disabled in response to manipulation of the monitoring function switch 62 by the operator and the like, an indicator indicating that the monitoring function is in a disabled state is displayed on the display device 50 under the control performed by the controller 30 (the display control unit 302 to be described later). Also, a dedicated indicator constituted by a red lamp and the like may be provided in the cab 10, and for example, in a case where the monitoring function is disabled in response to manipulation of the monitoring function switch 62 by the operator and the like, the dedicated indicator may illuminate. Accordingly, the surroundings monitoring apparatus 100 allows the operator and the like to recognize that the monitoring function (i.e., the functions of the output of the alarm, the restriction of operation of the shovel 500, and the like based on the detection of the monitoring target) is in the disabled state.

Information about the manipulation state of the monitoring function switch 62 is retrieved by the controller 30.

For example, the display content selection switch 64 is provided in the cab 10, and is a manipulation unit with which the operator and the like switches the content displayed on the display device 50. For example, the display content selection switch 64 is a manipulation unit for switching the display content of the display device 50 to either an image captured by the image-capturing device 40, a monitoring image including the surroundings image explained later, simultaneous display of them both, or the like. Information about the manipulation state of the display content selection switch 64 is retrieved by the controller 30.

The detection unit 301 detects a monitoring target in a monitoring area in a predetermined region of the surroundings of the shovel 500, which is, more specifically, in a horizontal direction as seen from the shovel 500, i.e., in a direction along the surface on which the shovel 500 is working (i.e., the surface upon which the lower traveling body 1 resides), on the basis of the captured images captured by the image-capturing device 40 (hereinafter, this direction will be simply referred to as a "horizontal direction"). Specifically, the detection unit 301 detects the monitoring target within the monitoring area where the distance D from the shovel 500 in the horizontal direction is within a predetermined distance D1 (for example, 5 meters).

For example, as illustrated in FIG. 4, the monitoring area includes a monitoring area MAB, a monitoring area MAL, and a monitoring area MAR corresponding to the camera 40B, the camera 40L, and the camera 40R, respectively.

The monitoring area MAB, the monitoring area MAL, and the monitoring area MAR can be defined by the angles of view in the horizontal direction of the cameras 40B, 40L, and 40R, respectively, and the monitorable distances extending in the horizontal direction from the cameras 40B, 40L, and 40R, respectively.

For example, a tradeoff can be attained by, within a range of process resources usable by the controller 30, extending the monitorable distance of one of the monitoring area MAB, the monitoring area MAL, and the monitoring area MAR and reducing the monitorable distance of another of the monitoring area MAB, the monitoring area MAL, and the monitoring area MAR (see dashed lines and alternate long and short dash lines in the figure).

Figure 11:
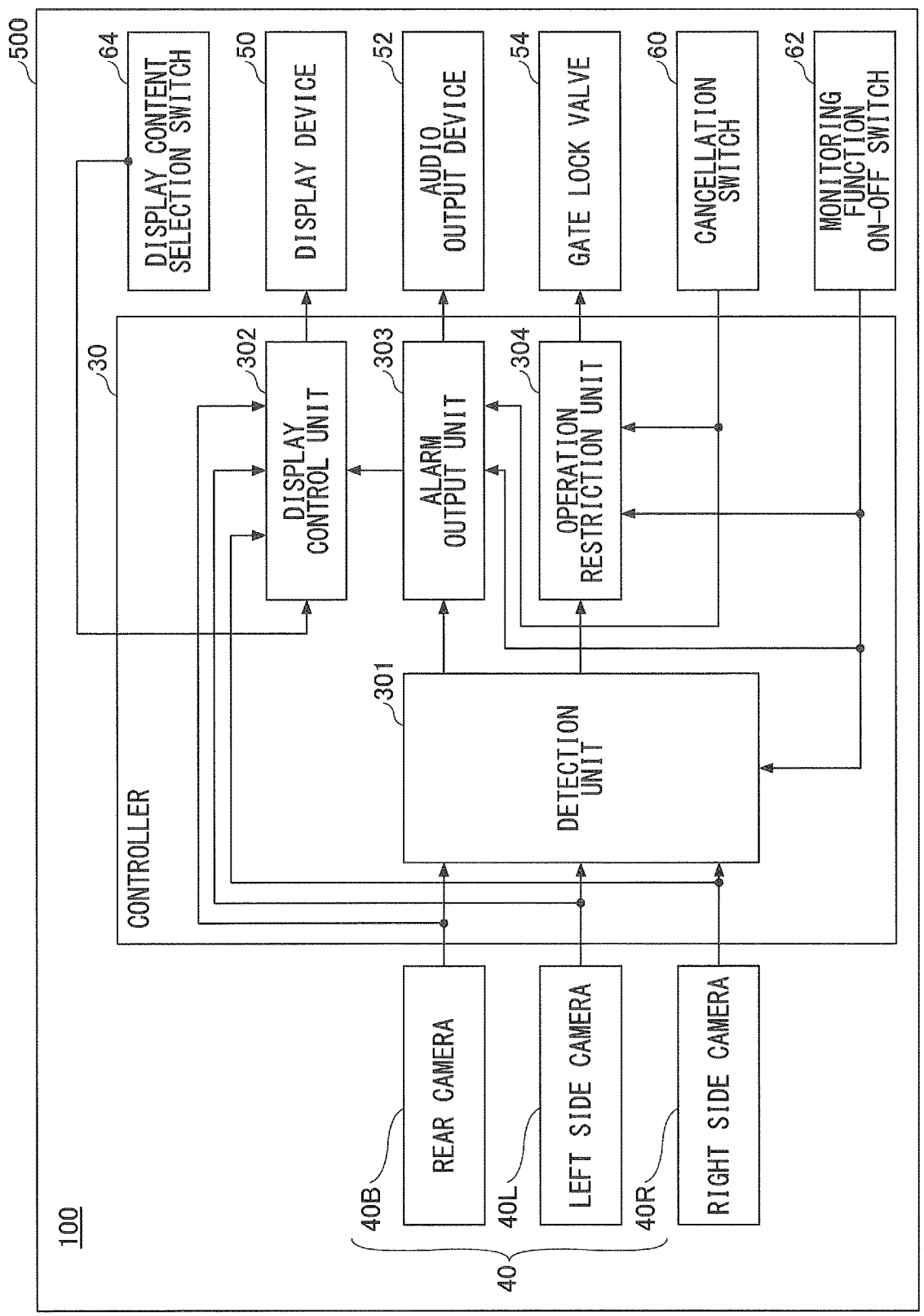
FIG. 11 is a drawing illustrating another example of configuration of a surroundings monitoring apparatus.

Back to FIG. 10 and FIG. 11, on the basis of the captured images captured by the image-capturing device 40, the detection unit 301 detects a monitoring target that satisfies not only a condition in the horizontal direction as seen from the shovel 500 but also a condition in the height direction as seen from the shovel 500, i.e., a vertical direction with respect to the surface on which the shovel 500 is working (i.e., the surface upon which the lower traveling body 1 resides) (hereinafter, this direction will be simply referred to as a "height direction"). Specifically, the detection unit 301 detects a monitoring target that is present at a position within a predetermined range HR1 (an example of a first range) in the height direction and within the monitoring area defined in the horizontal direction. In other words, within the monitoring area, the detection unit 301 detects a monitoring target with a relatively small difference in the height direction from the work surface on which the shovel 500 works. Specifically, the detection unit 301 detects a monitoring target that is present, within the monitoring area, in the predetermined range HR1 (for example, −2 meters to +2 meters and the like) defined by at least one of a range in the positive direction and a range in the negative direction with reference to a reference position at a particular height of the shovel 500. Therefore, the surroundings monitoring apparatus 100 can exclude, from the target of the monitoring function, a monitoring target that is present at a position with a relatively large difference in the height direction from the work surface of the shovel 500.

For example, the reference position may be selected as necessary from the position and the like of a center position of a contact surface, a front end, or a rear end of a crawler of the lower traveling body 1 corresponding to the height of the work surface of the shovel 500.

For example, the detection unit 301 recognizes the monitoring target in the captured image by applying a classifier and the like based on various kinds of known image process methods, machine learning including artificial intelligence (AI), and the like.

By applying various kinds of known methods, the detection unit 301 can determine (estimate) a position at which a recognized monitoring target (i.e., a person) is present (hereinafter referred to as "estimated actual position", for example, a feet position) included in the captured image captured by the monocular image-capturing device 40.

For example, the detection unit 301 estimates the position in the horizontal direction as seen from the shovel 500 (hereinafter referred to as "horizontal position") on the basis of the size of the recognized monitoring target in the captured image (for example, the size in the height direction in the captured image). This is because there is such a correlation that the size of the recognized monitoring target in the captured image decreases as the monitoring target moves away from the shovel 500. Specifically, since an estimated range of size (for example, an estimated range of height of persons) can be defined for the monitoring target, a correlation between a horizontal position, as seen from the shovel 500, of the monitoring target included in the estimated range of size and the size in the captured image can be defined in advance. Therefore, the detection unit 301 can estimate the estimated actual position of the recognized monitoring target (the horizontal position from the shovel 500) on the basis of, for example, maps, conversion formulas, and the like representing a correlation between the size of the monitoring target in the captured image and the horizontal position as seen from the shovel 500, which is stored in internal memory of an auxiliary storage device and the like of the controller 30.

For example, under the assumption that the monitoring target is present on the same surface as (the lower traveling body 1 of) the shovel 500, the detection unit 301 can estimate the estimated actual position (for example, feet position) by transforming the captured image onto the surface by projective transformation (homography) and the like. In this case, a certain portion (certain points) constituting the captured image is associated with a certain position on the same surface as that upon which the shovel 500 resides.

Herein, in a case where there is a difference in the height direction between the feet position of the monitoring target and the work surface of the shovel 500, the monitoring target in the captured image appears to be different from the case where the monitoring target is located on the same surface as the work surface of the shovel 500 (i.e., the shovel 500 and the monitoring target are located at the same position in the height direction).

For example, even when the horizontal positions as seen from the shovel 500 are the same, a monitoring target located at a position in the height direction (hereinafter referred to as "height position") that is different from the work surface of the shovel 500 appears to be shifted in the height direction in the captured image (for example, a height direction of the captured image, or a direction defined with respect to the height direction in view of a skew and the like of the image due to distortion) from the case where the monitoring target is at the same height position as the work surface of the shovel 500. In addition, a monitoring target at a height position different from the work surface of the shovel 500 is also different in the direction in which it appears as seen from the image-capturing device 40 from the case where the monitoring target is at the same height position as the work surface of the shovel 500, and this also results in a difference in the size corresponding to the height direction in the captured image.

In addition, for example, a monitoring target at a height position different from the work surface of the shovel 500 is also different in the size corresponding to the height direction in the captured image from the provisional case where the monitoring target resides at an estimated actual position that is estimated under the assumption that the monitoring target resides on the same surface as the work surface of the shovel 500. This is because, since the optical axis of the image-capturing device 40 is directed diagonally downward toward the ground as described above, when the height position of the monitoring target is shifted from the work surface of the shovel 500, the distance to the image-capturing device 40 becomes shorter or longer.

In other words, when the monitoring target appears within a certain range (i.e., within a predetermined range HR2), the detection unit 301 can determine that the monitoring target is within the predetermined range HR1 in the height direction in the real space.

Specifically, the detection unit 301 can determine that, when the amount of shift in the height direction of the monitoring target in the captured image is within the predetermined range HR2 with reference to a reference position (for example, a reference line in the captured image corresponding to the horizontal position of the monitoring target estimated on the work surface of the shovel 500), the monitoring target is within the predetermined range HR1 in the real space. At this occasion, the predetermined range HR2 is defined in advance in accordance with the estimated actual position of the monitoring target estimated by the detection unit 301 (the horizontal position as seen from the shovel 500). Specifically, the predetermined range HR2 is defined in advance in accordance with the magnitude of distance, as seen from the shovel 500, of the estimated actual position of the monitoring target estimated by the detection unit 301. This is because the amount of shift in the captured image corresponding to a difference in the height direction between the feet position of the monitoring target and the work surface of the shovel 500 decreases as the monitoring target moves away (farther) from the shovel 500 (the image-capturing device).

The detection unit 301 can determine that, when the size corresponding to the height direction of the monitoring target in the captured image is within the predetermined range HR2, the monitoring target is within the predetermined range HR1 in the height direction in the real space. At this occasion, for example, the predetermined range HR2 is defined in advance in accordance with the position of the image portion including the monitoring target in the captured image. Specifically, the predetermined range HR2 is defined in advance in such a manner that the predetermined range HR2 changes in accordance with the position of the image portion including the monitoring target in the captured image. This is because since any given image portion in the captured image is associated with, in a one-to-one manner, a position on the work surface of the shovel 500 under the assumption that the monitoring target is present in the same plane as the work surface of the shovel 500, the size corresponding to the height direction of the monitoring target may differ according to the magnitude of distance to the position in question as seen from the shovel 500. In other words, the predetermined range HR2 is defined in accordance with the magnitude of distance to the estimated actual position estimated by the detection unit 301 (i.e., the estimated actual position under the assumption that the monitoring target resides on the same surface as the work surface of the shovel 500).

The predetermined range HR2 is stored in advance in the internal memory of the auxiliary storage device and the like of the controller 30 in a form of a map and the like derived by performing predetermined calculation process on a difference in appearance in the captured image corresponding to the predetermined range HR1 defined in the real space. At this occasion, the predetermined range HR2 can be defined in accordance with the size in the height direction of the estimated monitoring target (for example, an estimated height of a person) and an attachment height and an attachment orientation (angle) of the image-capturing device 40. This is because the degree of change in how the monitoring target appears in the image captured by the image-capturing device 40 differs according to the size in the height direction of the estimated monitoring target. In addition, this is because the relationship between the monitoring target and the optical axis is different according to the attachment height and attachment orientation of the image-capturing device 40, and this may result in a difference in the degree of change in how the monitoring target appears in the image captured by the image-capturing device 40. In a case where multiple models (for example, a medium-sized model, a large-sized model, and the like) are available as the shovel 500, the attachment height and the like of the image-capturing device 40 is different, and as a result, the predetermined range HR2 differs according to the models. Therefore, all of the predetermined ranges HR2 for the multiple expected models (i.e., the above-explained above maps and the like corresponding to the predetermined ranges HR2) may be stored in advance in the internal memory in the controller 30. In this case, the specification of the controller 30 need not be changed depending on each model, and the same controller 30 can be employed for all of the models.

Figure 12A:
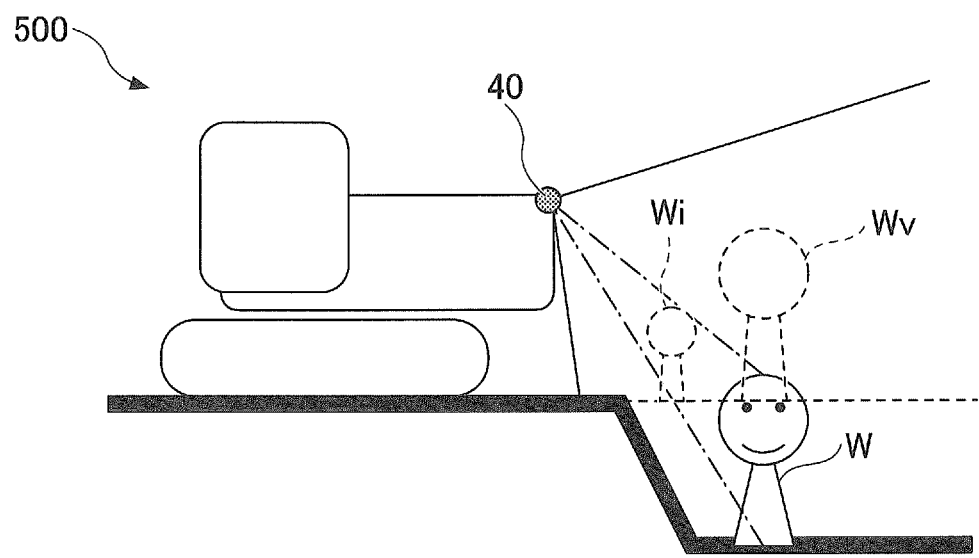
FIG. 12A is a drawing illustrating an example of a monitoring target excluded from the target for which an alarm is output or for which operation is restricted by the surroundings monitoring apparatus.
Figure 12C:
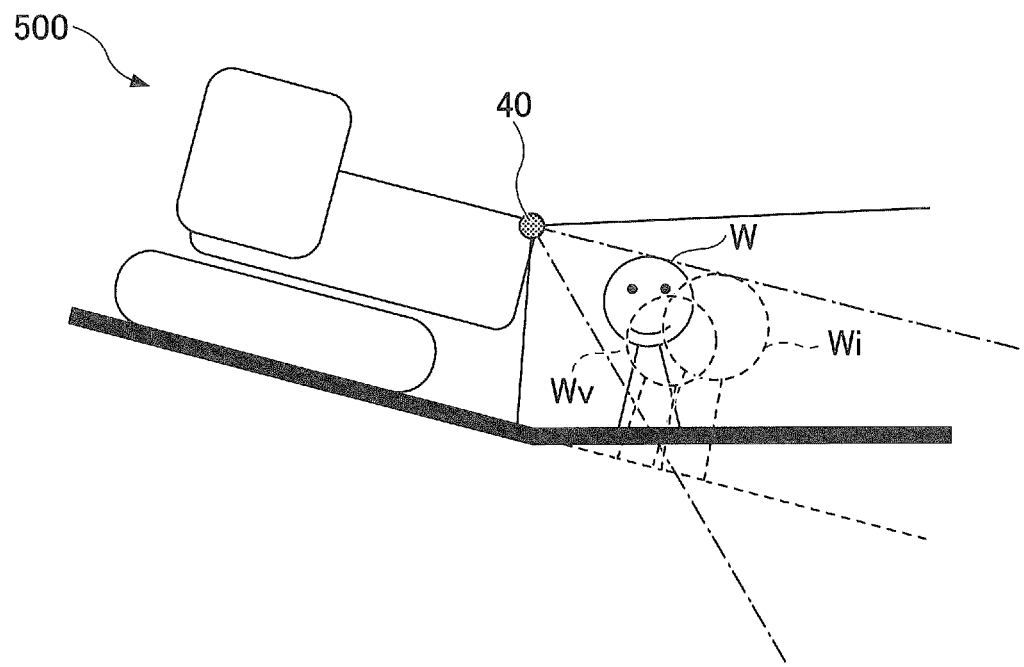
FIG. 12C is a drawing illustrating an example of a monitoring target excluded from the target for which an alarm is output or for which operation is restricted by the surroundings monitoring apparatus.
Figure 12D:
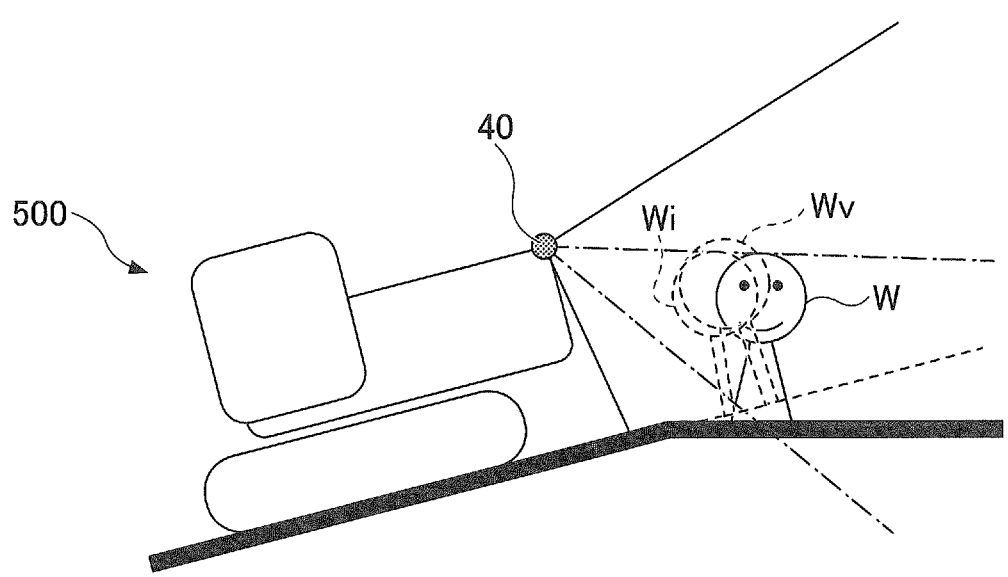
FIG. 12D is a drawing illustrating an example of a monitoring target excluded from the target for which an alarm is output or for which operation is restricted by the surroundings monitoring apparatus.

For example, FIG. 12 (FIG. 12A to FIG. 12D) are drawings illustrating examples of monitoring targets excluded from the target of monitoring function (the output of the alarm, the restriction of operation of the shovel 500, and the like) according to the condition in the height direction explained above.

FIG. 12A is a drawing illustrating a situation where a worker W resides on a surface one step lower in the height direction than the work surface of the shovel 500.

In this example, the worker W is located below an imaginary worker (imaginary worker) Wv residing at the same horizontal position as seen from the shovel 500 and on the same work surface as the shovel 500. Therefore, the worker W included in the image captured by the image-capturing device 40 appears to be shifted to a lower side in the height direction with reference to the imaginary worker Wv residing at the same horizontal position as seen from the shovel 500 and on the same work surface as the shovel 500.

In this example, the distance to the worker W from the image-capturing device 40 is farther than the distance in the case where the worker W resides on the same work surface as the shovel 500. Therefore, an image Wi acquired by projecting the worker W according to the optical axis of the image-capturing device 40 onto the estimated actual position estimated under the assumption that the worker W resides on the same surface as the work surface of the shovel 500 is smaller in size in the height direction than the actual size of the worker W. In other words, the worker W included in the image captured by the image-capturing device 40 appears to be smaller in the size corresponding to the height direction than the size in the case where the worker W resides at the estimated actual position estimated under the assumption that the worker W resides on the same surface as the work surface of the shovel 500.

Likewise, FIG. 12B is a drawing illustrating a situation where the worker W resides in a surface one step higher in the height direction than the work surface of the shovel 500.

In this example, the worker W is located above an imaginary worker Wv residing at the same horizontal position as seen from the shovel 500 and on the same work surface as the shovel 500. Therefore, the worker W included in the image captured by the image-capturing device 40 appears to be shifted to an upper side in the height direction with reference to the imaginary worker Wv residing at the same horizontal position as seen from the shovel 500 and in the same work surface as the shovel 500.

In this example, the distance to the worker W from the image-capturing device 40 is closer than the distance in the case where the worker W resides on the same work surface as the shovel 500. Therefore, an image Wi acquired by projecting the worker W according to the optical axis of the image-capturing device 40 onto the estimated actual position estimated under the assumption that the worker W resides on the same surface as the work surface of the shovel 500 is larger in size in the height direction than the actual size of the worker W. In other words, the worker W included in the image captured by the image-capturing device 40 appears to be larger in the size corresponding to the height direction than the size in the case where the worker W resides at the estimated actual position estimated under the assumption that the worker W resides on the same surface as the work surface of the shovel 500.

Therefore, in a case where the vertical step in the height direction is beyond the predetermined range HR1, the worker W is out of the predetermined range HR2 in the captured image as compared with the case where the worker W resides on the work surface of the shovel 500. Therefore, the detection unit 301 does not detect the worker W, and excludes the worker W from the target of the monitoring function of the surroundings monitoring apparatus 100. This is because it is very unlikely that the shovel 500 would move to another plane having a relatively large step from the work surface, and it can be considered that the possibility of contact and the like with the worker W on the another plane is also extremely low.

FIG. 12C is a drawing illustrating a situation where, when the shovel 500 is working on an inclined surface, the worker W is present on a horizontal surface adjacent to a descending direction of the inclined surface.

In this example, at the same horizontal position as seen from the shovel 500, the worker W is present at an upper side (i.e., a higher direction) in the height direction than the imaginary worker Wv residing on the same work surface as the shovel 500 in accordance with the angle difference between the inclined surface and the horizontal surface. Therefore, in a manner similar to the case of FIG. 12B, the worker W included in the image captured by the image-capturing device 40 appears to be shifted to an upper side in the height direction with reference to the imaginary worker Wv residing at the same horizontal position as seen from the shovel 500 and in the same work surface as the shovel 500.

In this example, in a manner similar to the case of FIG. 12B, the distance to the worker W from the image-capturing device 40 is closer than the distance in the case where the worker W resides on the same work surface as the shovel 500. Therefore, an image Wi acquired by projecting the worker W according to the optical axis of the image-capturing device 40 onto the estimated actual position estimated under the assumption that the worker W resides on the same surface as the work surface of the shovel 500 is larger in size in the height direction than the actual size of the worker W. In other words, the worker W included in the image captured by the image-capturing device 40 appears to be larger in the size corresponding to the height direction than the size in the case where the worker W resides at the estimated actual position estimated under the assumption that the worker W resides on the same surface as the work surface of the shovel 500.

Likewise, FIG. 12D is a drawing illustrating a situation where, when the shovel 500 is working on an inclined surface, the worker W is present on a horizontal surface adjacent to an ascending direction of the inclined surface.

In this example, at the same horizontal position as seen from the shovel 500, the worker W is present at a lower side (i.e., a lower direction) in the height direction than the imaginary worker Wv residing on the same work surface as the shovel 500 in accordance with the angle difference between the inclined surface and the horizontal surface. Therefore, in a manner similar to the case of FIG. 12A, the worker W included in the image captured by the image-capturing device 40 appears to be shifted to a lower side in the height direction with reference to the imaginary worker Wv.

In this example, in a manner similar to the case of FIG. 12A, the distance to the worker W from the image-capturing device 40 is farther than the distance in the case where the worker W resides on the same work surface as the shovel 500. Therefore, an image Wi acquired by projecting the worker W according to the optical axis of the image-capturing device 40 onto the estimated actual position estimated under the assumption that the worker W resides on the same surface as the work surface of the shovel 500 is smaller in size in the height direction than the actual size of the worker W. In other words, the worker W included in the image captured by the image-capturing device 40 appears to be smaller in the size corresponding to the height direction than the size in the case where the worker W resides at the estimated actual position estimated under the assumption that the worker W resides on the same surface as the work surface of the shovel 500.

Therefore, in a case where a difference in the height direction between the feet position of the worker W and the inclined surface due to an angle difference between the inclined surface on which the shovel 500 is working and the horizontal surface on which the worker W resides is beyond the predetermined range HR1, the worker W is out of the predetermined range HR2 in the captured image as compared with the case where the worker W resides on the work surface of the shovel 500. Therefore, the detection unit 301 does not detect the worker W, and excludes the worker W from the target of the monitoring function of the surroundings monitoring apparatus 100. This is because a situation where a difference in the height direction between the feet position of the worker W and the work surface of the shovel 500 is relatively large corresponds to a situation where the angle difference between the work surface of the shovel 500 and the surface on which the worker W is present is relatively large and a situation where a distance in the horizontal direction between the shovel 500 and the worker W is also large to some extent. Specifically, this is because when the angle difference between the work surface of the shovel 500 and the surface on which the worker W is present increases to some extent, it is very unlikely that the shovel 500 would move beyond the angle difference to the surface on which the worker W is present, and it can be considered that the possibility of contact and the like with the worker W is also extremely low. This is also because, when the distance in the horizontal direction between the shovel 500 and worker W is a certain distance away, the possibility of contact and the like between the shovel 500 and the worker W becomes even lower.

It should be noted that the above-mentioned step in the height direction and the range in the angle difference corresponding to the condition for exclusion from target of the monitoring function, i.e., the predetermined range HR1, can be defined according to the travelling performance of the shovel 500. This is because the shovel 500 may move over the step or the angle difference depending on the travelling performance of the shovel 500.

In addition, the detection unit 301 may determine, by another method, whether the monitoring target (i.e., a person) recognized from the image captured by the image-capturing device 40 is the predetermined range HR1 in the height direction.

Figure 13:
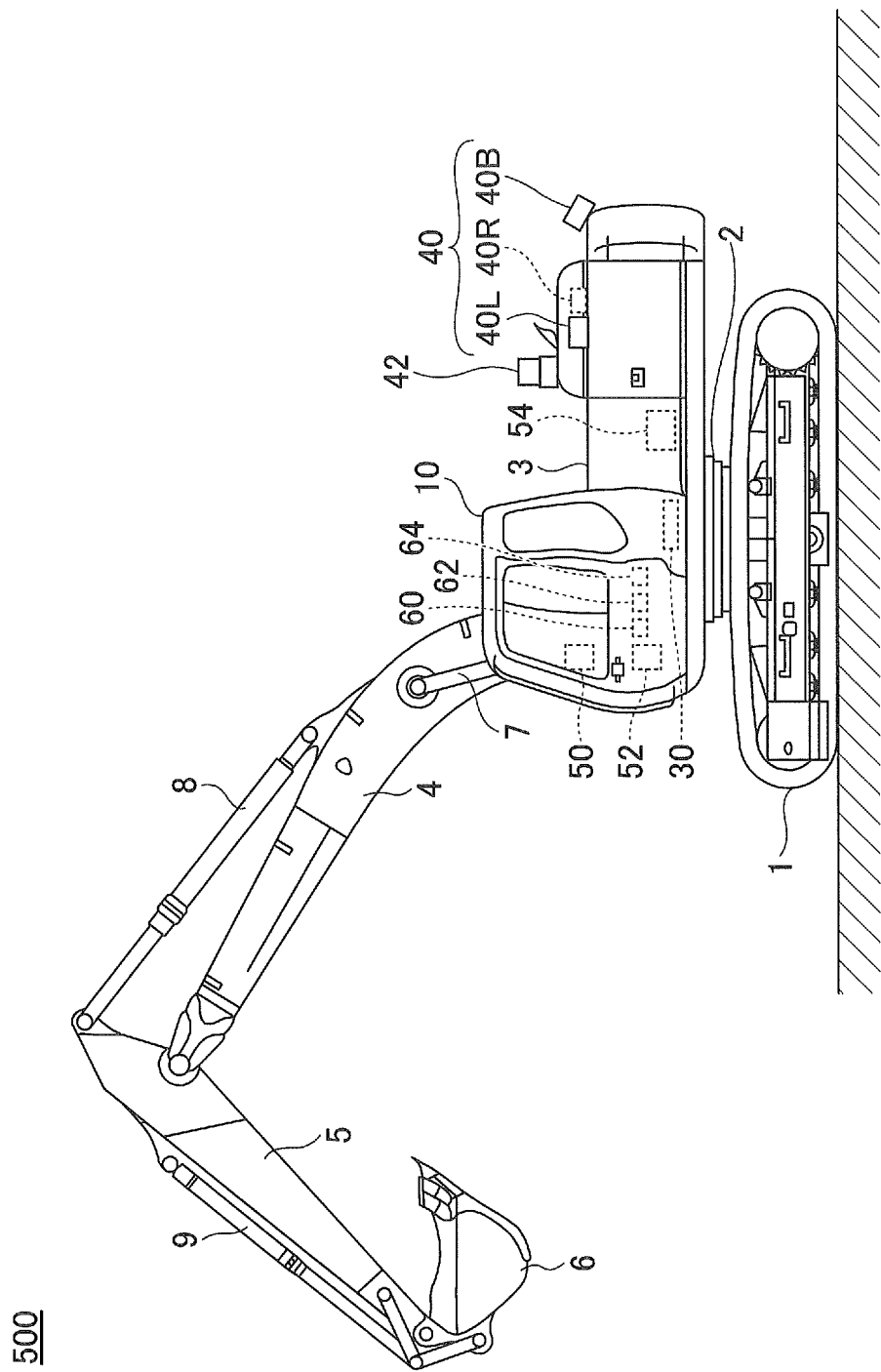
FIG. 13 is a drawing illustrating a still another example of a work machine.

For example, FIG. 13 is a drawing illustrating a still another example of a shovel 500 provided with a surroundings monitoring apparatus 100. In this example, the shovel 500, i.e., the surroundings monitoring apparatus 100, further includes a LIDAR (Light Detection and Ranging) device 42.

The LIDAR device 42 (an example of a sensor) detects objects including obstacles and terrain in the area surrounding the shovel 500. Also, the LIDAR device 42 outputs information about the position (i.e., the direction and the distance of the object as seen from the shovel 500) of the detected object (detection object). In other words, the LIDAR device 42 can output position information about the terrain (terrain information) in the area surrounding the shovel 500.

Accordingly, the detection unit 301 can identify the terrain corresponding to the position in the horizontal direction of the monitoring target recognized from the captured image, on the basis of the terrain information output from the LIDAR device 42. Therefore, the detection unit 301 can determine whether the recognized monitoring target is within the predetermined range HR1 in the height direction on the basis of the position in the height direction corresponding to the identified terrain.

In this example, other sensors may be used as long as the terrain information can be acquired. Instead of the LIDAR device 42, for example, a millimeter wave radar, a stereo camera, and the like may be adopted.

Figure 14:
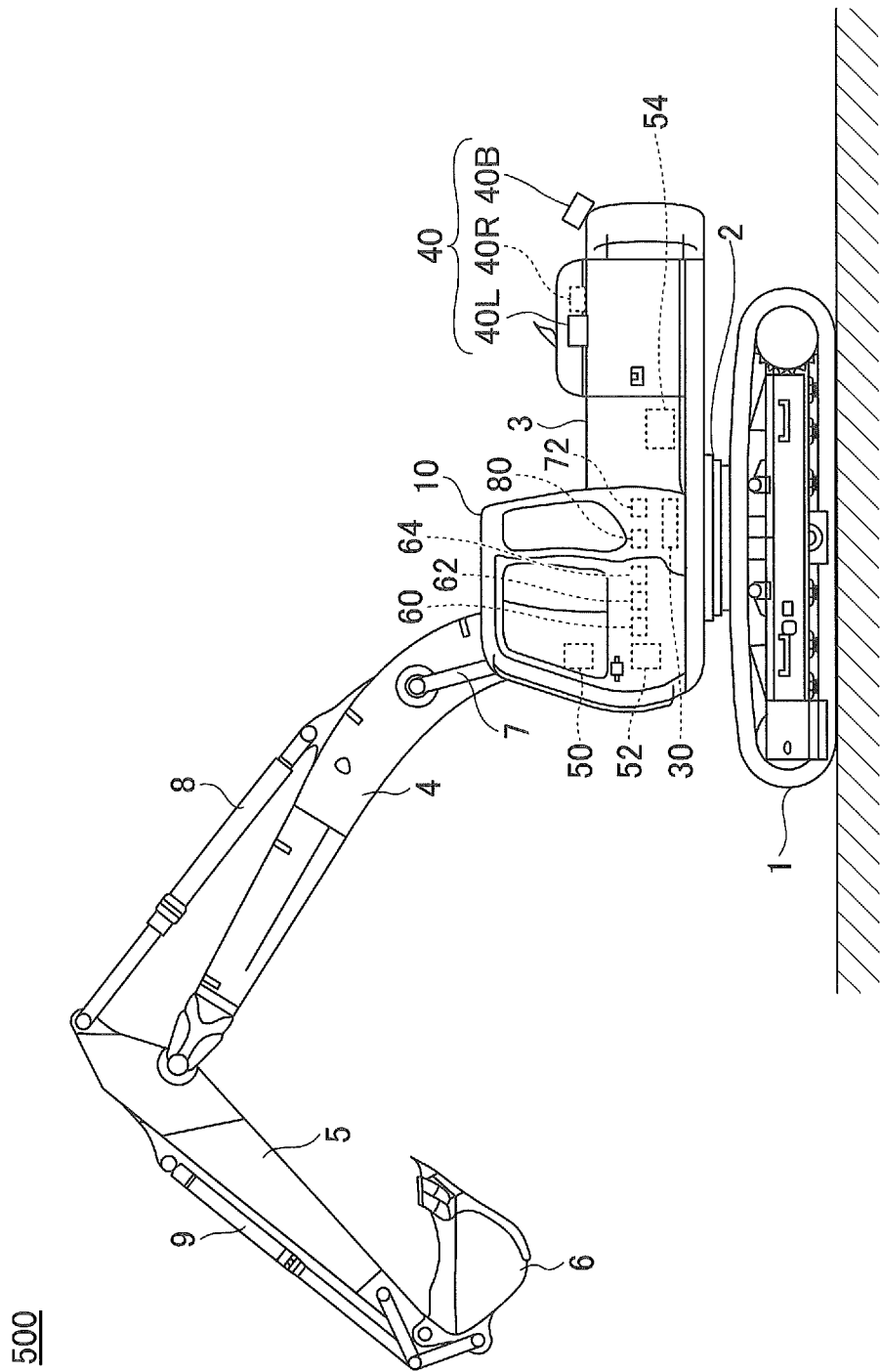
FIG. 14 is a drawing illustrating a still yet another example of a work machine.

For example, FIG. 14 is a drawing illustrating a still yet another example of a shovel 500 provided with a surroundings monitoring apparatus 100. In this example, the shovel 500, i.e., the surroundings monitoring apparatus 100 further includes a GPS (Global Positioning System) module 80 and a communication device 72.

The GPS module 80 (an example of a position information acquisition unit and a receiver) receives GPS signals transmitted from 3 or more, preferably 4 or more satellites above the shovel 500 to measure the position of the shovel 500. The position information of the shovel 500 measured by the GPS module 80 is retrieved by the controller 30. It should be noted that the GPS module 80 is not limited to a GPS receiver as described above, and more generally, the GPS module 80 may be constituted by a receiver for any GNSS (Global Navigation Satellite System), such as, for example, GLONASS (GLObal NAvigation Satellite System), Galileo satellite navigation system, and Quasi-Zenith Satellite System (QZSS).

The communication device 72 (an example of a terrain information acquisition unit) performs communication according to a predetermined method with a predetermined external device (for example, the management server 900 provided outside the work site, the management terminal 700 provided in the site office of the work site, and the like). For example, the communication device 72 is an RF (Radio Frequency) communication device and the like for communicating with a mobile communication module communicating with an external device via a predetermined communication network and a relatively close external device.

Therefore, the controller 30 can access a predetermined external device (for example, the management server 900 and the like) via the communication device 72, and acquire terrain information about the computerized construction of the work site of the shovel 500 from the external device. For this reason, the detection unit 301 can identify the position of the shovel 500 at the work site on the basis of the position information about the shovel 500 acquired by the GPS module 80 and the terrain information about the work site, and identify the terrain corresponding to the position in the horizontal direction of the monitoring target recognized by the captured image. Therefore, in a manner similar to the example as illustrated in FIG. 13, the detection unit 301 can determine whether the recognized monitoring target is within the predetermined range HR1 in the height direction, on the basis of the position in the height direction corresponding to the identified terrain.

Instead of or in addition to the image captured by the image-capturing device 40, the detection unit 301 may detect the monitoring target located in the area surrounding the shovel 500 on the basis of a detection result (distance image and the like) of another sensor provided on the shovel 500. For example, the detection unit 301 can detect the monitoring target on the basis of the detection result of a millimeter wave radar, a LIDAR device, a stereo camera, and the like provided on the shovel 500. In this case, the detection unit 301 may determine, according to the methods corresponding to FIG. 12A to FIG. 12D, as to whether the monitoring target is within the predetermined range HR1 in the height direction.

The display control unit 302 causes the display device 50 to display various kinds of information images. For example, the display control unit 302 causes the display device 50 to display a captured image captured by at least one of the cameras 40B, 40L, and 40R in response to manipulation of the display content selection switch 64 by the operator. Hereinafter, the captured image displayed on the display device 50 may be referred to as a "through image".

For example, the display control unit 302 generates a surroundings image (an example of a composite image) on the basis of the image captured by the image-capturing device 40 in response to manipulation of the display content selection switch 64 by the operator, and causes the display device 50 to display the surroundings image.

Specifically, the display control unit 302 generates, as a surroundings image, a viewpoint-transformed image as seen from a virtual viewpoint by performing a known viewpoint-transformed process on the basis of the images captured by the camera 40B, the camera 40L, and the camera 40R, and causes the display device 50 to display the surroundings image. When the display control unit 302 causes the display device 50 to display the surroundings image, the display control unit 302 causes the display device 50 to also display a shovel image schematically representing the shovel 500 in order to clarify the relative positional relationship between the image-capturing range of the image-capturing device 40 and the shovel 500. In other words, the display control unit 302 generates a monitoring image including a shovel image and a surroundings image arranged in the area surrounding the shovel image in accordance with a relative positional relationship between the shovel 500 and the image-capturing range of the image-capturing device 40, and causes the display device 50 to display the monitoring image.

It should be noted that the function of the display control unit 302 may be provided in the display device 50. In this case, the images captured by the image-capturing device 40 (the camera 40B, the camera 40L, and the camera 40R) and the information about the detection result and the like detected by the detection unit 301 are retrieved by the display device 50 from the image-capturing device 40 and the controller 30, respectively.

Figure 15:
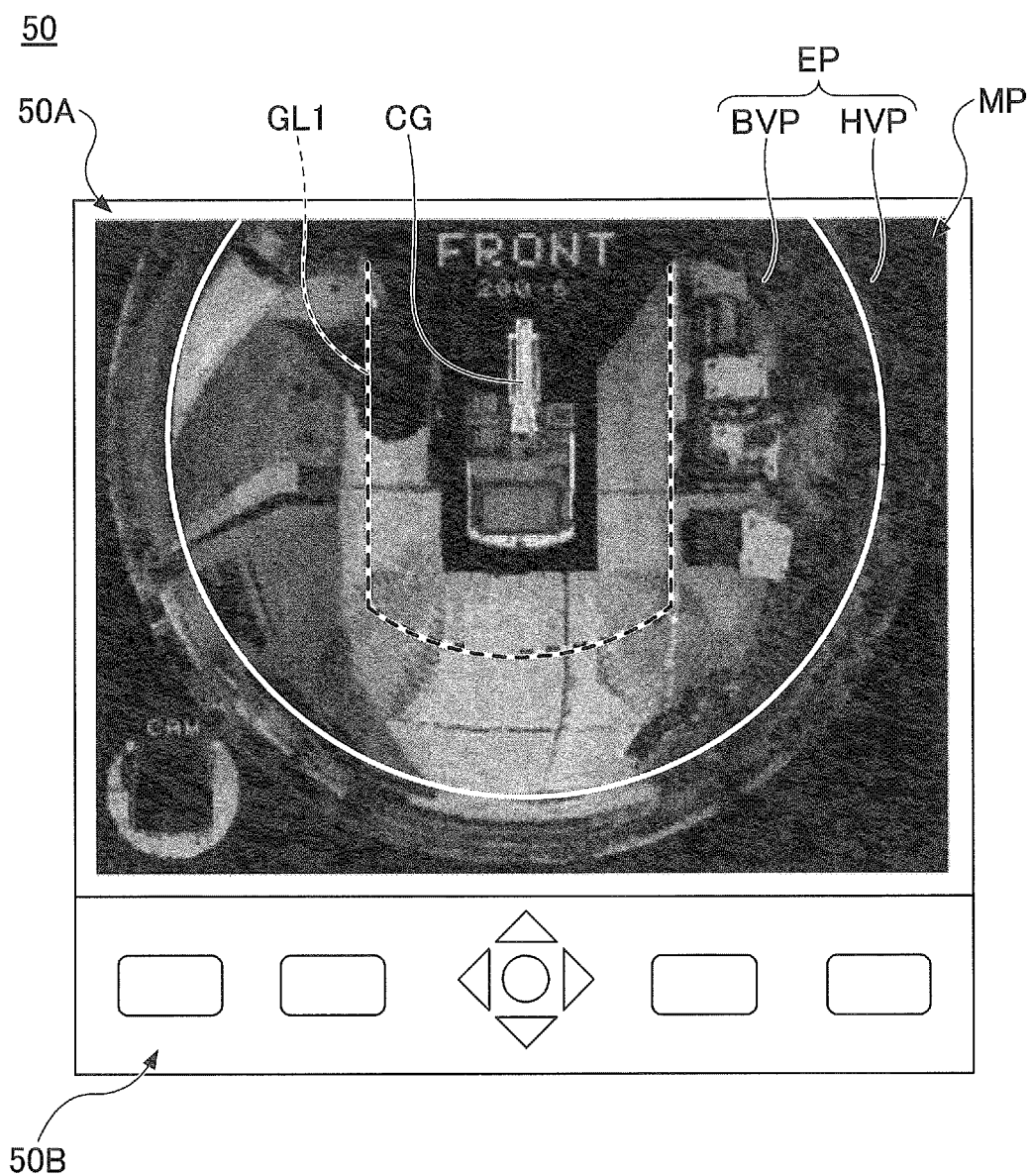
FIG. 15 is a drawing illustrating an example of a monitoring image displayed on the display device.

For example, FIG. 15 is a drawing illustrating an example of a monitoring image MP displayed on the display device 50.

As illustrated in FIG. 15, the display device 50 includes a display unit 50A displaying various kinds of information images and a manipulation unit 50B implemented with hardware such as a button switch and the like for receiving manipulation by the operator and the like with respect to various kinds of information image displayed on the display unit 50A.

The display unit 50A is, for example, a rectangular screen (for example, a screen with an aspect ratio of 4:3) in the display device 50. As described above, the display unit 50A displays a shovel image CG and a surroundings image EP arranged in the area surrounding the shovel image CG. This allows the operator and the like to appropriately find the positional relationship between the monitoring target (i.e., a person) appearing in the surroundings image EP and the shovel 500.

The surroundings image EP of this example is a viewpoint-transformed image that is a combination of a bird's eye view image BVP showing the surroundings area adjacent to the shovel 500 as seen from above and a horizontal image HVP, placed along the periphery of the bird's eye view image BVP, showing the surroundings area as seen horizontally from the shovel 500. A surroundings image, i.e., a viewpoint-transformed image, is acquired by projecting respective captured images of the camera 40B, 40L, and 40R onto a space model and re-projecting the projected images projected on the space model onto a different two-dimensional plane. The space model is an object onto which a captured image is projected in a virtual space, and is composed of one or more plane surfaces or curved surfaces that include a plane surface or a curved surface different from a surface in which the captured image is positioned.

In addition, a guideline GL1 is superimposed and displayed on the monitoring image MP. The guideline GL1 indicates positions where the distance D from the shovel 500 in the horizontal direction is a predetermined distance D2 (≤D1). In other words, the guideline GL1 is a line segment acquired by offsetting (enlarging), by an amount corresponding to the predetermined distance D2 to the outside in the shovel image CG, the contour shape of the shovel image CG corresponding to the plan view of the shovel 500 as seen from above. Accordingly, in a case where a monitoring target (i.e., a person) appears in the surroundings image, the operator and the like can find how far the monitoring target is from the shovel 500.

It should be noted that a process in which the detection unit 301 detects the monitoring target (monitoring target detection process) and a process in which the display control unit 302 generates a monitoring image (surroundings image) (surroundings image generation process) may be asynchronous processes. In this case, the controller 30 may configure the surroundings image generation process with a quicker start up and a shorter process cycle than the monitoring target detection process. As a result, the surroundings image generation process is less likely to slow down and fail to update the surroundings image in the monitoring image displayed on the display device 50.

Back to FIG. 10 and FIG. 11, as described above, in a case where the detection unit 301 detects, within the monitoring area defined in the horizontal direction, the monitoring target within the predetermined range HR1 in the height direction, the alarm output unit 303 (an example of a control unit) outputs an alarm to the inside or outside of the cab 10.

For example, as described above, the alarm output unit 303 outputs an alarm by an auditory method, i.e., by sound. Specifically, the alarm output unit 303 outputs a control instruction to the audio output device 52 to output a warning sound.

For example, as described above, the alarm output unit 303 outputs an alarm by a visual method, i.e., by displaying on the display device 50. Specifically, the alarm output unit 303 transmits an alarm request to the display control unit 302. As a result, in response to an alarm request, the display control unit 302 emphasizes a person who is a monitoring target included in the through image or the surroundings image EP of the monitoring image MP displayed on the display device 50, so that the display device 50 can output an alarm for the operator. The details of the forms of emphasis of the monitoring target by the alarm output unit 303 will be described later (see FIGS. 16A to 16D).

As described above, the alarm output unit 303 may output an alarm by a tactile method, for example, with a vibration generation device provided in the operator's seat on which the operator is seated.

As described above, in a case where the detection unit 301 detects, within the monitoring area defined in the horizontal direction, the monitoring target within the predetermined range HR1 in the height direction, the operation restriction unit 304 (an example of a control unit) restricts the operation of the operation element of the shovel 500.

[Display Content of Display Device During Detection of Monitoring Target]

Subsequently, an example of a display content of the display device 50 in a case where the detection unit 301 detects a monitoring target will be explained with reference to FIG. 16 (FIG. 16A to FIG. 16D).

FIG. 16A to FIG. 16D are figures illustrating an example of a display content of the display device 50 in a case where the detection unit 301 detects a monitoring target.

Figure 16A:
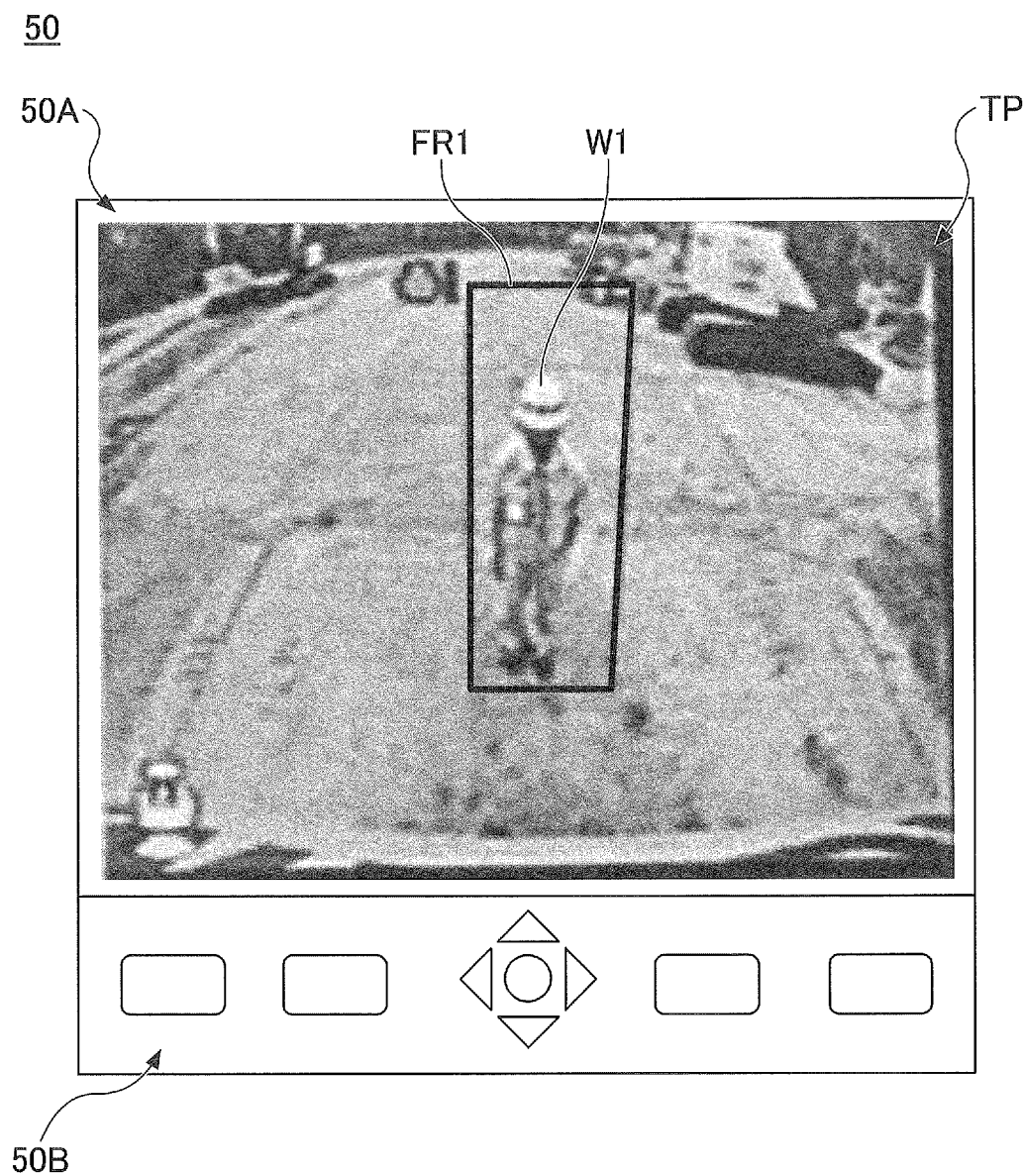
FIG. 16A is a drawing illustrating an example of a display content displayed on the display device in a case where a monitoring target for which an alarm is output or for which operation is restricted is detected.

First, FIG. 16A is a drawing illustrating an example of a through image TP displayed on the display device 50 in a case where a monitoring target (i.e., a worker W1) is detected in a situation in which the display device 50 displays the through image TP of any one camera selected from the cameras 40B, 40L, and 40R. Hereinafter, any one camera selected from the cameras 40B, 40L, and 40R corresponding to the through image TP displayed on the display device 50 may be referred to as a "selected camera" for the sake of convenience.

It should be noted that, for example, the operator can select (switch), with the display content selection switch 64, a camera (selected camera) corresponding to the through image TP displayed on the display device 50 from among the cameras 40B, 40L, and 40R. In the following explanation, it is assumed that the worker W1 according to this example is present in the monitoring area in the horizontal direction and within the predetermined range HR1 in the height direction. Hereinafter, the above assumption is also applicable to the workers W2 to W4 of FIG. 16B to FIG. 16D to be described later.

As illustrated in FIG. 16A, the worker W1 working in the area surrounding the shovel 500 is shown (i.e., included) in the central portion of the through image TP according to this example.

At this occasion, the worker W1 stands substantially in front of the selected camera in the horizontal direction. In other words, the worker W1 is present near the center in the angle of view in the horizontal direction of the selected camera. For this reason, the distortion of the image portion including the worker W1 is extremely small in the right-and-left direction in the through image TP corresponding to the horizontal direction in the real space, and for example, a phenomenon in which the image of the worker W1 skews toward to outer side in the right-and-left direction of the through image TP (hereinafter referred to as "image skew phenomenon" for the sake of convenience) and the like does not occur. Therefore, in the through image TP, the worker W1 standing on the ground appears to be standing along the up-and-down direction of the display unit 50A.

As described above, the worker W1 is present in the monitoring area in the horizontal direction and within the predetermined range HR1 in the height direction. Accordingly, the detection unit 301 detects the worker W1, and the alarm output unit 303 displays, by way of the display control unit 302, a marker for emphasizing the worker W1 included in the through image TP displayed on the display device 50, i.e., superimposes and displays a frame FR1 surrounding the worker W1. Therefore, the operator and the like can easily recognize the worker W1 having entered the monitoring area surrounding the shovel by confirming the through image TP, and can quickly find what kind of operation (work) the worker W1 is doing and the like.

At this occasion, the frame FR1 is constituted by a quadrilateral extending in the height direction in the actually existing space, i.e., a direction extending from the feet position to the head position of the worker W1 standing on the ground (hereinafter referred to as "person's height direction" for the sake of convenience). In this example, as described above, the worker W1 stands substantially in front of the selected camera in the horizontal direction of the real space, and accordingly, the person's height direction of the worker W1 corresponds to the vertical direction of the display unit 50A (specifically, upper direction of the display unit 50A). Therefore, the frame FR1 is constituted by a quadrilateral including one side below near the feet position of the worker W1 in the through image TP and another side extending from the bottom side in an upper direction of the display unit 50A corresponding to the person's height direction and being adjacent to and above the head position of the worker W1 to be opposite to the one side. Therefore, since the frame FR1 for emphasizing the worker W1 is displayed in accordance with the person's height direction of the worker W1 (in this example, in accordance with the upper direction of the display unit 50A), the operator and the like can easily recognize the detected monitoring target in the through image TP.

As described above, each of the cameras 40B, 40L, and 40R is attached to the upper end portions of the upper turning body 3, and capture images of the area surrounding the shovel 500 in such a manner that the optical axes are directed diagonally downward toward the ground in the area surrounding the shovel 500. As a result, the image (the body) of the worker W1 standing on the ground appears to be larger away from the feet position near the ground toward the head position in the through image TP. Accordingly, the quadrilateral constituting the frame FR1 has an approximate trapezoidal shape of which the width increases away from the feet position toward the head position in the person's height direction in accordance with how the worker W1 appears in the through image TP. As a result, the frame FR1 is formed in accordance with how the worker W1 appears depending on the position in the through image TP, i.e., formed to be along the change in the size of the worker W1 depending on the position in the height direction of the through image TP, and this makes it even easier for the operator and the like to recognize the monitoring target detected by the detection unit 301 in the through image TP.

Figure 16B:
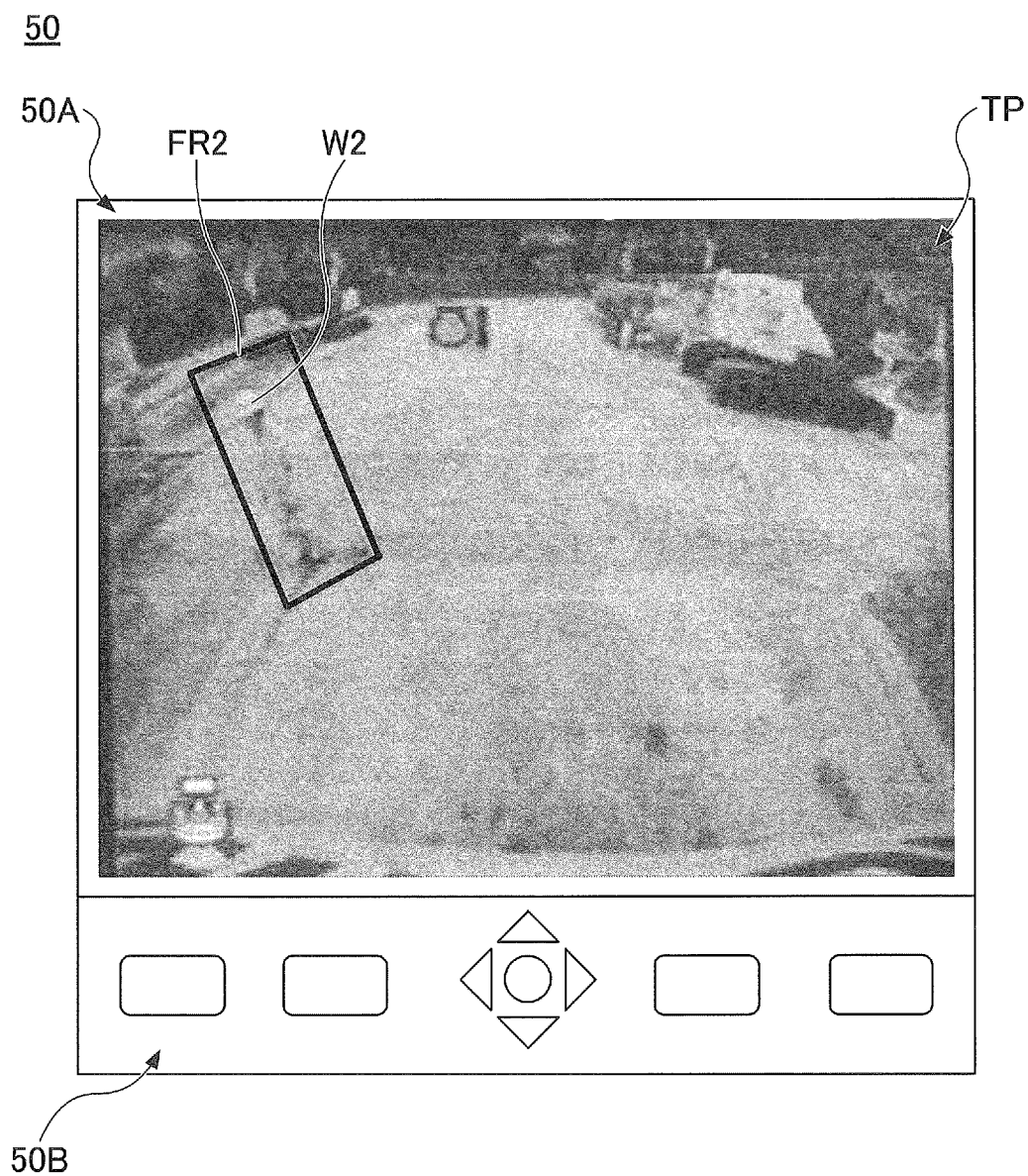
FIG. 16B is a drawing illustrating an example of a display content displayed on the display device in a case where a monitoring target for which an alarm is output or for which operation is restricted is detected.

Subsequently, FIG. 16B is a drawing illustrating another example of a through image TP displayed on the display device 50 in a case where a monitoring target (i.e., a worker W2) is detected in a situation in which the display device 50 displays the through image TP of the selected camera.

As illustrated in FIG. 16B, the worker W2 working in the area surrounding the shovel 500 is shown (i.e., included) in a portion closer to the left side with reference to the center in the right-and-left direction in the through image TP according to this example.

At this occasion, in the horizontal direction, the worker W2 is walking at a position that is offset to some extent to the left side with reference to the front as seen from the selected camera. In other words, the worker W2 is present at a position that is offset to some extent in the left direction from the center of the angle of view in the horizontal direction of the selected camera. Accordingly, the distortion of the portion including the worker W2 is relatively large in the right-and-left direction of the through image TP corresponding to the horizontal direction in the real space. Specifically, as illustrated in FIG. 16B, a phenomenon in which the image of the worker W2 inclines (skews) to the outside of the through image TP, i.e., in the left direction, occurs. Specifically, an image skew occurs.

In a manner similar to the case of the worker W1 of FIG. 16A, the worker W2 is present within the monitoring area in the horizontal direction and within the predetermined range HR1 in the height direction. Accordingly, the detection unit 301 detects the worker W2, and in a manner similar to the case of FIG. 16A, the alarm output unit 303 superimposes and displays, by way of the display control unit 302, a frame FR2 surrounding the worker W2 included in the through image TP displayed on the display device 50.

At this occasion, in a manner similar to the case of the frame FR of FIG. 16A, the frame FR2 is constituted by a quadrilateral extending in the height direction in the actually existing space, i.e., in a person's height direction of the worker W2 standing on the ground. In this example, as described above, in the horizontal direction of the real space, the worker W2 is walking at a position that is offset to some extent in the left direction from the front of the selected camera, and accordingly, the person's height direction of the worker W2 corresponds to a direction inclined to some extent to the left side from the upward direction of the display unit 50A due to the image skew phenomenon. Therefore, the frame FR2 is superimposed and displayed on the through image TP in such a manner that, in accordance with the distortion of the worker W2 on the through image TP, an extension direction from one side corresponding to the feet position to another side corresponding to the head position is inclined in a skew direction of the image (i.e., the left direction in this example). As a result, the frame FR2 for emphasizing the detected monitoring target changes in accordance with a change in how the monitoring target appears due to the distortion in the through image TP, and this allows the operator and the like to easily recognize the worker W2, for example, even in a case where the worker W2 is walking to move.

Figure 16C:
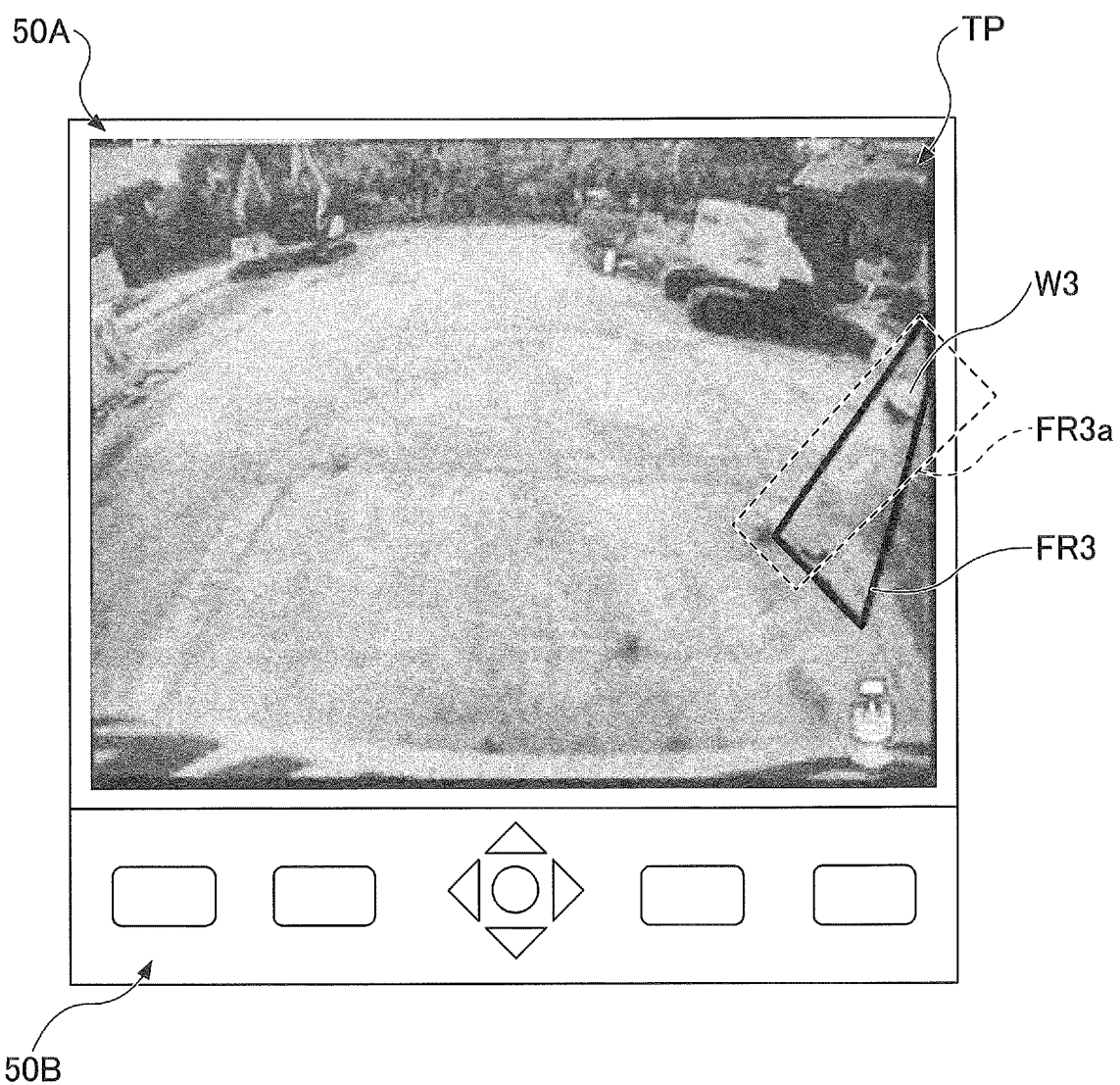
FIG. 16C is a drawing illustrating an example of a display content displayed on the display device in a case where a monitoring target for which an alarm is output or for which operation is restricted is detected.

Subsequently, FIG. 16C is a drawing illustrating a still another example of a through image TP displayed on the display device 50 in a case where the monitoring target (i.e., a worker W3) is detected in a situation where the through image TP of the selected camera is displayed on the display device 50.

As illustrated in FIG. 16C, the worker W3 working in the area surrounding the shovel 500 is shown (i.e., included) in the right end portion of the through image TP according to this example.

At this occasion, in the horizontal direction, the worker W3 is walking at a position that is offset to some extent to the right side with reference to the front as seen from the selected camera. In other words, the worker W3 is present at a position that is offset to some extent in the right direction from the center of the angle of view in the horizontal direction of the selected camera. Accordingly, in a manner similar to the case of the worker W2 of FIG. 16B, the distortion of the portion including the worker W3 is relatively large in the right-and-left direction of the through image TP corresponding to the horizontal direction in the real space. Specifically, as illustrated in FIG. 16C, a phenomenon in which the image of the worker W3 inclines (skews) to the outside of the through image TP, i.e., in the right direction, occurs. Specifically, an image skew occurs.

In a manner similar to the case of the worker W1 of FIG. 16A and the like, the worker W3 is present within the monitoring area in the horizontal direction and within the predetermined range HR1 in the height direction. Accordingly, the detection unit 301 detects the worker W3, and in a manner similar to the case of FIG. 16A and the like, the alarm output unit 303 superimposes and displays, by way of the display control unit 302, a frame FR3 surrounding the worker W3 included in the through image TP displayed on the display device 50.

At this occasion, first, in a manner similar to the case of the frame FR1 of FIG. 16A and the like, the display control unit 302 attempts to superimpose and display, on the through image TP, a frame FR3a constituted by a quadrilateral extending in the height direction in the actually existing space, i.e., in a person's height direction of the worker W2 standing on the ground. However, as illustrated in FIG. 16C, the worker W3 is included in a right end portion of the through image TP, and as a result, the frame FR3a extends beyond the through image TP. Accordingly, when the display control unit 302 determines that the frame FR3a extends beyond the through image TP, the display control unit 302 performs operations such as deforming the frame FR3a, generating a new frame shape, and the like to cause a corrected frame FR3 to be superimposed and displayed on the through image TP. Therefore, even in a situation where a frame formed according to a rule corresponding to the best option described above (hereinafter referred to as "best frame") extends beyond the through image, the display control unit 302 can superimpose and display, on the through image, a corrected frame corresponding to the second best option (hereinafter referred to as "second best frame") as necessary.

It should be noted that information for identifying the best frame described above is saved in advance in, for example, the internal memory and the like of the controller 30. The above-explained internal memory and the like also saves in advance information for identifying the corrected second best frame in a case where the best frame extends beyond the through image TP (for example, a conditional expression, a map, and the like for calculating coordinates of constituent points in the through image). Therefore, by looking up corresponding information in the internal memory, the display control unit 302 can superimpose and display, on the through image TP, the best frame and the second best frame identified by the information.

The color of the frame (for example, frames FR1 to FR3) superimposed and displayed on the through image by the display control unit 302 may be any color as long as, for example, it is a color that can be easily recognized by the operator and the like in contrast to the background of the ground and the like. The color of the frame FR1 may change according to various kinds of conditions. For example, the color of the frame FR1 may change according to the relative position of the monitoring target detected by the detection unit 301 with reference to the shovel 500. Specifically, in a case of a monitoring target relatively close to the shovel 500, the color of the frame FR1 may be set to a color having a low color temperature (for example, red), and in a case of a monitoring target relatively far from the shovel 500, the color of the frame FR1 may be set to a color having a high color temperature (for example, blue). Accordingly, the surroundings monitoring apparatus 100 allows the operator and the like to find a positional relationship (the degree of closeness) with respect to the shovel 500 according to the difference in the color.

It is to be understood that the detection unit 301 performs a process to detect the monitoring target on the basis of a captured image of one of the cameras 40B, 40L, and 40R other than the selected camera. Therefore, for example, in a case where the detection unit 301 detects the monitoring target with one of the cameras 40B, 40L, and 40R other than the selected camera, the alarm output unit 303 may automatically switch, by way of the display control unit 302, the display content of the display device 50 to the through image of the camera corresponding to the captured image in which the monitoring target has been detected.

Figure 16D:
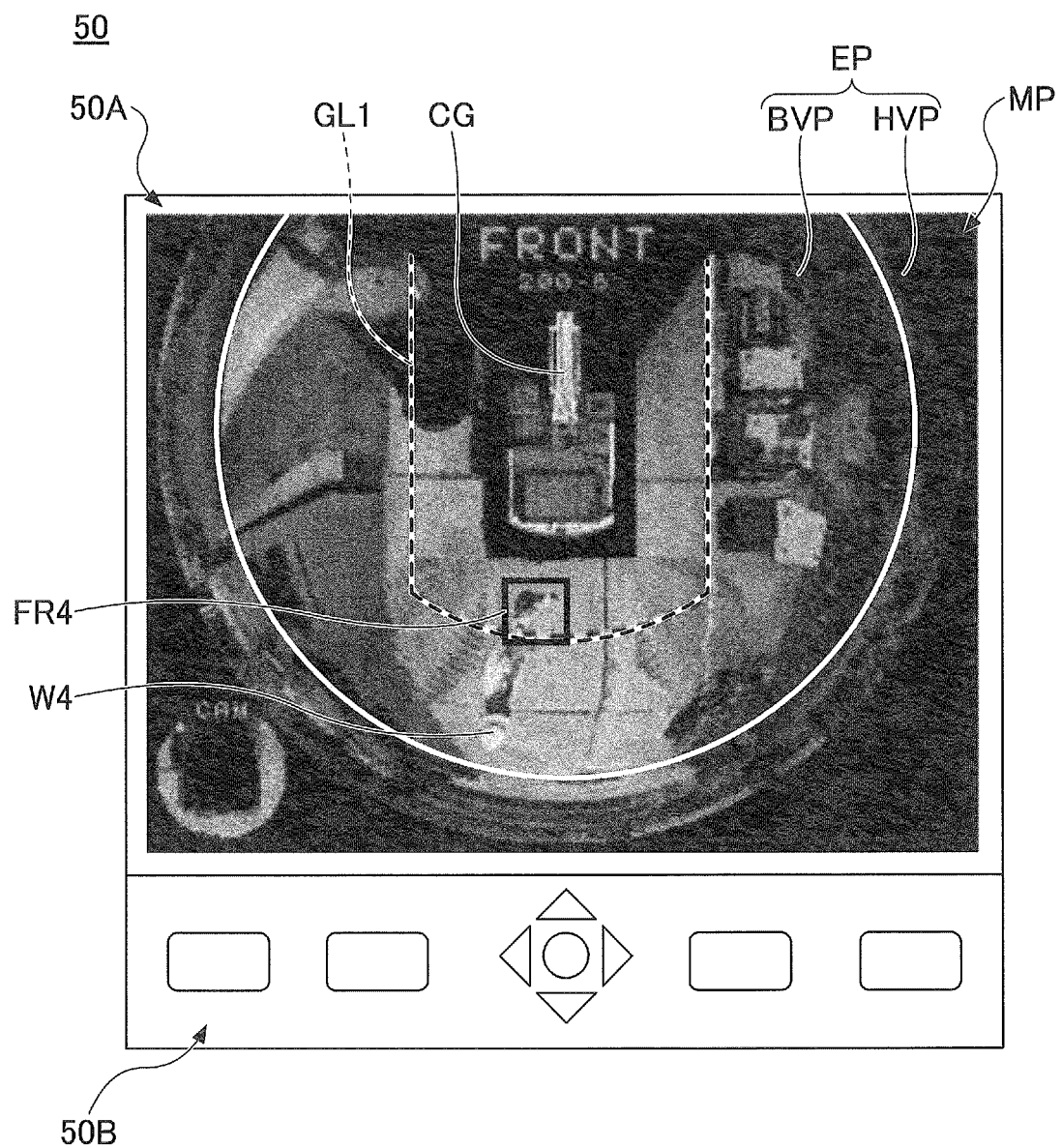
FIG. 16D is a drawing illustrating an example of a display content displayed on the display device in a case where a monitoring target for which an alarm is output or for which operation is restricted is detected.

Subsequently, FIG. 16D is a drawing illustrating an example of a monitoring image MP displayed on the display device 50 in a case where a monitoring target (i.e., a worker W4) has been detected in a situation in which the display device 50 displays the monitoring image MP.

As illustrated in FIG. 16D, in a portion corresponding to the rear of the shovel 500 of the surroundings image EP (i.e., a portion corresponding to the captured image captured by the camera 40B in the composite image) of the through image TP according to this example, the worker W4 working in the area surrounding (i.e., behind) the shovel 500 is shown (i.e., included);

Like the case of the worker W1 and the like of FIG. 16A, the worker W4 is present within the monitoring area in the horizontal direction and within the predetermined range HR1 in the height direction. Accordingly, the detection unit 301 detects the worker W4, and the alarm output unit 303 superimposes and displays, by way of the display control unit 302, a marker (i.e., a frame FR4) for emphasizing the worker W4 included in the surroundings image EP in the monitoring image MP displayed on the display device 50.

Specifically, the frame FR4 is constituted by a quadrilateral (i.e., in this example, a square of which four sides are along the vertical direction and the horizontal direction of the display unit 50A) that is sufficiently smaller than the portion occupied by the worker W4 in the surroundings image EP. Specifically, the frame FR4 is superimposed and displayed on the surroundings image EP in the monitoring image MP in such a manner as to surround the feet position of the worker W4 in the surroundings image EP. This is because the shape of the monitoring target on the surroundings image EP, which is a composite image, tends to have much greater distortion than the shape of the monitoring target in the real space, and if a frame surrounding the monitoring target is displayed in a manner similar to the case of the through image TP, this may unfavorably make it difficult to find the monitoring target.

[The Details of the Operation of Surroundings Monitoring Apparatus]

Subsequently, the details of the operation of the surroundings monitoring apparatus 100 according to the present embodiment will be explained with reference to FIG. 17, FIG. 18. Specifically, a flow of process of output of the alarm and restriction of operation of the shovel 500 on the basis of detection of a monitoring target by the surroundings monitoring apparatus 100 (hereinafter referred to as "surroundings monitoring process") will be explained.

Figure 17:
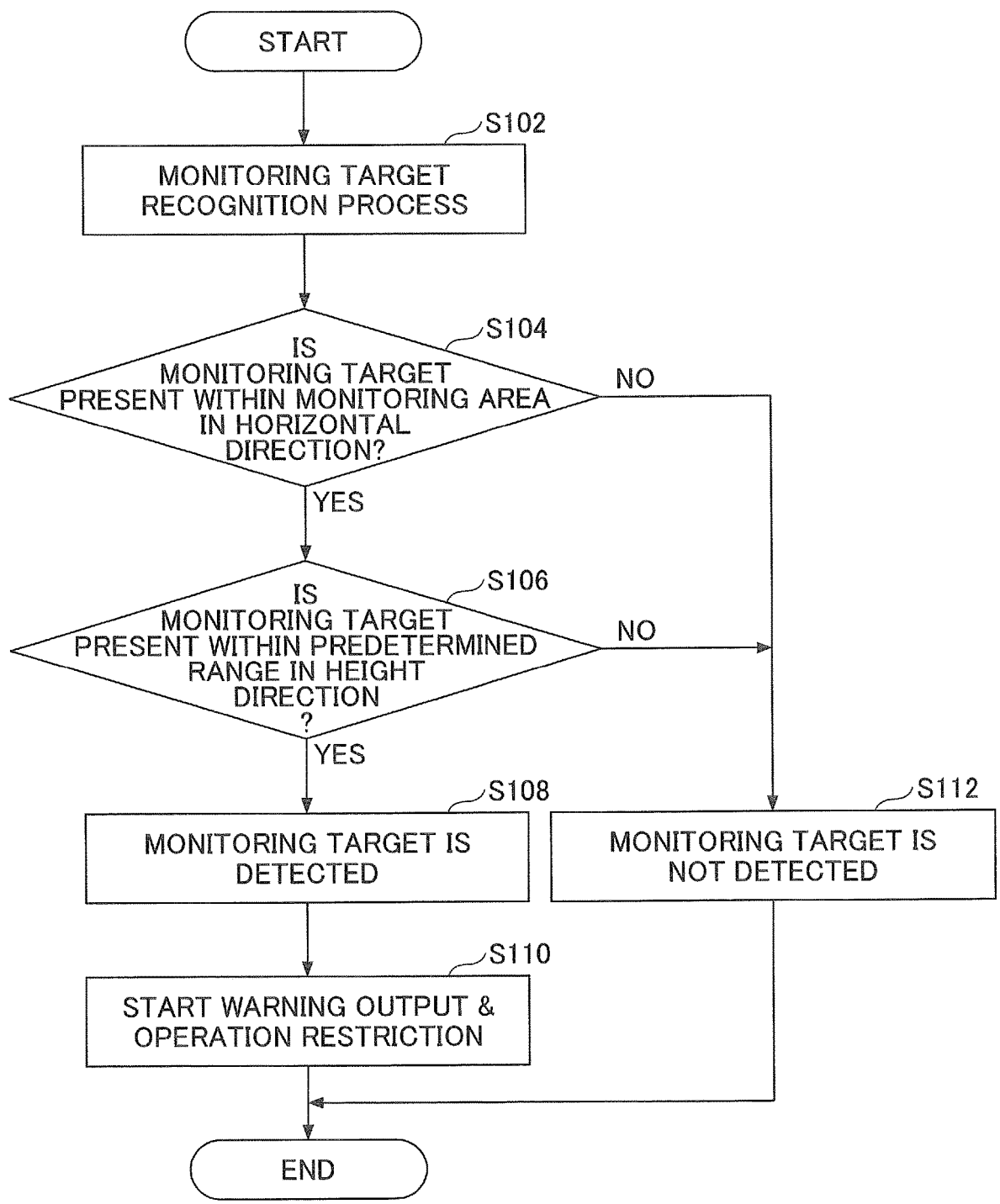
FIG. 17 is a flowchart schematically illustrating an example of monitoring process performed by the surroundings monitoring apparatus.

FIG. 17 is a flowchart schematically illustrating an example of a surroundings monitoring process performed by the surroundings monitoring apparatus 100. The process according to this flowchart is executed repeatedly with predetermined process intervals in a case where, for example, an alarm is not output and operation of the shovel 500 is not restricted during operation from when the shovel is started to when the shovel is stopped. The above is also applicable to the process in the flowchart of FIG. 18 to be described later.

In step S102, the detection unit 301 performs a process to detect the monitoring target included in the captured image on the basis of the image captured by the image-capturing device 40.

In step S104, the detection unit 301 determines whether a monitoring target that is present within the monitoring area in the horizontal direction is recognized. In a case where the detection unit 301 determines that the monitoring target that is present within the monitoring area in the horizontal direction is recognized, the detection unit 301 proceeds to step S106, and in cases other than the above, the detection unit 301 proceeds to step S112.

In step S106, the detection unit 301 determines whether the monitoring target recognized in step S104 is present within the predetermined range HR1 in the height direction. In a case where the monitoring target recognized in step S104 is present within the predetermined range HR1 in the height direction, the detection unit 301 proceeds to step S108, and in cases other than the above, the detection unit 301 proceeds to step S112.

It should be noted that the order of the process of steps S104, S106 may be reversed.

In step S108, the detection unit 301 determines that the recognized monitoring target is a detection target. Then, the detection unit 301 notifies, to the alarm output unit 303 and the operation restriction unit 304, information about the monitoring target to the effect that the monitoring target has been detected (for example, position information and the like in the horizontal direction and the height direction).

In step S110, the alarm output unit 303 outputs an alarm with the display device 50 and the audio output device 52. Together with this, the operation restriction unit 304 restricts operation of the shovel 500 with the gate lock valve 54. Then, the controller 30 terminates the current process.

Conversely, in step S112, the detection unit 301 determines that a monitoring target, which is the target of detection, has not been detected, and terminates the current process.

For example, in Patent Document 1 and the like explained above, all of the monitoring targets detected in the monitoring target region (monitoring area) in the area surrounding the work machine such as a shovel and the like can possibly be targets for which alarms are output or operation is restricted. Therefore, the output of the alarm and restriction of the operation of the shovel could possibly be executed, even in a situation in which the chance of contact and the like between the work machine and the detected monitoring targets is extremely low (for example, a large step exists between the work surface of the shovel and the plane on which the monitoring target is present). Therefore, unnecessary execution of the output of the alarm and restriction of the operation of the shovel may result in a reduction of the work efficiency of the shovel.

In contrast, in this example, the surroundings monitoring apparatus 100 outputs an alarm and restricts operation of the shovel 500 only in a limited case where a monitoring target that is present within the predetermined range HR1 in the height direction is detected in the monitoring area defined in the horizontal direction. Therefore, by appropriately setting the predetermined range HR1, output of the alarm and restriction of operation of the shovel 500 can be avoided in a situation where the chance of contact and the like of the shovel 500 with the monitoring target is extremely low. Specifically, for example, as illustrated in FIG. 12A to FIG. 12D, the monitoring target could be present on a different work surface adjacent to the work surface of the shovel 500 with a step or an inclination connecting therebetween. In this case, depending on the magnitude and the like of the step or inclination, it is very unlikely that the shovel 500 would go over the step or inclination to move to the work surface on which the monitoring target is present. Therefore, the surroundings monitoring apparatus 100 can reduce unnecessary output of an alarm and unnecessary restriction of operation of the shovel 500, and can alleviate reduction in the work efficiency of the shovel 500.

Instead of the detection unit 301, at least one of the alarm output unit 303 and the operation restriction unit 304 may determine whether the monitoring target is present within the predetermined range HR1 in the height direction. Hereinafter, the process flow in this case will be explained with reference to FIG. 18.

Figure 18:
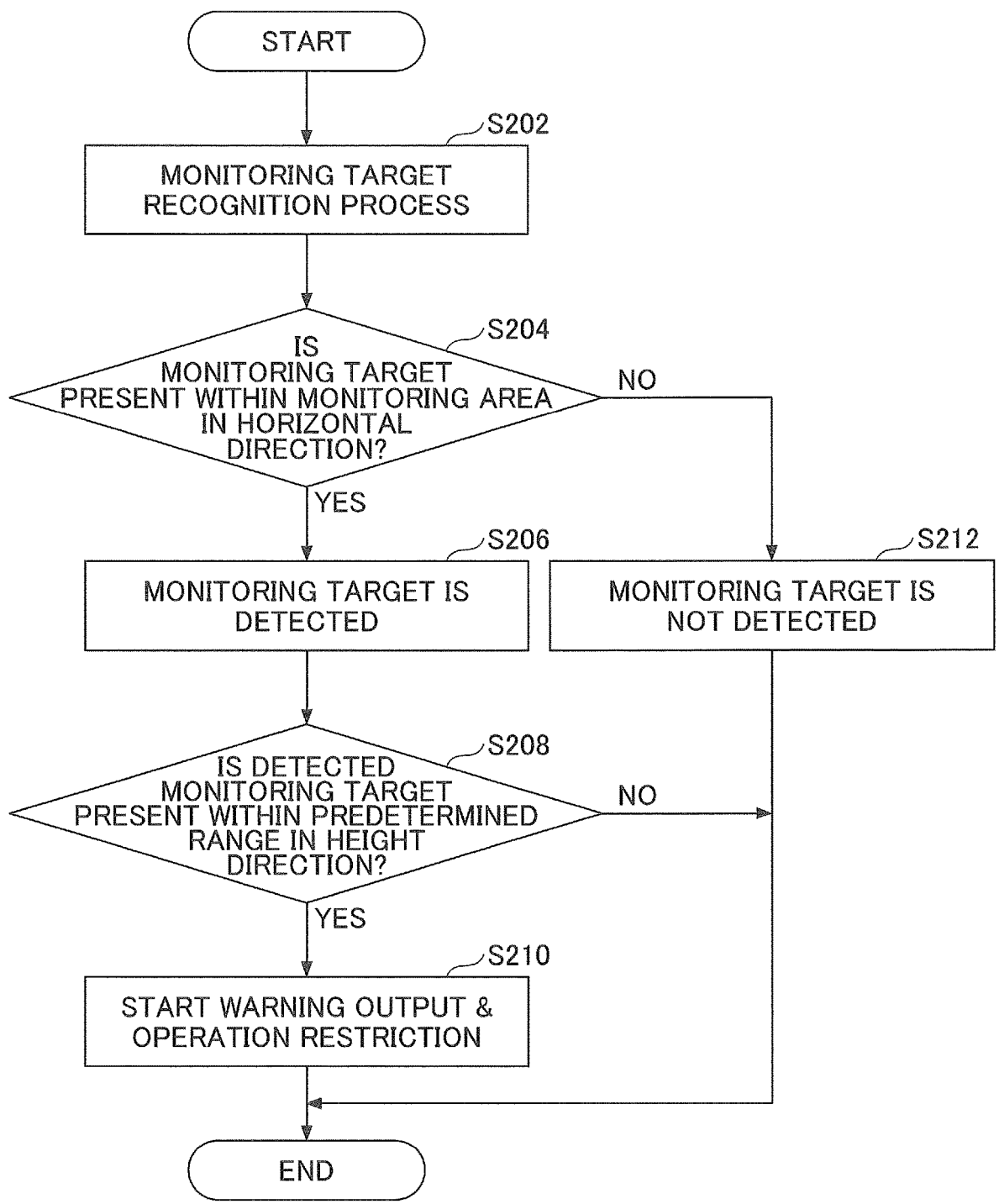
FIG. 18 is a flowchart schematically illustrating another example of monitoring process performed by the surroundings monitoring apparatus.

FIG. 18 is a flowchart schematically illustrating another example of a surroundings monitoring process by the surroundings monitoring apparatus 100.

The process of steps S202 and S204 is the same as steps S102 and S104 of FIG. 17, and explanation thereabout is omitted.

In step S204, in a case where a monitoring target that is present within the monitoring area in the horizontal direction is recognized, the detection unit 301 proceeds to step S206.

The process in step S206 is the same as step S108 of FIG. 9, and accordingly, explanation thereabout is omitted.

In step S208, at least one of the alarm output unit 303 and the operation restriction unit 304 (hereinafter referred to as for the sake of convenience "alarm output unit 303 and the like") determines whether the monitoring target detected by the detection unit 301 is present within the predetermined range HR1 in the height direction. In a case where the monitoring target detected by the detection unit 301 is present within the predetermined range HR1 in the height direction, the alarm output unit 303 and the like proceed to step S210, and in cases other than the above, the alarm output unit 303 and the like terminates the current process.

The process in steps S210 and S212 is the same as steps S110 and S112 of FIG. 17, and accordingly, explanation thereabout is omitted.

Therefore, in this example, in a manner similar to the case of the example of FIG. 17, an alarm is output and the operation of the shovel 500 is restricted only in a limited case where a monitoring target that is present within the predetermined range HR1 in the height direction is detected in the monitoring area defined in the horizontal direction. Therefore, actions and effects similar to the case of FIG. 17 are achieved.

In this example, the surroundings monitoring apparatus 100 includes both of the alarm output unit 303 and the operation restriction unit 304, but may include any one of the alarm output unit 303 and the operation restriction unit 304, in a manner similar to the case of the example explained above. In other words, the surroundings monitoring apparatus 100 may be configured to perform any one of the output of the alarm and the restriction of operation of the shovel 500 in a case of detecting the monitoring target within the predetermined range HR1 in the monitoring area in the horizontal direction.

In this example, in a case where the monitoring target within the monitoring area in the horizontal direction and that is present within the predetermined range HR1 in the height direction is determined to have been detected, the content as illustrated in FIG. 16A to FIG. 16D is displayed on the display device 50, but the embodiment is not limited to this aspect. Specifically, in a case where, irrespective of the position of the monitoring target in the height direction, a monitoring target within the monitoring area in the horizontal direction is detected (for example, the surroundings monitoring apparatus 100 included in the example of the surroundings monitoring system 1000 explained above), the content illustrated in FIG. 16A to FIG. 16D may be displayed on the display device 50.

Also, in this example, a monitoring target that is present on a step surface at a height different from a work surface (i.e., a reference surface) of the shovel 500 and a monitoring target that is present on a surface having an inclination angle different from the work surface of the shovel 500 are excluded from the target for which an alarm is output or for which operation is restricted, but it is to be understood that, for reasons other than the above, monitoring targets at positions out of the predetermined range HR1 in the height direction of the shovel 500 may be excluded from the target for which an alarm is output or for which operation is restricted. In other words, the predetermined range HR1 may be defined in view of displacement in position in the height direction between the shovel 500 and the monitoring target due to reasons other than the step and the inclination with respect to the work surface of the shovel 500.

Also, in this example, the surroundings monitoring apparatus 100 is incorporated into the surroundings monitoring system 1000, but the surroundings monitoring apparatus 100 does not need to rely on the surroundings monitoring system 1000 (external device 600), and may perform the operations explained above by itself (i.e., in a standalone state).

The surroundings monitoring apparatus 100 according to this example is disclosed below.

(1)

A surroundings monitoring apparatus comprising:

a detection unit for detecting a predetermined monitoring target located in an area surrounding a shovel; and a control unit for outputting an alarm or restricting operation of the shovel in a case where the detection unit detects the monitoring target within a predetermined first range in a height direction of the shovel.

(2)

The surroundings monitoring apparatus according to (1), wherein in a case where the detection unit detects the monitoring target within the first range with reference to a reference position corresponding to a particular height of the shovel in the height direction of the shovel, the control unit outputs the alarm or restricts the operation of the shovel.

(3)

The surroundings monitoring apparatus according to (1) or (2), further comprising a sensor capable of acquiring detection information about a position of the monitoring target located in the area surrounding the shovel, wherein the detection unit determines the position where the monitoring target is present in the height direction of the shovel, on the basis of the detection information by the sensor.

(4)

The surroundings monitoring apparatus according to (3), wherein the sensor includes a monocular camera, a stereo camera, a LIDAR device, or a radar.

(5)

The surroundings monitoring apparatus according to (1) or (2), further comprising:

a terrain information acquisition unit for acquiring terrain information related to computerized construction for a work site of the shovel, and a position information acquisition unit for acquiring position information in the work site of the shovel, wherein the detection unit determines the position where the monitoring target is present in the height direction of the shovel, on the basis of the terrain information and the position information.

(6)

The surroundings monitoring apparatus according to (4), wherein the detection unit determines that the monitoring target is within the first range in the height direction of the shovel, in a case where the monitoring target appears within a second range defined in advance in a captured image of the surroundings of the shovel captured by the monocular camera.

(7)

The surroundings monitoring apparatus according to (6), wherein the detection unit determines that the monitoring target is within the first range in the height direction of the shovel, when an amount of shift of the monitoring target in the captured image with reference to a predetermined reference position in the height direction of the shovel, or a size of the monitoring target in the captured image corresponding to the height direction of the shovel is within the second range defined in advance in accordance with a magnitude of distance to the monitoring target as seen from the shovel.

(8)

The surroundings monitoring apparatus according to (4), (6), or (7), further comprising a display device for displaying a captured image of the surroundings of the work machine captured by the monocular camera, wherein in a case where the detection unit detects the monitoring target within the predetermined first range in the height direction of the work machine, the control unit causes a frame surrounding the monitoring target to be displayed in a superimposed manner on the captured image in accordance with a tendency of distortion of an image captured by the monocular camera.

(9)

The surroundings monitoring apparatus according to (8), wherein in a case where the frame of which shape is defined in advance in accordance with the tendency of distortion of the image captured by the monocular camera extends beyond the captured image displayed by the display device, the control unit causes the frame to be deformed so as to fit inside the captured image and displayed in a superimposed manner on the captured image displayed by the display device.

(10)

The surroundings monitoring apparatus according to (4), (6), or (7), further comprising:

a plurality of monocular cameras of which image-capturing ranges are different from each other; and a display device for displaying a composite image indicating a situation in the area surrounding the shovel, generated on the basis of captured images of the plurality of monocular cameras, wherein the control unit causes a marker, of a size smaller than the captured image in the composite image and of a constant size regardless of a position in the composite image, to be displayed in a superimposed manner in a portion including the monitoring target in the composite image displayed on the display device.

As described above, the embodiment for carrying out the present invention has been described in detail, but the present invention is not limited to such a specific embodiment, and the present invention can be variously modified and changed within the range of the gist of the present invention described in the claims.

What is claimed is:

1. A surroundings monitoring apparatus comprising:
a sensor configured to acquire detection information about a position of a predetermined monitoring target located in an area surrounding a work machine; and
a processor configured to
  determine whether the monitoring target is in a predetermined range equal to or less than a predetermined distance from the work machine within a sensor range in which the sensor can acquire the detection information,
  determine whether the monitoring target is in a first range in a height direction of the work machine with respect to a reference surface on which the work machine is positioned, and
  output an alarm or restrict an operation of the work machine in response to determining that the monitoring target is in the predetermined range and the monitoring target is in the first range.

2. A surroundings monitoring apparatus comprising:
a sensor configured to acquire detection information about a position of a predetermined monitoring target located in an area surrounding a work machine; and
a processor configured to output an alarm or restrict an operation of the work machine in response to detecting that: the monitoring target is in a sensor range in which the sensor can acquire the detection information; the monitoring target is in a predetermined range equal to or less than a predetermined distance from the work machine; and the monitoring target is in a first range in a height direction of the work machine,
wherein the processor is configured to acquire information about cancellation of the alarm or the restricting of the operation at an outside of the work machine, and
wherein the processor is configured to, when the alarm is output or the operation is restricted, cancel the alarm or the restricting of the operation, in response to acquiring of the information about the cancellation.

3. The surroundings monitoring apparatus according to claim 2, wherein the processor is configured to acquire a notification of permitting cancellation of the alarm or the restricting of the operation from an external device, and
wherein the processor is configured to cancel the alarm or the restricting of the operation, in response to acquiring of the notification of the permitting of the cancellation.

4. The surroundings monitoring apparatus according to claim 2, further comprising:
an output device configured to notify an operator,
wherein the processor is configured to acquire information about confirmation of the surroundings of the work machine from an external device, and
the output device is configured to notify the operator of a content of the information about the confirmation of the surroundings of the work machine when the processor acquires the information about the confirmation of the surroundings of the work machine.

5. The surroundings monitoring apparatus according to claim 2, further comprising an image-capturing device configured to capture an image of the surroundings of the work machine,
wherein the processor is configured to acquire, from the image-capturing device, the captured image including a predetermined person who is located in the area surrounding the work machine and who is in a predetermined pose or gives a predetermined gesture, and
the processor is configured to cancel the alarm or the restricting of the operation, in response to acquiring of the captured image including the person who is in the predetermined pose or gives the predetermined gesture, when the alarm is output or the operation is restricted.

6. The surroundings monitoring apparatus according to claim 2, further comprising:
an input unit configured to receive information indicating an intention for cancelling the alarm or the restricting of the operation from the operator,
wherein the processor is configured to cancel the alarm or the restricting of the operation, on condition that the processor acquires the information and the input unit receives the information indicating the intention, when the alarm is output or the operation is restricted.

* * * * *